United States Patent
Watanabe et al.

(10) Patent No.: US 12,473,405 B2
(45) Date of Patent: Nov. 18, 2025

(54) POLYORGANOSILOXANE, POLYORGANOSILOXANE COMPOSITION, CURED PRODUCT, POLYORGANOSILOXANE-CONTAINING ELECTROLYTIC SOLUTION FOR ELECTROLYTIC CAPACITOR, AND ELECTROLYTIC CAPACITOR USING SAME

(71) Applicant: MITSUBISHI CHEMICAL CORPORATION, Chiyoda-ku (JP)

(72) Inventors: Takumi Watanabe, Chiyoda-ku (JP); Noriaki Terada, Chiyoda-ku (JP); Tsuyoshi Nagasaka, Chiyoda-ku (JP); Shogo Koga, Chiyoda-ku (JP); Kazuma Inoue, Chiyoda-ku (JP); Kazunari Matsumura, Chiyoda-ku (JP); Naomi Fujimori, Chiyoda-ku (JP); Hiroo Miyauchi, Chiyoda-ku (JP); Akemi Hosokawa, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 18/166,218

(22) Filed: Feb. 8, 2023

(65) Prior Publication Data
US 2023/0250237 A1     Aug. 10, 2023

Related U.S. Application Data

(60) Division of application No. 16/440,347, filed on Jun. 13, 2019, now Pat. No. 11,608,415, which is a continuation of application No. PCT/JP2017/044799, filed on Dec. 13, 2017.

(30) Foreign Application Priority Data

Dec. 13, 2016 (JP) .................... 2016-241317
Feb. 6, 2017 (JP) .................... 2017-019934
Mar. 27, 2017 (JP) .................... 2017-061966

(51) Int. Cl.
| | |
|---|---|
| C08G 77/20 | (2006.01) |
| C08G 77/06 | (2006.01) |
| C08G 77/12 | (2006.01) |
| C08G 77/18 | (2006.01) |
| H01G 9/035 | (2006.01) |
| H01G 9/045 | (2006.01) |
| C08G 77/00 | (2006.01) |

(52) U.S. Cl.
CPC ............ *C08G 77/20* (2013.01); *C08G 77/06* (2013.01); *C08G 77/12* (2013.01); *C08G 77/18* (2013.01); *H01G 9/035* (2013.01); *H01G 9/045* (2013.01); *C08G 77/70* (2013.01)

(58) Field of Classification Search
None
See application file for complete search history.

(56) References Cited

U.S. PATENT DOCUMENTS

| | | |
|---|---|---|
| 3,284,406 A | 11/1966 | Nelson |
| 3,884,866 A | 5/1975 | Jeram et al. |
| 4,568,566 A | 2/1986 | Tolentino |
| 4,625,007 A | 11/1986 | Ellis et al. |
| 4,707,531 A | 11/1987 | Shirahata |
| 4,920,457 A | 4/1990 | Schweikert et al. |
| 4,962,076 A | 10/1990 | Chu et al. |
| 5,063,254 A | 11/1991 | Nakos |
| 5,373,078 A | 12/1994 | Juen et al. |
| 5,446,087 A | 8/1995 | Chizat et al. |
| 5,932,668 A | 8/1999 | Friebe et al. |
| 5,959,038 A | 9/1999 | Furukawa et al. |
| 6,063,889 A | 5/2000 | Friebe et al. |
| 6,127,502 A | 10/2000 | Krahnke et al. |
| 6,319,982 B1 | 11/2001 | Huang et al. |
| 6,403,689 B1 | 6/2002 | Lehaut et al. |

(Continued)

FOREIGN PATENT DOCUMENTS

| | | |
|---|---|---|
| CN | 1147526 A | 4/1997 |
| CN | 102875811 A | 1/2013 |

(Continued)

OTHER PUBLICATIONS

Dow Corning Corporation, Silicone Chemistry Overview, 1-11 (1997) (Year: 1997).*
A. Colas et al., Handbook of Polymer Applications in Medicine and Medical Devices, 131-143 (2013) (Year: 2013).*
A. O'Lenick, 3 Journal of Surfactants, 229-236 (2000) (Year: 2000).*
J. Grande et al., 46 Chem. Commun., 4988-4990 (2010) (Year: 2010).*
IUPAC, Compendium of Chemical Terminology, Gold Book, p. 605 of 1622 (2014) (Year: 2014).*

(Continued)

*Primary Examiner* — Alexander R Pagano
(74) *Attorney, Agent, or Firm* — Oblon, McClelland, Maier & Neustadt, L.L.P.

(57) ABSTRACT

A polyorganosiloxane may be high in elasticity and/or strength. The polyorganosiloxane may include an M unit ($R^1R^2R^3SiO_{1/2}$) at a content of 10 mol. % or more relative to the total of silicon and a T unit ($R^6SiO_{3/2}$) at a content of 80 mol. % or less relative to the total of silicon. The polyorganosiloxane may have an alkoxy group bound, at a content of 0.07 to 4 wt. %, based on total polyorganosiloxane weight, and a reactive functional group bound to silicon, with 3 to 12 of the reactive functional groups bound on a number basis per a molecular weight of 1000 of the polyorganosiloxane. The weight loss of the polyorganosiloxane at 110° C. under 0.15 torr for 2 hours may be 5 wt. % or less.

20 Claims, 9 Drawing Sheets

(56) References Cited

U.S. PATENT DOCUMENTS

| | | | |
|---|---|---|---|
| 6,482,888 B1* | 11/2002 | Ahn | C08L 83/04 524/588 |
| 6,610,108 B2* | 8/2003 | Perry | D06L 1/04 510/276 |
| 6,825,153 B2* | 11/2004 | Giraud | C10M 107/50 508/213 |
| 6,943,265 B2 | 9/2005 | Schafer et al. | |
| 7,014,975 B2 | 3/2006 | Barthel et al. | |
| 7,019,069 B2 | 3/2006 | Kobayashi et al. | |
| 7,425,283 B2 | 9/2008 | Nakanishi et al. | |
| 7,491,784 B2 | 2/2009 | Schafer et al. | |
| 7,576,140 B2 | 8/2009 | Tamaki et al. | |
| 7,816,009 B2 | 10/2010 | Briehn et al. | |
| 8,013,100 B2 | 9/2011 | Minge et al. | |
| 8,592,545 B2 | 11/2013 | Mackinnon et al. | |
| 8,822,621 B2 | 9/2014 | Daiss et al. | |
| 8,841,218 B2 | 9/2014 | Han et al. | |
| 8,900,712 B2 | 12/2014 | Mitsuoka et al. | |
| 8,987,358 B2 | 3/2015 | Kawabata et al. | |
| 9,096,621 B2 | 8/2015 | Hoffman et al. | |
| 9,273,072 B2 | 3/2016 | Fritz-Langhals | |
| 9,416,273 B1 | 8/2016 | Yang et al. | |
| 9,752,007 B2 | 9/2017 | Bhagwagar et al. | |
| 10,336,866 B2 | 7/2019 | Fritz-Langhals et al. | |
| 10,456,352 B2 | 10/2019 | Keri et al. | |
| 10,669,422 B2 | 6/2020 | Kusunoki et al. | |
| 10,683,444 B2 | 6/2020 | Takanashi et al. | |
| 10,870,758 B2 | 12/2020 | Yabuno et al. | |
| 11,608,415 B2* | 3/2023 | Watanabe | H01G 9/045 |
| 2007/0134424 A1 | 6/2007 | Tauchi et al. | |
| 2011/0313123 A1 | 12/2011 | Kashiwagi | |
| 2013/0161686 A1* | 6/2013 | Yoshitake | C08G 77/14 528/32 |
| 2014/0046084 A1 | 2/2014 | Honjo et al. | |
| 2014/0242312 A1 | 8/2014 | Murai et al. | |
| 2014/0323677 A1 | 10/2014 | Kitamura et al. | |
| 2015/0144987 A1 | 5/2015 | Hamamoto et al. | |
| 2015/0218318 A1 | 8/2015 | Manabe et al. | |
| 2016/0053056 A1 | 2/2016 | Gould et al. | |
| 2016/0148756 A1 | 5/2016 | Wada et al. | |
| 2016/0200842 A1* | 7/2016 | Furuta | C08F 230/085 526/279 |
| 2016/0304673 A1* | 10/2016 | Kusunoki | C08G 77/80 |
| 2017/0369751 A1* | 12/2017 | Nakagawa | C08L 83/04 |
| 2018/0134565 A1* | 5/2018 | Hindelang | B01J 13/0065 |
| 2019/0119538 A1 | 4/2019 | Kim et al. | |
| 2019/0177488 A1 | 6/2019 | Yamazaki | |
| 2019/0203088 A1 | 7/2019 | Tsushima et al. | |
| 2019/0225879 A1* | 7/2019 | Doi | C08L 83/04 |
| 2020/0283627 A1* | 9/2020 | Mizunashi | C08G 77/045 |

FOREIGN PATENT DOCUMENTS

| | | |
|---|---|---|
| CN | 102898650 A | 1/2013 |
| CN | 105229056 A | 1/2016 |
| CN | 106833502 A | 6/2017 |
| EP | 0 195 936 A1 | 10/1986 |
| EP | 0 389 138 A2 | 9/1990 |
| JP | 59-61816 A | 4/1984 |
| JP | 61-195129 A | 8/1986 |
| JP | 64-84617 A | 3/1989 |
| JP | 1-232713 A | 9/1989 |
| JP | 1-245508 A | 9/1989 |
| JP | H01-245508 A | 9/1989 |
| JP | 3-257811 A | 11/1991 |
| JP | 4-311765 A | 11/1992 |
| JP | H04-311765 A | 11/1992 |
| JP | 6-151250 A | 5/1994 |
| JP | 6-310378 A | 11/1994 |
| JP | 9-202828 A | 8/1997 |
| JP | 2003-203827 A | 7/2003 |
| JP | 2006-503142 A | 1/2006 |
| JP | 2006-274082 A | 10/2006 |
| JP | 2011-158797 A | 8/2011 |
| JP | 2011-162714 A | 8/2011 |
| JP | 2011-462714 A | 8/2011 |
| JP | 2012-8201 A | 1/2012 |
| JP | 2012-233174 A | 11/2012 |
| JP | 2013-82907 A | 5/2013 |
| JP | 2013-082907 A | 5/2013 |
| JP | 2015-101645 A | 6/2015 |
| JP | 2015-129288 A | 7/2015 |
| JP | 2016-108395 A | 6/2016 |
| JP | 2016-108396 A | 6/2016 |
| KR | 2013132028 A | 12/2013 |
| WO | 2005/010077 A1 | 2/2005 |
| WO | 2013/031798 A1 | 3/2013 |
| WO | 2013/042707 A1 | 3/2013 |
| WO | 2014/208607 A1 | 12/2014 |

OTHER PUBLICATIONS

A. O'Lenick, Journal of Surfactants, vol. 3, pp. 229-236 (2000).

Dow Corning Corporation, Silicone Chemistry Overview, pp. 1-11 (1997).

A.Colas, et al., Handbook of Polymer Applications in Medicine and Medical Devices, pp. 131-143 (2013).

J. Grande et at., Chem. Commun., "Testing the functional tolerance of Piers-Rubinsztajn reaction: a new strategy for functional silicones", vol. 46, pp. 4988-4990 (2010).

Final Rejection issued Jun. 28, 2022, in Chinese Patent Application No. 201780077352.9 (with machine translation).

Office Action issued Oct. 18, 2022, in Korean Patent Application No. 10-2019-7019584 filed Dec. 13, 2017 (with machine generated English translation).

Notice of Reasons for Refusal dated Nov. 9, 2021, Japanese Patent Application No. 2018019603 (with machine English translation).

Combined Chinese Office Action and Search Report issued Mar. 9, 2021, in Chinese Patent Application No. 201780077352.9 (with unedited computer-generated English translation).

Office Action mailed on Nov. 8, 2022 of the corresponding Japanese Patent Application No. 2021-188942 (with English machine translation).

Extended European Search Report issue Oct. 16, 2019 in European Patent Application No. 17880851.5.

International Search Report issued Mar. 13, 2018 in PCT/JP2017/044799.

International Preliminary Report on Patentability and Written Opinion issued Jun. 27, 2019 in PCT/JP2017/044799 (with English translation only).

Siltech Corporation, Silmer® VQ Resins, pp. 1-3, 2015.

Tanio, N., "Refractive Index prediction System of Transparent Resin", Journal of Network Polymer, vol. 30 No. 1, pp. 33-40 (with partial English translation), 2009.

Okada T., "Synthetic and Properties of Sulfur-containing Cyclic Polyolefin", TOSHOH Research and Technology Review, vol. 52, pp. 11-18, 2008 (we consider that conventional technologies are sufficiently explained by only the parts written in English on p. 11).

Kobayashi, M., "Stimulation on Moisture Absorption in a Plasic Objective", Konica Technical Report, vol. 3, pp. 74-80, Jan. 1990 (We consider that conventional technologies are sufficiently explained by only the Abstract written in English).

Ue, M., et al., "New Capacitor", Electrochemical Society of Japan, New Capacitor Workshop, Second Workshop in 1996, vol. 3, No. 2, pp. 55-63, 1996 (with partial English translation).

Office Action issued Apr. 14, 2022, in Korean Patent Application No. 10-2019-7019584 (with machine generated English translation).

Office Action dated Jan. 19, 2022, in Chinese Patent Application No. 201780077352.9 filed Dec. 13, 2017 (with machine generated English translation).

Office Action issued Jan. 26, 2021 in corresponding Japanese Patent Application No. 2016-241317 (with English Translation).

* cited by examiner

POLYORGANOSILOXANE, POLYORGANOSILOXANE COMPOSITION, CURED PRODUCT, POLYORGANOSILOXANE-CONTAINING ELECTROLYTIC SOLUTION FOR ELECTROLYTIC CAPACITOR, AND ELECTROLYTIC CAPACITOR USING SAME

CROSS-REFERENCE TO RELATED APPLICATION

The present application is a division of U.S. application Ser. No. 16/440,347, filed Jun. 13, 2019, and published as US 2019/0292320 A1 on Sep. 26, 2019, which was a bypass continuation of International Application PCT/JP2017/044799, filed on Dec. 13, 2017, designating the U.S., and claiming priority to Japanese Patent Application 2016-241317, filed on Dec. 13, 2016, Japanese Patent Application 2017-019934, filed on Feb. 6, 2017, and Japanese Patent Application 2017-061966, filed on Mar. 27, 2017, the entire content of each of which is incorporated herein by reference.

TECHNICAL FIELD

The present invention relates to a polyorganosiloxane having a novel structure, particularly relates to a polyorganosiloxane having a structure suitable for an optical member, and further relates to a polyorganosiloxane-containing electrolytic solution for an electrolytic capacitor, and an electrolytic capacitor using the same.

BACKGROUND ART

Polyorganosiloxanes are utilized in many industries because these have a high degree of freedom in design and can allow various functions to be possessed.

For example, Patent Document 1 discloses a polyorganosiloxane having a polyhedral structure, such a polyorganosiloxane being improved in not only heat resistance, light resistance, and chemical stability, but also moldability, and the like.

Patent Document 2 discloses a silsesquioxane having a cage structure, in which the silsesquioxane exhibits favorable low-temperature fluidity and is suitably used for sealing a semiconductor, for example.

Plastic materials have been increasingly used heavily for optical materials, instead of inorganic glass, because plastic materials are light in weight, are easily molded, and can be enhanced in productivity. In particular, lenses made of plastic are adopted for lenses for use in, for example, cameras and smartphones. Lens materials are demanded to have a high Abbe's number for the purpose of formation of clear images, and are also demanded to have a high refractive index for the purpose of a decrease in lens thickness according to an increase in fineness. However, as described in Non-Patent Documents 1 and 2, materials high in refractive index generally tend to be low in Abbe's number, and have difficulty in satisfying both a high refractive index and a high Abbe's number.

It is known that both a high refractive index and a high Abbe's number can be achieved by introducing halogen other than fluorine, an alicyclic olefin, a sulfur atom, and the like into a structure. However, lenses made of plastic, to which such functional groups are introduced, are insufficient in heat resistance, and thus an enhancement in productivity due to a reduction in the number of mounting steps as in collective mounting of electronic components in a solder reflow furnace described in Patent Document 3 cannot be realized. Lens materials are also demanded to have stable optical characteristics maintained against the surrounding environment, but it is known as described in Non-Patent Document 3 that a lens, which absorbs moisture, is changed in wavefront aberration due to non-uniform refractive index distribution, and thus there is a need for a material low in hygroscopicity.

As measures for solving such problems, there has been proposed an optical member, the material of which is a polyorganosiloxane having a high degree of freedom in design and enabling various functions to be possessed.

For example, Patent Document 4 discloses a polyorganosiloxane having a cycloalkyl group modified, and proposes a silicone resin lens which achieves a high refractive index and a high Abbe's number as optical characteristics due to an effect by introduction of such an alicyclic olefin.

Patent Document 5 discloses an addition curing silicone resin composition including a polyorganohydrogensiloxane having a silphenylene backbone (—Si—$C_6H_4$—Si—) in its molecular chain, and proposes a sealing material for optical members, having a high Abbe's number and having a high brightness.

On the other hand, Patent Document 3 proposes, as a lens material adapted to a collective mounting system of a lens module, an organic-inorganic composite having a cage-type silsesquioxane structure as a raw material.

In electrolytic capacitors, a so-called valve metal on which an insulating oxide film layer made of aluminum, tantalum, and the like can be formed is used for an anode, and such a valve metal whose surface is subjected to anodization or the like to thereby allow the insulating oxide film to be formed as a dielectric layer is used for an anode electrode. One example thereof, generally known, is a winding-type element structure illustrated in FIG. 1, in which an anode electrode foil (1) and a cathode electrode foil (2) are disposed opposite to each other and a separator (3) is interposed between the anode electrode foil and the cathode electrode foil and thus is allowed to retain an electrolytic solution. The structure is placed in a packaging case (5) made of a material such as aluminum, as illustrated in FIG. 2, in which the case is tightly sealed by use of a sealing plate (7) made of a phenol resin laminate, polypropylene, polyphenylene sulfide, or the like with a rubber seal (6) made of butyl rubber, ethylene-propylene rubber, silicone rubber, or the like being interposed.

An aluminum electrolytic capacitor with aluminum oxide as a dielectric includes an anode electrode usually etched for an increase in surface area. An electrolytic solution is in close contact with a concave-convex surface of the anode electrode, and thus functions as a substantial cathode which transmits the electric field of a cathode electrode. Thus, the electric conductivity, temperature characteristics, and the like of the electrolytic solution serve as factors for determination of electrical characteristics [impedance, dielectric loss (tan δ), equivalent series resistance (ESR), and the like] of the electrolytic capacitor. The electrolytic solution is also demanded to serve to repair degradation and damage of an insulating oxide film, and such degradation and damage affect the leakage current (LC) and lifetime characteristics of the electrolytic capacitor. Thus, the electrolytic solution is an important constituent component which affects characteristics of the electrolytic capacitor.

Since the electric conductivity of an electrolytic solution is directly associated with the energy loss, impedance characteristics, and the like of an electrolytic capacitor, an electrolytic solution having a high electric conductivity is preferable. On the other hand, there is demanded, according to an increased need for safety, an electrolytic capacitor which has a higher withstand voltage so that neither a short circuit, nor ignition is caused even in a severe condition where an abnormal voltage exceeding a rated voltage is applied to such an electrolytic capacitor. However, an increased electric conductivity of an electrolytic solution to be used generally tends to lead to a reduced withstand voltage of an electrolytic capacitor, thereby making development of an electrolytic capacitor difficult (Non-Patent Document 4).

In order that even use of an electrolytic solution having a high electric conductivity allows a high withstand voltage to be obtained and further allows temperature characteristics and high reliability in long-term use to be obtained, it is known to add a silane coupling agent, a silane coupling agent oligomer, modified silicone, or the like as an additive of the electrolytic solution (Patent Documents 6 to 8).

A technique is also proposed where a silica colloid particle is added to an electrolytic solution to result in an increase in withstand voltage with a high electric conductivity of the electrolytic solution being kept (Patent Documents 9 to 11).

PRIOR ART REFERENCES

Patent Documents

Patent Document 1: JP-A No. 2015-129288
Patent Document 2: JP-A No. 2012-233174
Patent Document 3: JP-A No. 2011-158797
Patent Document 4: JP-A No. 2012-8201
Patent Document 5: JP-A No. 2015-101645
Patent Document 6: JP-A No. H03-257811
Patent Document 7: JP-A No. H06-310378
Patent Document 8: JP-A No. H01-245508
Patent Document 9: JP-A No. H01-232713
Patent Document 10: JP-A No. H06-151250
Patent Document 11: JP-A No. 2003-203827

Non-Patent Documents

Non-Patent Document 1: Norihisa TANIO, "Refractive Index Prediction System of Transparent Resin", Journal of Network Polymer, Vol. 30 No. 1, pages 33 to 40, 2009
Non-Patent Document 2: Takashi OKADA, "Synthesis and Properties of Sulfur-containing Cyclic Polyolefin", TOSOH Research & Technology Review Vol. 52 (2008), pages 11 to 18
Non-Patent Document 3: Masaya KOBAYASHI, "Simulation on Moisture Absorption in a Plastic Objective", KONICA TECHNICAL REPORT VOL. 3 January (1990) Vol. 3 pages 74 to 80
Non-Patent Document 4: Ue et al., New Capacitor, Vol. 3, page 55, 1996

DISCLOSURE OF THE INVENTION

Problems to be Solved by the Invention

While the polyorganosiloxane disclosed in Patent Document 1 is a polyorganosiloxane improved in not only heat resistance, light resistance, and chemical stability, but also moldability and the like, no studies have been made about mechanical properties such as elastic modulus and hardness, and flash point.

While the silsesquioxane disclosed in Patent Document 2 is suitable for sealing of a semiconductor and the like and studies about hardness are made, the studies made about hardness are insufficient and no studies have also been made about flash point.

Moreover, the polyorganosiloxane having a polyhedral structure, as described in Patent Document 1 and Patent Document 2, is often generally a solid, and has a very high viscosity even in the case of being a liquid.

A first object of the present invention is to provide a new polyorganosiloxane focused on mechanical properties, flash point, linear expansion coefficient, viscosity, and the like, unlike any polyorganosiloxanes already proposed.

It is obvious that the polyorganosiloxane disclosed in Patent Document 3 has a cyclohexyl group in its structure and thus has a high refractive index and a high Abbe's number as in Non-Patent Document 1, and there is no description about an enhancement in Abbe's number due to a (meth)acryloyl group and there is also no indication about any evaluation of simulation of a solder reflow step.

Patent Documents 4 and 5 also provide no description about an enhancement in Abbe's number due to a (meth) acryloyl group, and no indication about any evaluation of simulation of a solder reflow step. Furthermore, both such compounds correspond to materials which have a complicated structure, which are produced in a complicated manner, which are not high in productivities such as yield and extraction rate, and which are inconsistent with an enhancement in objective productivity for adoption of a plastic lens.

A second object of the present invention is to provide a material which achieves a high refractive index, a high Abbe's number and a low hygroscopicity due to a new polyorganosiloxane modified by a (meth)acryloyl group, and to provide a material which is a cured product of the polyorganosiloxane and an acrylic resin mixed and which can withstand collective mounting in a solder reflow step, unlike any procedures already proposed.

A third object of the present invention is to produce the polyorganosiloxane at high productivity.

An effect of use of a silane coupling agent as an additive is considered to allow a layer of a silicon compound obtained from the silane coupling agent to suppress a hydration reaction on the surface of an oxide film of an electrode, resulting in suppression of a reduction in electrostatic capacitance. However, such a silane coupling agent usually has a low molecular weight to thereby hardly form a sufficient crosslinked structure, and thus a problem is that the effect of protecting the surface of an electrode is low and no leakage current can be suppressed in use at high temperatures.

A study for improvement of the problem has been made where the silane coupling agent is formed into an oligomer to allow a protective layer to be uniformly formed, resulting in an enhancement in stability at high temperatures, but such a study has not been still sufficient.

While an electrolytic solution to which modified silicone or the like is added is excellent in solubility and stability in the solvent of the electrolytic solution, the structure of a silicone moiety is linear and a problem is that a layer which can protect an electrode is hardly obtained and the withstand voltage is low.

While an electrolytic solution containing a silica colloid particle is high in the initial withstand voltage, the electrolytic solution is problematic in long-term lifetime, for example, is reduced in withstand voltage during a lifetime test. One reason for this is because the silica colloid is inferior in dispersing stability in the solvent of the electrolytic solution and causes gelation. Accordingly, it is necessary to select a solvent favorable in dispersing stability or solubility of the silica colloid, and as a result, a problem is that the solvent usable in the electrolytic solution is limited.

A fourth object of the present invention is to provide not only an electrolytic solution for an electrolytic capacitor, where the above problems are solved, but also an electrolytic capacitor using the electrolytic solution.

Means for Solving the Problems

The present inventors have made intensive studies in order to solve the first object, and as a result, have focused on the flash point and the viscosity of a polyorganosiloxane having a reactive functional group, and mechanical properties and the linear expansion coefficient of a cured product obtained by curing, and thus have found that the rate of weight loss in heating is equal to or less than a certain value to result in a remarkable increase in flash point and a reduction in linear expansion coefficient of the cured product, and that the amount of a curable functional group falls within a specific range to result in a remarkable enhancement in strength of the cured product. The inventors have also found that the maximum absorption wavenumber in a specific wavenumber range in infrared absorption spectrum analysis has a large effect on the viscosity of the polyorganosiloxane, thereby leading to completion of the present invention.

That is, a first aspect of the present invention is as follows.
(A1) A polyorganosiloxane including an M unit $(R^1R^2R^3SiO_{1/2})$ at a content of 10% by mol or more relative to the total of silicon and a T unit $(R^6SiO_{3/2})$ at a content of 80% by mol or less relative to the total of silicon, the polyorganosiloxane having an alkoxy group bound to silicon, and a reactive functional group bound to silicon, other than an alkoxy group, wherein the polyorganosiloxane has the alkoxy group bound to silicon at a content of 0.07 to 4% by weight based on the total weight of the polyorganosiloxane and has 3 to 12 of the reactive functional groups bound to silicon on a number basis per a molecular weight of 1000 of the polyorganosiloxane, and a weight loss of the polyorganosiloxane in heating at 110° C. under a reduced pressure of 0.15 torr for 2 hours is 5% by weight or less, provided that $R^1$, $R^2$, $R^3$, and $R^6$ are each independently an organic functional group other than an alkoxy group and a hydroxyl group, or a hydrogen atom, and are optionally the same or different from one another.
(A2) The polyorganosiloxane according to (A1), wherein the content of the M unit relative to the total of silicon is 60% by mol or less.
(A3) A polyorganosiloxane essentially including a Q unit represented by $(SiO_{4/2})$, the polyorganosiloxane having a reactive functional group bound to silicon, other than an alkoxy group, wherein the polyorganosiloxane has 3 to 12 of the reactive functional groups bound to silicon on a number basis per a molecular weight of 1000 of the polyorganosiloxane, a maximum absorption wavenumber of a Si—O stretching vibration is found in the wavenumber range from 1030 to 1060 cm$^{-1}$ in infrared absorption spectrum analysis, and a weight loss of a polyorganosiloxane component in heating at 110° C. under a reduced pressure of 0.15 torr for 2 hours is 5% by weight or less.
(A4) The polyorganosiloxane according to any of (A1) to (A3), wherein the content of the M unit relative to the total of silicon is 10% by mol or more and 60% by mol or less.
(A5) A polyorganosiloxane represented by the following general formula (101), wherein a maximum absorption wavenumber of a Si—O stretching vibration is found in the wavenumber range from 1030 to 1060 cm$^{-1}$ in infrared absorption spectrum analysis, and a weight loss of the polyorganosiloxane in heating at 110° C. under a reduced pressure of 0.15 torr for 2 hours is 5% by weight or less:

$(R^{101}R^{102}R^{103}SiO_{1/2})_{M1}(R^{104}R^{105}R^{106}SiO_{1/2})_{M2}$ $(R^{107}R^{108}SiO_{2/2})_{D1}(R^{109}R^{106}SiO_{2/2})_{D2}$ $(R^{110}SiO_{3/2})_{T1}(R^{106}SiO_{3/2})_{T2}(SiO_{4/2})_{Q}$ $(O_{1/2}R^{110})_{Y1}(O_{1/2}R^{106})_{Y2}$ (101)

in the general formula (101),
$R^{101}$ to $R^{105}$, and $R^{107}$ to $R^{110}$ are each independently a group selected from an organic functional group, a reactive functional group, or a hydrogen atom, and each $R^{106}$ is an organic group containing a reactive functional group and optionally the same or different, provided that such $R^{106}$ is a reactive functional group different from $R^{101}$ to $R^{105}$, and $R^{107}$ to $R^{110}$,
$R^{110}$ is a group that includes no reactive functional group and that is selected from an organic group having 1 to 20 carbon atoms, and a hydrogen atom,
factors M1, D1, T1, and Q are each 0 or more and less than 0.6,
M1+M2>0 and T1+T2+Q>0 are satisfied,
M2+D2+T2>0.25 and M1+M2+D1+D2+T1+T2+Q=1 are satisfied, and
factors Y1 and Y2 are each 0 or a positive value.
(A6) The polyorganosiloxane according to any of (A1) to (A5), wherein the reactive functional group bound to silicon, or $R^{106}$ includes at least one group selected from the group consisting of an alkenyl group, a methacryloyl group, an acryloyl group, an acyl group, and a cyclic ether group, and a hydrogen atom taken together with silicon to form a hydrosilyl group.
(A7) The polyorganosiloxane according to any of (A1) to (A6), wherein the reactive functional group is a vinyl group.
(A8) The polyorganosiloxane according to any of (A1) to (A6), wherein the reactive functional group, or an organic group $R^{106}$ has one or more functional groups selected from the group represented by the following structural formulae [2], [3], [4] and [5], in one molecule:

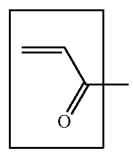

[2]

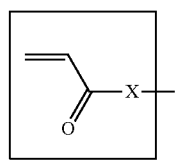

[3]

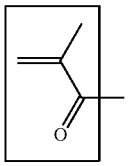

[4]

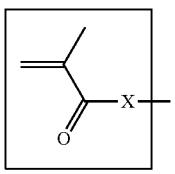

[5]

provided that X in the formulae is a divalent organic functional group optionally including a branched structure and/or a cyclic structure, X, when bound to a silicon atom, has a carbon atom as an atom directly bound to the silicon at an end of X, and X, when bound to an oxygen atom directly bound to silicon, has a carbon atom as an atom directly bound to the oxygen atom at an end of X.

(A9) The polyorganosiloxane according to (A8), wherein the reactive functional group, or $R^{106}$ has one or more functional groups selected from a (meth)acryloyloxypropyl group or a (meth)acryloyloxyoctyl group, in one molecule.

(A10) The polyorganosiloxane according to any of (A1) to (A9), wherein the polyorganosiloxane is a liquid at 40° C.

(A11) The polyorganosiloxane according to any of (A1) to (A10), having a viscosity at 25° C., of 5 mPa·s or more and 20000 mPa·s or less.

(A12) The polyorganosiloxane according to any of (A1) to (A11), having a number average molecular weight Mn of 600 or more and 5000 or less, as a GPC measurement result in terms of polystyrene.

(A13) The polyorganosiloxane according to any of (A1) to (A12), wherein the M unit or $(R^{101}R^{102}R^{103}SiO_{1/2})$ includes at least a trimethylsiloxy group or a dimethylsiloxy group.

(A14) The polyorganosiloxane according to any of (A1) to (A13), wherein the polyorganosiloxane is an MQ resin.

(A15) The polyorganosiloxane according to any of (A1) to (A14), the polyorganosiloxane is an MTQ resin.

(A16) A composition containing the polyorganosiloxane according to any of (A1) to (A15).

(A17) A cured product obtained by curing any of the polyorganosiloxane according to any of (A1) to (A15), or the composition according to (A16).

The present inventors have also made intensive studies in order to solve the second object and the third object, and as a result, have found that a certain amount or more of an organic group containing a (meth)acryloyl group in a polyorganosiloxane is modified to thereby allow a certain cured product obtained by polymerization of the (meth)acryloyl group to achieve not only an increase in refractive index, but also an increase in Abbe's number, as a finding that reverses the common sense of a reduced Abbe's number due to an increased refractive index. The present inventors have further found that a polyorganosiloxane high in refractive index and high in Abbe's number is low in hygroscopicity. While a polyorganosiloxane small in the amount of modification of a (meth)acryloyl group is separated from an acrylic resin and is inferior in compatibility therewith, even if mixed therewith, the polyorganosiloxane of the present invention is superior in compatibility and enables a cured product which is transparent and which is not clouded to be obtained. Furthermore, the polyorganosiloxane can be enhanced in glass transition temperature as compared with an acrylic resin before mixing, and is thus a material having solder reflow resistance. Additionally, the inventors have conceived that the polyorganosiloxane of the present invention can be obtained with a versatile raw material for a raw material, has no need for formation of any special structure such as a cage-type silsesquioxane, and thus is high in productivity, thereby leading to completion of the present invention.

That is, a second aspect of the present invention is as follows.

(B1) A polyorganosiloxane which is the polyorganosiloxane according to any of (A1) to (A15), wherein M2+D2+T2≥0.4 is satisfied, and the reactive functional group is an organic group containing a (meth)acryloyl group.

(B2) The polyorganosiloxane according to (B1), wherein the factor M1 is more than 0.

(B3) The polyorganosiloxane according to (B1) or (B2), wherein the factor Q is more than 0.

(B4) The polyorganosiloxane according to any of (B1) to (B3), wherein the factor M1 is 0.09 or more and 0.5 or less, and the factor Q is 0.04 or more and 0.4 or less.

(B5) The polyorganosiloxane according to any of (B1) to (B4), wherein the factor Y1 is 0 or more and 0.25 or less.

(B6) The polyorganosiloxane according to any of (B1) to (B5), wherein the factor Y1 is 0.01 or more and 0.1 or less.

(B7) The polyorganosiloxane according to any of (B1) to (B6), wherein $R^{101}$ to $R^{105}$, and $R^{107}$ to $R^{110}$ are each independently a methyl group.

(B8) The polyorganosiloxane according to any of (B1) to (B7), having a viscosity 25° C. of 10 to 100,000 mPa·s.

(B9) A polyorganosiloxane composition including the polyorganosiloxane according to any of (B1) to (B8), and a (meth)acrylate compound containing a (meth) acryloyl group and/or a polymer obtained by polymerization of a (meth)acryloyl group thereof.

(B10) The polyorganosiloxane composition according to (B9), further including a polymerization initiator.

(B11) A cured product obtained by curing of the polyorganosiloxane composition according to (B10).

(B12) An optical member including the polyorganosiloxane composition according to (B9) or (B10), or the cured product according to (B11).

The present inventors have further made intensive studies in order to solve the fourth object, and as a result, have found that a polyorganosiloxane having a specific structure modified by a reactive functional group is excellent in solubility in various solvents and is also high in stability of an electrolytic solution thereof, and can allow an electrolytic capacitor achieving a high withstand voltage to be realized, thereby leading to completion of the present invention.

That is, a third aspect of the present invention is as follows.

(C1) An electrolytic solution for an electrolytic capacitor, the electrolytic solution including a polyorganosiloxane represented by the following compositional formula (201):

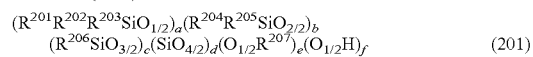

(201)

in the formula (201), $R^{201}$ to $R^{206}$ are each independently a hydrocarbon group having 1 to 10 carbon atoms, a group having a reactive functional group, or a hydrogen atom, and $R^{207}$ is an organic group having 1 to 8 carbon atoms, provided that at least one of $R^{201}$ to $R^{206}$ is a group having a reactive functional group, or a hydrogen atom, that the reactive functional group is optionally directly bound to silicon or bound with having a linking group other than a siloxane bond, and that $a+b+c+d=1$, $a\geq0.1$, $b\leq0.5$, $c+d\geq0.1$, and $e+f\leq1.0$ are satisfied.

(C2) An electrolytic solution for an electrolytic capacitor, the electrolytic solution including a polyorganosiloxane, wherein the polyorganosiloxane is the polyorganosiloxane according to any of (A1) to (A15).

(C3) An electrolytic solution for an electrolytic capacitor, the electrolytic solution including a polyorganosiloxane, wherein the polyorganosiloxane is the polyorganosiloxane according to any of (B1) to (B8).

(C4) The electrolytic solution for an electrolytic capacitor according to any of (C1) to (C3), wherein the reactive functional group is at least one group selected from the group consisting of an alkenyl group, a methacryloyl group, an acryloyl group, an acyl group, a cyclic ether group, a hydroxyl group, an acetoxy group, a monohydroxysilyl group, a dihydroxysilyl group, a trihydroxysilyl group, a monoalkoxysilyl group, a dialkoxysilyl group, and a trialkoxysilyl group, and a hydrogen atom taken together with silicon to form a hydrosilyl group.

(C5) The electrolytic solution for an electrolytic capacitor according to any of (C1) to (C4), wherein the number of the reactive functional groups per a molecular weight of 1000 of the polyorganosiloxane is 3 to 12.

(C6) The electrolytic solution for an electrolytic capacitor according to any of (C1) to (C5), wherein the polyorganosiloxane has a number average molecular weight Mn of 600 or more and 50000 or less, as a GPC measurement result in terms of polystyrene.

(C7) The electrolytic solution for an electrolytic capacitor according to any of (C1) to (C6), including ethylene glycol and/or γ-butyrolactone.

(C8) The electrolytic solution for an electrolytic capacitor according to any of (C1) to (C7), including organic acid and/or inorganic acid onium salt(s).

(C9) An aluminum electrolytic capacitor where an anode, a cathode including aluminum, and the electrolytic solution according to any of (C1) to (C8) are used.

Effect of the Invention

The present inventors have focused on the flash point and the viscosity of a polyorganosiloxane having a reactive functional group, and mechanical properties and the linear expansion coefficient of a cured product obtained by curing, and as a result, have found that the rate of weight loss in heating is equal to or less than a certain value to result in a remarkable increase in flash point and a reduction in linear expansion coefficient of the cured product, and that the amount of a curable functional group falls within a specific range to result in a remarkable enhancement in mechanical characteristics of the cured product. The inventors have also found that the maximum absorption wavenumber in a specific wavenumber range in infrared absorption spectrum analysis has a large effect on the viscosity of the polyorganosiloxane, thereby leading to completion of the present invention.

The first aspect of the present invention provides a polyorganosiloxane which is high in flash point before curing and small in temperature dependence of elastic modulus after curing, and which allows a cured product less in weight loss in heating to be obtained. Since a polyorganosiloxane low in flash point may be difficult to safely handle in normal conditions, and therefore is classified as a higher-risk class in classification of hazardous materials according to the Fire Service Act and thus is increased in cost in storage and transportation, it is very advantageous to obtain a polyorganosiloxane high in flash point. Moreover, a low linear expansion coefficient of a cured product is equivalent to stable performances exhibited in a wide temperature range, and furthermore imparts excellent mechanical properties and thus high contribution to reliability of commercial products. Furthermore, a small weight loss in heating, of a cured product, hardly causes a decrease in thickness in heating or hardly causes embrittlement or the like due to change over time.

The first aspect of the present invention provides a polyorganosiloxane low in viscosity. Such a low viscosity is expected to allow for not only a remarkable enhancement in handleability and a remarkable enhancement in the degree of freedom of a process, but also a significant decrease in the time taken for weighing, mixing, and molding, and furthermore a decrease in the time taken for washing and further a decrease in the amount of a cleaning agent. A cured product significantly enhanced in thermal shock resistance can withstand more processes than conventional one, and is remarkably enhanced in the degree of freedom in process design.

The second aspect of the present invention can provide an organosiloxane containing a (meth)acryloyl group in its structure, thereby allowing a cured product to be easily obtained by a polymerization initiator, and can provide a polyorganosiloxane suitable as an optical member for lenses because such a cured product can be high in optical characteristics, in particular, high in refractive index and Abbe's number, and can also be low in moisture absorptivity and linear expansion coefficient. The polyorganosiloxane of the present invention can be used singly or as a mixture with other resin, particularly preferably an acrylic resin, and one according to an optimal mode of the present invention can be used particularly as a plastic lens having solder reflow resistance.

The present inventors have further found that a polyorganosiloxane having a specific structure modified by a functional group is excellent in solubility in various solvents and is also high in stability of an electrolytic solution thereof, and can allow an electrolytic capacitor achieving a high withstand voltage to be realized.

Although the reason for this is not clear, it is considered that the polyorganosiloxane having a specific structure of the present invention has an M unit, and a T unit and/or a Q unit and does not have an excessive amount of a D unit in its structure, and can have a structure having appropriate cross-linked structure, branched structure, and/or cyclic structure, allow a protective layer of an electrode to be high in strength and uniformity, and impart a high withstand voltage. While a general polyorganosiloxane is very low in polarity, and thus is low in compatibility with a solute and a solvent in an electrolytic solution, as it is, and is aggregated and/or separated, a polyorganosiloxane modified by a reactive functional group can be increased in solubility in various organic solvents for use in an electrolytic solution and therefore can be used in any electrolytic solution. It is also considered that a condensation reaction of a hydroxysilyl group with an alkoxysilyl group, a reaction and/or interaction of a hydroxysilyl group and an alkoxysilyl group with a reactive functional group, and a reaction and/or interaction of a hydroxysilyl group and an alkoxysilyl group with a reactive functional group and an electrode surface allow strength of a protective layer of an electrode and also a binding force to an electrode to be further increased, and impart a high withstand voltage. The third aspect of the present invention provides an electrolytic solution for an electrolytic capacitor, including a polyorganosiloxane which is excellent in solubility in various solvents, which is high in stability of an electrolytic solution thereof, and which imparts a high withstand voltage, and an electrolytic capacitor using the electrolytic solution.

MODE FOR CARRYING OUT THE INVENTION

Figure 1:
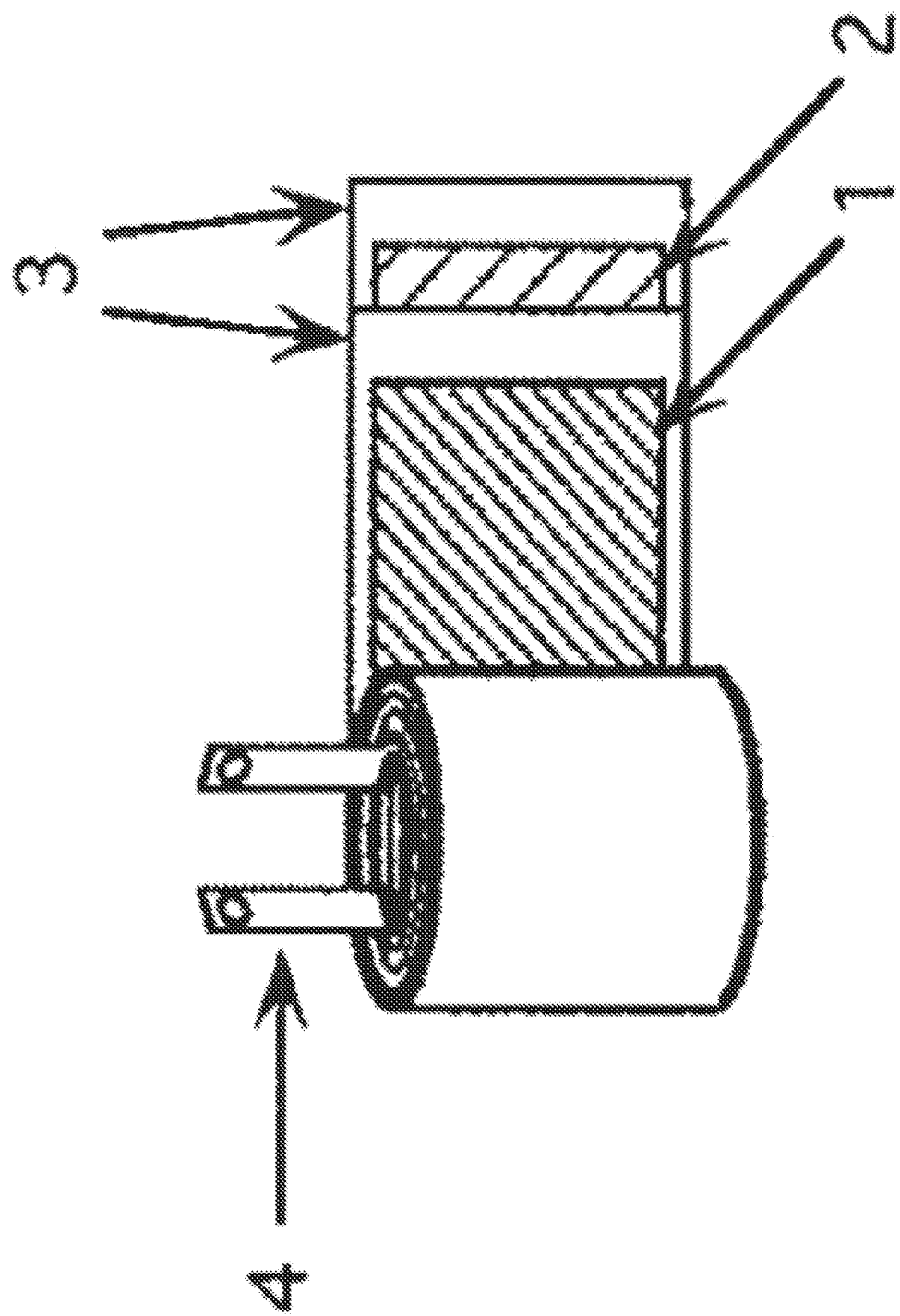
FIG. 1 is an explanation view illustrating one example of the structure of the center portion of a winding-type electrolytic capacitor.

Hereinafter, embodiments of the present invention will be described, but the present invention is not intended to be limited to the following embodiments and can be variously modified and carried out without departing from the gist thereof.
(Polyorganosiloxane)

A polyorganosiloxane is a polymer having a siloxane bond as a main chain, and is represented by, for example, the following general formula (1).

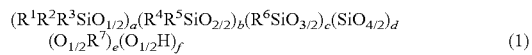
(1)

In the formula (1), $R^1$ to $R^6$ are independently selected from an organic functional group and a hydrogen atom, and a+b+c+d=1 is satisfied. $R^7$ is selected from an organic group having 1 to 7 carbon atoms.

One polyorganosiloxane according to the present embodiment is a polyorganosiloxane including an M unit $(R^1R^2R^3SiO_{1/2})$ at a content of 10% by mol or more relative to the total of silicon and a T unit $(R^6SiO_{3/2})$ at a content of 80% by mol or less relative to the total of silicon, the polyorganosiloxane having an alkoxy group bound to silicon, and a reactive functional group bound to silicon, other than an alkoxy group, wherein the polyorganosiloxane has the alkoxy group bound to silicon at a content of 0.07 to 4% by weight based on the total weight of the polyorganosiloxane and has 3 to 12 of the reactive functional groups bound to silicon on a number basis per a molecular weight of 1000 of the polyorganosiloxane, and the weight loss of the polyorganosiloxane in heating at an internal temperature of 110° C. under a reduced pressure of 0.15 torr for 2 hours is 5% by weight or less (hereinafter, sometimes referred to as "polysiloxane A"). Another polyorganosiloxane according to the present embodiment is a polyorganosiloxane essentially including a Q unit represented by $(SiO_{4/2})$, and having a reactive functional group bound to silicon, wherein the polyorganosiloxane has 3 to 12 of the reactive functional groups bound to silicon on a number basis per a molecular weight of 1000 of the polyorganosiloxane, a maximum absorption wavenumber of a Si—O stretching vibration is found in the wavenumber range from 1030 to 1060 cm$^{-1}$ in infrared absorption spectrum analysis, and the weight loss of a polyorganosiloxane component in heating at 110° C. under a reduced pressure of 0.15 torr for 2 hours is 5% by weight or less (hereinafter, sometimes referred to as "polysiloxane B").

The reactive functional group bound to silicon in each of such polyorganosiloxanes is not limited to any group directly bound to silicon, and means a reactive functional group-containing group bound to silicon, preferably one directly bound to silicon.

In the general formula (1) in the polyorganosiloxane A, a representing the percentage of the M unit is 0.1 or more, preferably 0.2 or more. In addition, a is less than 1, preferably 0.6 or less, more preferably 0.3 or less. Preferably, a is 0.1 or more, namely, the percentage of the M unit is equal to or less than a proper upper limit value, because the molecular weight of the polyorganosiloxane is easily controlled, more specifically, not only the molecular weight can easily fall within a proper range which is not too low, but also a low-boiling point component can be inhibited from being increased to thereby allow a reduction in flash point to be prevented.

In the general formula (1), c representing the T unit percentage is 0 or more, preferably 0.15 or more, more preferably 0.4 or more, and the upper limit of c is 0.8 or less, preferably 0.65 or less. Preferably, c in the formula (1) falls within the range, because a cured product obtained by curing of the polyorganosiloxane A has appropriate rigidity. In addition, preferably, the value of c is 0.8 or less, because the viscosity of the polyorganosiloxane is easily kept in a range which allows for easy handling and a cured product is improved in brittleness.

The polyorganosiloxane A may include a Q unit represented by $(SiO_{4/2})$ namely, d in the formula (1) is preferably 0 or more, and preferably 0.7 or less, more preferably 0.5 or less. Preferably, d in the general formula (1) falls within the range, because the viscosity of the polyorganosiloxane is prevented from being too high, and a cured product obtained by curing of the polyorganosiloxane A has appropriate rigidity. The polyorganosiloxane A may also include a D unit represented by $(R^4R^5O_{2/2})$, namely, b in the general formula (1) can be 0 or more, and is preferably 0.3 or less, more preferably 0.1 or less. Such a range allows the cured product to easily keep high rigidity.

That is, the polyorganosiloxane A may be an MQ resin including the M unit and the Q unit, an MT resin including the M unit and the T unit, an MDT resin including the M unit, the D unit and the T unit, an MDQ resin including the M unit, the D unit and the Q unit, an MTQ resin including the M unit, the T unit and the Q unit, or an MDTQ resin including the M unit, the D unit, the T unit and the Q unit. In the case where the MTQ resin is formed into a composition for the purpose of use in various applications, the MT resin is preferably included at a content of 60% by weight or less based on the total amount of the polyorganosiloxane composition. The MT resin can be contained in a proper amount, thereby imparting appropriate flexibility.

It is noted that the polyorganosiloxane A, if including only the M unit and the D unit where the M unit is included at a content of more than 10% by mol relative to the total of silicon, namely, where a exceeds 0.1, b is more than 0, and c and d are 0 in the formula (1), is not encompassed in the present invention because there are caused a low boiling point and a large weight loss in heating at an internal temperature of 110° C. under a reduced pressure of 0.15 torr for 2 hours.

The content of the alkoxy group bound to silicon in the polyorganosiloxane A based on the total weight of the polyorganosiloxane A is 0.07% by weight or more, preferably 0.5% by weight or more, and 4% by weight or less, preferably 2% by weight or less. The polyorganosiloxane A, which contains the alkoxy group at any content in the range, is not a solid, but a liquid, and exhibits appropriate fluidity, because a molecule of the polyorganosiloxane A is inhibited from aggregating due to steric repulsion of the alkoxy group. Accordingly, mixing with other resin or the like is facilitated, and the advantage of a significant enhancement in productivity in production of the composition is obtained. A too small amount of the alkoxy group as compared with the lower limit value defined in the present invention may cause the viscosity to be too high and/or cause the polyorganosiloxane A to be in the form of a solid, thereby not resulting in the advantage of an enhancement in productivity. On the other hand, a lower content of the alkoxy group than the upper limit value is preferable in terms of safety and health of operators because stability in long-term storage is enhanced and a phenomenon where the alkoxy group is desorbed by heating to generate an alcohol is inhibited from occurring. Moreover, the alkoxy group is hardly desorbed in heating of the cured product, thereby hardly causing embrittlement of the cured product due to a decrease in thickness to occur. This also hardly causes embrittlement over time to occur.

Herein, the type of the alkoxy group is not particularly limited, and is preferably, for example, a methoxy group, an ethoxy group, or an isopropoxy group.

The polysiloxane A is a polysiloxane having a reactive functional group bound to silicon, other than an alkoxy group, in which the number of such reactive functional groups bound to silicon per a molecular weight of 1000 of the polyorganosiloxane A is 3 or more, more preferably 4 or more as the lower limit value, and is preferably 12 or less, more preferably 9 or less as the upper limit. The number of such reactive functional groups is the lower limit value or more, easily resulting in an enhancement in strength of a cured product obtained by curing of polysiloxane. On the other hand, the number of such reactive functional groups is the upper limit value or less, resulting in an improvement in brittleness of a cured product obtained by curing of polysiloxane.

(Determination of Number of Reactive Functional Groups Per Molecular Weight of 1000)

The content of the alkoxy group bound to silicon in the polyorganosiloxane, and the number of the reactive functional groups bound to silicon per a molecular weight of 1000 are calculated as follows. The number of trimethylsiloxy groups per a molecular weight of 1000 can also be measured in the same manner.

Weighed is 50 mg of a polyorganosiloxane for measurement, and 15 mg of toluene is added and precisely weighed as an internal standard. Furthermore, 1 g of deuterochloroform is placed and dissolved, and Relaxation Delay in 400 MHz $^1$H-NMR (AL-400 manufactured by JEOL Ltd.) is set to 20 seconds for measurement. The ratio of the signal intensity of each component and the signal intensity of toluene as the internal standard, and the values weighed are used to calculate the content of the alkoxy group, and the content of the reactive functional group per gram (mmol/g), namely, the number of the reactive functional groups per a molecular weight of 1000 of the polyorganosiloxane. Here, impurities such as an organic substance, water, and a metal not bound to the polyorganosiloxane are needed to be removed to amounts of less than 0.1% by weight so as not to affect any measurement results. In the case where such impurities are present in amounts of more than 0.1% by weight, these are removed by distillation, filtration, and/or other purification method, and thereafter a sample is prepared and subjected to $^1$H-NMR measurement. In the case where such removal is difficult, the resulting difference obtained by calculating the content of the impurities by $^1$H-NMR measurement and/or other analysis method and subtracting the weight of the impurities from the weight of the sample weighed, so that the impurities are not subjected as a part of the polyorganosiloxane to calculation, is used as the true amount of the sample. Herein, the internal standard which can be used is any substance such as not only toluene, but also N,N-dimethylformamide or tribromoethane, provided that such a substance does not react with the polyorganosiloxane.

The weight loss of the polyorganosiloxane A in heating at an internal temperature of 110° C. under a reduced pressure of 0.15 torr for 2 hours is 5% by weight or less, preferably 3% by weight or less. The weight loss in the conditions can be equal to or less than the above upper limit value, thereby allowing the flash point of the polyorganosiloxane to be kept relatively high. Thus, a risk due to a low flash point, where safe handling in normal conditions is difficult, can be avoided, and thus classification as a lower-rink class in classification of hazardous materials according to the Fire Service Act can be made, also resulting in a decrease in cost in storage and transportation. Moreover, the weight loss in curing and the weight loss of a cured product can be decreased, thereby resulting in advantages such as expansion of the range of a usable temperature due to a small temperature dependence of the storage elastic modulus of a cured product, and hard occurrence of embrittlement due to a decrease in thickness.

The weight loss in heating under reduced pressure can be measured as follows.

$^1$H-NMR measurement is conducted to calculate the weight of each component other than the polyorganosiloxane, such as an organic solvent. A rotor is placed in an eggplant flask, and the total weight of both is measured. Thereafter, the polyorganosiloxane is placed in the eggplant flask, and the weight of the polyorganosiloxane is measured. The eggplant flask is heated in an oil bath, stirring is made by rotation of the rotor by a magnetic stirrer to some extent that the liquid surface is allowed to flow, and pressure reduction is made by an oil system vacuum pump. After 2 hours, cooling to room temperature and returning to ordinary pressure are made, any oil attached to the eggplant flask is sufficiently wiped, and the weight of the polyorganosiloxane placed in the eggplant flask is measured and the total weight of both the eggplant flask and the rotor measured in advance is subtracted therefrom, thereby allowing the weight of volatilization due to the above operation to be calculated. The polyorganosiloxane after the above operation is subjected to $^1$H-NMR measurement, and the weight of each component other than the polyorganosiloxane, such as an organic solvent, is calculated. The measurement results of the amount of weight loss and $^1$H-NMR before and after the operation, and the weight of volatilization are used to calculate the amount of each component other than the polyorganosiloxane and the amount of the polyorganosiloxane volatilized. Alternatively, the total amount of any distillate liquid volatilized may also be recovered by cold trap, or the like and subjected to measurement of the weight and $^1$H-NMR.

The present invention also encompasses the following embodiments.

According to another embodiment of the present invention, the polyorganosiloxane B includes a Q unit represented by (SiO$_{4/2}$) as an essential component. That is, the polyorganosiloxane B is represented by formula (1) where d is more than 0, preferably 0.1 or more, more preferably 0.15 or more, and d is less than 1, preferably 0.7 or less, more preferably 0.5 or less, further preferably 0.3 or less. The Q unit is included, preferably, at a content equal to or more than the lower limit value, thereby resulting in an enhancement in strength of a cured product obtained by curing. The Q unit is included at a content equal to or less than the upper limit value, thereby allowing the viscosity of the polyorganosiloxane not to be too high and allowing the cured product to be hardly embrittled.

The polyorganosiloxane B is a polysiloxane having a reactive functional group bound to silicon, other than an alkoxy group, in which the content of the reactive functional group is preferably in the same range, and the reason for this is also the same as in the polyorganosiloxane A.

The polyorganosiloxane B has a maximum absorption wavenumber of a Si—O stretching vibration in the wavenumber range from 1030 to 1060 cm$^{-1}$ in infrared absorption spectrum analysis. The polyorganosiloxane has a maximum absorption wavenumber of a Si—O stretching vibration in the wavenumber range in infrared absorption spectrum analysis, and thus can be avoided from having an extremely hardened structure as in the structure of a cage-type silsesquioxane. The maximum absorption wavenumber means a wavenumber that provides a maximum absorbance in a specific region, and the maximum absorption wavenumber is defined, in the present embodiment, as a wavenumber that provides a maximum absorbance in the wavenumber range from 1000 to 1200 cm$^{-1}$.

The maximum absorption wavenumber in infrared absorption spectrum analysis can be measured by use of a Fourier transform infrared spectroscopic apparatus according to an ATR method (Attenuated Total Reflection).

The polyorganosiloxane preferably does not have any absorption peak of Si—O stretching vibration in the wavenumber range from 1070 to 1150 cm$^{-1}$ in infrared absorption spectrum analysis. The polyorganosiloxane does not have any maximum absorption wavenumber of a Si—O stretching vibration in the wavenumber range, and thus can be avoided from having an extremely hardened structure as in the structure of a cage-type silsesquioxane. In the case of a rigid structure as in the structure of a cage-type silsesquioxane, the resulting cured product is not deformed by an external stress and serves as one rigid body, thereby resulting in less conversion into thermal energy in a resin and no decrease in repulsion force. It is noted that any characteristic absorption band derived from an organic molecule, other than that derived from Si—O, may be present in the wavenumber range from 1070 to 1150 cm$^{-1}$. Examples of such a characteristic absorption band derived from an organic molecule include those derived from C—O of a hydroxyl group, derived from C—O—C of ester, derived from C—O—C of acid anhydride, derived from C—O—C of ether, derived from C—N of amine, derived from sulfonic acid, derived from sulfoxide, derived from C—F of a fluorine compound, derived from P=O or P—O of a phosphorous compound, and derived from SO$_4^{2-}$ or ClO$_4^-$ of an inorganic salt, and such structures are known as structures high in absorption intensity. It is to be noted that attribution of those derived from such structures is not confounded with attribution of that derived from a Si—O stretching vibration.

The weight loss of the polyorganosiloxane B in heating at an internal temperature of 110° C. under a reduced pressure of 0.15 torr for 2 hours is 5% by weight or less, preferably 3% by weight or less. A large weight loss in the conditions causes the flash point of the polyorganosiloxane to be low. A low flash point may cause safe handling in normal conditions to be difficult in some cases, and classification as a higher-risk class in classification of hazardous materials according to the Fire Service Act may be caused, also resulting in an increase in cost in storage and transportation. Moreover, the weight loss in curing and the weight loss of a cured product may be increased, thereby resulting in failures such as limitation of a usable temperature due to a large temperature dependence of the storage elastic modulus of a cured product, and easy occurrence of embrittlement due to a decrease in thickness.

In the polyorganosiloxane B, a in the formula (1), which means the percentage of the M unit, is preferably 0.1 or more, more preferably 0.2 or more. In addition, a is less than 1, preferably 0.6 or less, more preferably 0.3 or less. a is equal to or more than the lower limit value, namely, the M unit is included in an appropriate amount or more, thereby enabling the molecular weight to be easily controlled and enabling the viscosity to be prevented from being too high. On the other hand, preferably, a is equal to or less than the upper limit value, namely, the percentage of the M unit falls within a range which is not too high, because the molecular weight of the polyorganosiloxane is easily controlled to fall within a proper range which is not too low, and a low-boiling point component can be inhibited from being increased to thereby allow a reduction in flash point to be prevented.

The type of the alkoxy group bound to silicon in the polyorganosiloxane A and the polyorganosiloxane B is not particularly limited, and the alkoxy group may have a branched structure and/or a cyclic structure. Use of an alkoxy group having a high molecular weight causes an increase in the weight of an alkoxy group desorbed in heating of the polyorganosiloxane or the cured product thereof, and thus an alkoxy group having a low molecular weight is preferable. Specifically, a methoxy group, an ethoxy group, a n-propoxy group, an isopropoxy group, a n-butoxy group, an isobutoxy group, a tert-butoxy group, or the like is preferable.

The type of the reactive functional group bound to silicon other than an alkoxy group in the polyorganosiloxane A and the polyorganosiloxane B is not particularly limited, the reactive functional group may include a branched structure and/or a cyclic structure and is preferably an alkenyl group, a methacryloyl group, an acryloyl group, an acyl group, a cyclic ether group, and a hydrogen atom taken together with silicon to form a hydrosilyl group from the viewpoint of reactivity, and such groups may be used singly or in combination of a plurality of kinds thereof. The alkenyl group is particularly preferably a vinyl group, the methacryloyl group is particularly preferably a methacryloyloxypropyl group, the acryloyl group is particularly preferably an acryloyloxypropyl group, and the cyclic ether group is particularly preferably a group having an epoxy group. The epoxy group which is suitably used is, for example, an epoxy group obtained by oxidation and thus conversion of a glycidyloxy group, an alicyclic epoxy group, or an alkenyl group.

As other preferable group for introduction, a phenyl group can be expected to exert the effects of an enhancement in compatibility with other resin and of adjustment of optical characteristics, for example, an increase in refractive index. Introduction of a long-chain alkyl group, specifically, an alkyl group having 5 to 30 carbon atoms, is expected to result in an enhancement in compatibility with other resin.

The present invention also encompasses the following embodiment.

A polyorganosiloxane C according to another embodiment of the present invention is a polyorganosiloxane including an essential component represented by the following general formula (101), in which a maximum absorption wavenumber of a Si—O stretching vibration is found in the wavenumber range from 1030 to 1060 cm$^{-1}$ in infrared absorption spectrum analysis and the weight loss of the polyorganosiloxane in heating at 110° C. under a reduced pressure of 0.15 torr for 2 hours is 5% by weight or less:

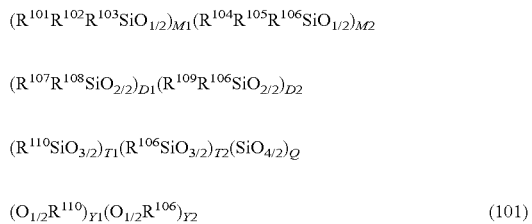

$(O_{1/2}R^{110})_{Y1}(O_{1/2}R^{106})_{Y2}$ (101)

in the formula [101], $R^{101}$ to $R^{105}$, and $R^{107}$ to $R^{110}$ are each independently a group selected from an organic functional group, a reactive functional group, and a hydrogen atom, and each $R^{106}$ is an organic group containing a reactive functional group, different from $R^{101}$ to $R^{105}$, and $R^{107}$ to $R^{110}$, and may be the same or different, $R^{110}$ is a functional group different from $R^{106}$, and is a group selected from an organic group having 1 to 20 carbon atoms, and a hydrogen atom, factors M1, D1, T1, and Q are each 0 or more and less than 0.6, M1+M2>0 and T1+T2+Q>0 are satisfied, M2+D2+T2>0.25 and M1+M2+D1+D2+T1+T2+Q=1 are satisfied, and factors Y1 and Y2 are each 0 or a positive value.

Preferably, $R^{106}$ includes no (meth)acrylic group.

Hereinafter, the general formula (101) will be described.

In the general formula (101), factors M1 and M2 each indicate the percentage of a so-called M unit having one oxygen atom bound to a silicon atom. Similarly, D1 and D2 each indicate the percentage of a D unit having two oxygen atoms bound to a silicon atom, T1 and T2 each indicate the percentage of a T unit having three oxygen atoms bound to a silicon atom, and Q indicates the percentage of a Q unit having four oxygen atoms bound to a silicon atom.

M2, D2, and T2 indicate the respective percentages of the M unit, the D unit, and the T unit where $R^{106}$, namely, an organic group containing a reactive functional group different from $R^{101}$ to $R^{105}$, and $R^{107}$ to $R^{110}$ is bound to a silicon atom.

M1+M2>0 means that the M unit is essential.

T1+T2+Q>0 means that the T unit or the Q unit is essential.

M2+D2+T2>0.25 and M1+M2+D1+D2+T1+T2+Q=1 mean that the respective percentages of the M unit, the D unit, and the T unit where $R^{106}$, namely, an organic group containing a reactive functional group different from $R^{101}$ to $R^{105}$, and $R^{107}$ to $R^{110}$ is bound to a silicon atom are more than 25% by mol based on the total of the M unit, the D unit, the T unit, and the Q unit.

Y1 means the content of an alkoxy group bound to silicon, or a silanol group.

Y2 means the content of an organic group containing a reactive functional group, which is bound to silicon and is different from $R^{101}$ to $R^{105}$, and $R^{107}$ to $R^{110}$.

It is necessary for an enhancement in compatibility with other resin, as one effect of the present invention, that the percentage of a unit having a main reactive functional group, M2+D2+T2, be more than 0.25, and the percentage is usually 0.33 or more, preferably 0.4 or more, more preferably 0.5 or more, further preferably 0.6 or more. A reactive functional group is preferably present in the M unit or the T unit from the viewpoint of an increase in the content of the reactive functional group and from the viewpoint of an enhancement in liquid storage stability, and thus M2+T2>0.25 is preferably satisfied, M2+T2 is more preferably 0.4 or more, and M2+T2 is further preferably 0.5 or more, particularly preferably 0.6 or more.

An organic group containing another reactive functional group in $R^{101}$ to $R^{105}$, and $R^{107}$ to $R^{110}$ may be included as any reactive functional group other than the main reactive functional group as long as the effects of compatibility with other resin and liquid storage stability are not impaired.

It is preferable that M1 corresponding to the percentage of an M unit having no $R^{106}$ be also present, namely, M1>0 be satisfied. The reason for this is because the alkoxy group and the silanol group of the polyorganosiloxane are substituted with the M unit to thereby allow storage stability of the polyorganosiloxane to be improved and allow the viscosity to be low, and a polyorganosiloxane where $R^{106}$ is modified by a bulk group causes an M unit less in steric hindrance to easily approach a silicon atom in substitution of the alkoxy group and the silanol group with such an M unit and thus the M unit having no $R^{106}$ is useful for substitution. $R^{101}$ to $R^{103}$ are particularly preferably each a methyl group or a hydrogen atom from the viewpoint of steric hindrance, and most preferably a methyl group from the viewpoint of storage stability. With respect to the amount of substitution, factor M1 is preferably 0.09 or more from the viewpoint of storage stability. The upper limit is usually 0.6 or less, preferably 0.5 or less, more preferably 0.4 or less.

In the present invention, an MQ resin, an MTQ resin, and an MT resin are preferable from the viewpoint of an increase in the content of the (meth)acryloyl group and from the viewpoint of an enhancement in liquid storage stability, and the D unit can also be incorporated into such resins in order to impart appropriate flexibility. D1≤0.1 is preferably satisfied, and D1≤0.05 is more preferably satisfied in order to provide a material high in elastic modulus and low in coefficient of linear expansion, and suitable as an optical material.

The Q unit is a form of silicon most oxidized, and can be included in the structure of the polyorganosiloxane to result in an enhancement in heat resistance. Accordingly, an MQ resin and an MTQ resin each having the Q unit in its structure are preferable, and the content of the Q unit is as follows: factor Q is preferably more than 0, preferably 0.04 or more, and the upper limit is usually 0.6 or less, more preferably 0.4 or less because a large amount of the Q unit causes a solid to be generated or causes the viscosity to be high, resulting in deterioration in handleability.

$(O_{1/2}R^{110})$ corresponds to an alkoxy group bound to silicon or a silanol group, and each of the groups can control the viscosity of the polyorganosiloxane and adjust the viscosity to a viscosity suitable for molding. The silanol group has an effect of increasing the viscosity, and the silanol group is replaced with the alkoxy group, thereby allowing the effect of decreasing the viscosity to be exerted.

Factor Y1 is 0 or a positive value. The range of factor Y1 is usually 0 or more, preferably 0.01 or more from the viewpoint of adjustment of a required viscosity for molding, and is usually 0.25 or less, preferably 0.2 or less, more preferably 0.1 or less from the viewpoint of storage stability and cure shrinkage.

Factor Y2 corresponds to the content of an organic group containing a (meth)acryloyl group bound to silicon, and contributes to increases in refractive index and Abbe's number and thus can be incorporated into the structure of the polyorganosiloxane. Y2>0.25 can be satisfied instead of M2+D2+T2>0.25, thereby allowing for use as a material excellent in compatibility with other resin. That is, another mode of the present invention may be a mode where the requirement of M2+D2+T2>0.25 is replaced with the requirement of Y2>0.25 in the general formula (101). It is noted that a compound where a (meth)acryloyloxy group is bound to silicon is easily hydrolyzed by water and desorbed to result in an increase in water absorption rate, and therefore is preferably used in a way so as to be hardly affected by moisture.

That is, (meth)acryloyloxy-modified Q resin, T resin, MQ resin, MT resin, and MTQ resin, and a polyorganosiloxane including such resins and the D unit can be adopted.

($R^{101}$ to $R^{110}$)

Next, the substituent will be described.

In one embodiment of the present invention, the reactive functional group or $R^{106}$ corresponds to an organic group substituted with a (meth)acryloyl group. A preferable group has one or more functional groups selected from groups represented by the following structural formulae [2], [3], [4], and [5], in one molecule, an acryloyloxypropyl group, an acryloyloxyoctyl group, a methacryloyloxypropyl group, and a methacryloyloxyoctyl group are more preferable, and in particular, an acryloyloxypropyl group and a methacryloyloxypropyl group are preferable.

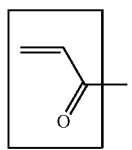

[2]

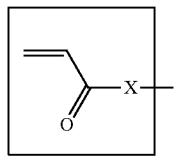

[3]

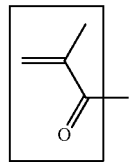

[4]

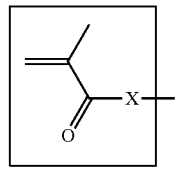

[5]

Herein, X in the formulae is a divalent organic functional group, and may include a branched structure and/or a cyclic structure. X may also include not only carbon and hydrogen, but also any selected from the group consisting of oxygen, nitrogen, phosphorus, sulfur, and halogen. In the case where a silicon atom and X are bound, an atom located at an end of X and directly bound to such a silicon atom is a carbon atom. In the case where an oxygen atom directly bound to a silicon atom, and X are bound, an atom located at an end of X and directly bound to such an oxygen atom is a carbon atom.

It is not necessary in the present invention that all the respective units constituting the M unit, the D unit, and the T unit be the same. In other words, a unit ($R^{101}R^{102}R^{103}SiO_{1/2}$) at a proportion of M1 may have a different structure, for example, one $R^{101}$ is a hydrogen atom and one $R^{101}$ is a methyl group. This event is also common for other R and X.

$R^{101}$ to $R^{105}$, and $R^{107}$ to $R^{110}$ are each independently a group selected from an organic functional group and a hydrogen atom. $R^{101}$ to $R^{103}$, $R^{107}$, $R^{108}$, and $R^{110}$ include no (meth)acryloyl group. Such definitions are made because, for example, in the case where $R^{101}$ to $R^{103}$ are each an organic group containing a (meth)acryloyl group, the moiety at a proportion of M1 and the moiety at a proportion of M2 are not distinguished from each other.

On the other hand, $R^{104}$ and $R^{105}$ each corresponding to the moiety at a proportion of M2 does not have such a problem even if being an organic group containing a (meth)acryloyl group, and thus are not limited to the definitions. $R^{107}$, $R^{108}$, and $R^{110}$ also include no (meth)acryloyl group from the same reason with respect to the moiety at a proportion of D1 and the moiety at a proportion of T1.

$R^{101}$ to $R^{105}$, and $R^{107}$ to $R^{110}$ are each independently preferably an alkyl group such as a methyl group, an ethyl group, a propyl group, an isopropyl group, a butyl group, a sec-butyl group, a tert-butyl group, an octyl group, or a cyclohexyl group, an aromatic functional group such as a phenyl group, a naphthyl group, a carbazole group, or a phenethyl group, or an ether group such as a furanyl group, a polyethylene glycol group, a glycidoxypropyl group, or a cyclic epoxy group preferably a methyl group, a phenyl group, or a hydrogen atom.

$R^{110}$ includes no (meth)acryloyl group, and represents a group selected from an organic group having 1 to 20 carbon atoms, and a hydrogen atom. In particular, a methyl group is preferable. It is also preferable in the polyorganosiloxane C from the same reasons as in the polyorganosiloxane A and the polyorganosiloxane B that a maximum absorption wavenumber of a Si—O stretching vibration be found in the wavenumber range from 1030 to 1060 cm$^{-1}$ in infrared absorption spectrum analysis, and the weight loss of the polyorganosiloxane in heating at 110° C. under a reduced pressure of 0.15 torr for 2 hours be 5% by weight or less.

The type of the M unit in the polyorganosiloxane A, the polyorganosiloxane B, and the polyorganosiloxane C is not particularly limited, and the M unit may contain a reactive functional group. In particular, at least one kind of M unit is preferably a trimethylsiloxy group, specifically, the number of trimethylsiloxy groups per a molecular weight of 1000 is more preferably 1 to 4, from the viewpoint of preservation stability of the polyorganosiloxane. A too small number of trimethylsiloxy group(s) automatically causes an M unit other than a trimethylsiloxy group, namely, an M unit having a reactive group to be easily increased, and thus the number of trimethylsiloxy group(s) is preferably in the above range from the viewpoint of preservation stability of the polyorganosiloxane. On the other hand, the amount of trimethylsiloxy group(s) in the polyorganosiloxane or in the M unit is preferably small from the viewpoint of reactivity of the polyorganosiloxane, specifically, the number of trimethylsiloxy group(s) per a molecular weight of 1000 is preferably 1 or less, and no trimethylsiloxy group is more preferably included. A too large amount of trimethylsiloxy group(s) causes the amount of the reactive functional group to be small, and thus the number of trimethylsiloxy group(s) is preferably 1 or less in the case where the function (curability or the like) of the reactive functional group is emphasized.

The polyorganosiloxane A, the polyorganosiloxane B, and the polyorganosiloxane C are each preferably a liquid at 40° C. (under ordinary pressure). Such an ordinary pressure refers to a pressure equal to the atmospheric pressure, and is appropriately 1 atm. The liquid refers to a state having fluidity. Such polyorganosiloxanes are more preferably a liquid at 25° C. (under ordinary pressure) from the viewpoint of molding and processing.

The viscosity at 25° C. of the polyorganosiloxane A, the polyorganosiloxane B, and the polyorganosiloxane C is not particularly limited as long as such polyorganosiloxanes are each a liquid at 40° C. (under ordinary pressure), and the viscosity at 25° C. is 5 mPa·s or more, preferably 50 mPa·s or more, more preferably 100 mPa·s or more, and is usually 20000 mPa·s or less, preferably 2000 mPa·s or less, more preferably 500 mPa·s or less. The viscosity can be in the range, resulting in decreases in dripping from a nozzle, dripping in coating, and repelling, and imparting appropriate fluidity and facilitating processing. The viscosity in the present invention is determined by an E-type viscosity meter, unless particularly noted.

The molecular weight of the polyorganosiloxane is not particularly limited, and the number average molecular weight Mn is usually 600 or more, preferably 800 or more, more preferably 900 or more, further preferably 950 or more, and is usually 10000 or less, preferably 5000 or less, more preferably 2000 or less. The weight average molecular weight Mw is usually 800 or more, preferably 900 or more, more preferably 1000 or more, and is usually 20000 or less, preferably 10000 or less, more preferably 4000 or less. The number average molecular weight or the weight average molecular weight is equal to or more than the lower limit value, resulting in a decrease in volatile component to impart various advantages such as prevention of dripping from a nozzle, dripping in coating, and repelling due to an increase in flash point and optimization of the viscosity. On the other hand, the number average molecular weight or the weight average molecular weight is equal to or less than the upper limit value, thereby preventing the viscosity from being increased and optionally preventing a solid from being generated, to thereby facilitate mixing with other component and processing.

The number average molecular weight Mn and the weight average molecular weight Mw are measured in the following conditions by gel permeation chromatography (GPC), and can be each represented as a value in terms of standard polystyrene. A sample used is an about 10% by weight solution in THF, and is subjected to filtration by a 0.45-μm filter before measurement. Apparatus: TOSOH HLC-8220 GPC, Columns: KF-G, KF-401HQ, KF-402HQ, and KF-402.5HQ (manufactured by SHOWA DENKO K.K.), column temperature 40° C., Eluent: tetrahydrofuran, Flow rate 0.2 mL/min Another embodiment of the present invention provides a composition containing the above-described polyorganosiloxane, and a cured product obtained by curing of the composition. Examples of a curing system include an addition polymerization in curing type, a condensation polymerization curing type, and a chain polymerization curing type, and any of them may be adopted. There is easily used any polyorganosiloxane obtained by hydrosilylation (addition polymerization curing type) which does not generate any desorbed components such as water and alcohol and which is not a reversible reaction, or by curing (chain polymerization type) by ultraviolet light or heat with a chain polymerization initiator such as a radical polymerization initiator, which again does not generate any desorbed components. The reason for this is because generation of a desorbed component such as water or alcohol in accordance with in polymerization curing tends to cause such a component to remain as foam in a cured product, cause the pressure in a container in molding to be increased, and/or cause a molded article to be shrunk and/or distorted due to volatilization of such a desorbed component.

(Polyorganosiloxane Composition)

A curable composition containing any of the above-mentioned polyorganosiloxanes is also according to another embodiment of the present invention. The composition may appropriately contain a curing catalyst and/or a chain polymerization initiator depending on a curing system. The curing catalyst and the chain polymerization initiator are not particularly limited as long as these can allow the polyorganosiloxanes described herein to be cured.

(Curing Catalyst)

Examples of an addition polymerization catalyst include platinum black, platinic chloride, chloroplatinic acid, a reaction product of chloroplatinic acid and monohydric alcohol, a complex of chloroplatinic acid and an olefin compound, a platinum-based catalyst such as platinum bisacetoacetate, a platinum(0) complex with 1,3-divinyl-1,1,3,3-tetramethyldisiloxane, a platinum(0) complex with 1,3,5,7-tetravinyl-1,3,5,7-tetramethylcyclosiloxane, and a platinum-group metal catalyst such as a palladium-based catalyst or a rhodium-based catalyst. The amount of the addition polymerization catalyst to be compounded is usually 1 ppm or more, preferably 2 ppm or more, and usually 100 ppm or less, preferably 50 ppm or less, further preferably 20 ppm or less, in terms of a platinum-group metal based on the total weight of the polyorganosiloxane. Thus, a high catalyst activity, and a high transparency of a cured product can be achieved. Such addition polymerization catalysts may be used singly or in combination of two or more kinds thereof.

A condensation polymerization catalyst which can be used is, for example, an acid such as hydrochloric acid, nitric acid, sulfuric acid, or an organic acid, a base such as ammonia or an amine compound, or a metallic chelate compound, and can be suitably a metallic chelate compound containing any one or more of Ti, Ta, Zr, Al, Hf, Zn, Sn, Pt, and In. In particular, a metallic chelate compound containing any one or more of Ti, Al, Zn, Zr, Pt, and In is preferably used, and a metallic chelate compound containing Zr and Pt is further preferably used.

The amount of the condensation polymerization catalyst to be compounded is usually 1 ppm or more, preferably 2 ppm or more, and usually 300 ppm or less, preferably 200 ppm or less, further preferably 150 ppm or less in terms of a metal based on the total weight of the polyorganosiloxane. Thus, a high catalyst activity, and a small weight loss in heating of a cured product can be achieved. Such condensation polymerization catalysts may be used singly or in combination of two or more kinds thereof.

(Chain Polymerization Initiator)

Examples of the chain polymerization initiator include a radical polymerization initiator, a cationic polymerization initiator, and an anionic polymerization initiator, and a radical polymerization initiator is generally used.

The radical polymerization initiator which can be used is a photo-polymerization initiator or a thermal polymerization initiator.

The photo-polymerization initiator which can be used is, for example, an alkylphenone-based photo-polymerization initiator, an acylphosphine oxide-based photo-polymerization initiator, an intramolecular hydrogen abstraction type photo-polymerization initiator, or an oxime ester photo-polymerization initiator, and an alkylphenone-based photo-polymerization initiator can be suitably used.

The thermal polymerization initiator which can be used is conventionally known peroxide or azo compound.

Examples of the organic peroxide include diacyl peroxide, peroxydicarbonate, peroxyester, peroxyketal, dialkyl peroxide, hydroperoxide, and silyl peroxide, and more specifically include cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-butyl peroxypivalate, 1,1,3,3-tetramethylbutyl peroxy-2-ethylhexanoate, 2,5-dimethyl-2,5-di(2-ethylhexanoylperoxy)hexane, t-hexyl peroxy-2-ethylhexanoate, t-butyl peroxy-2-ethylhexanoate, t-butyl peroxyneoheptanoate, t-amyl peroxy-2-ethylhexanoate, di-t-butyl peroxyhexahydroterephthalate, t-amyl peroxy-3,5,5-trimethylhexanoate, 3-hydroxy-1,1-dimethylbutyl peroxyneodecanoate, 1,1,3,3-tetramethylbutyl peroxy-2-ethylhexanoate, t-amyl peroxyneodecanoate, t-amyl peroxy-2-ethylhexanoate, t-hexyl peroxyisopropylmonocarbonate, t-butyl peroxymaleic acid, t-butyl peroxy-3,5,5-trimethylhexanoate, t-butyl peroxylaurate, 2,5-dimethyl-2,5-di(3-methylbenzoylperoxy)hexane, t-butyl peroxy-2-ethylhexylmonocarbonate, t-hexyl peroxybenzoate, 2,5-dimethyl-2,5-di(benzoylperoxy)hexane, t-butylperoxybenzoate, dibutyl peroxytrimethyladipate, t-amyl peroxy n-octoate, t-amyl peroxyisononanoate, t-amyl peroxybenzoate, and lauroyl peroxide.

Examples of the azo compound include 2,2'-azobis-2,4-dimethylvaleronitrile, 1,1'-azobis(1-acetoxy-1-phenylethane), 2,2'-azobisisobutyronitrile, 2,2'-azobis(2-methylbutyronitrile), dimethyl-2,2'-azobisisobutyronitrile, 4,4'-azobis(4-cyanovaleric acid), and 1,1'-azobis(1-cyclohexanecarbonitrile).

Such radical polymerization initiators may be used singly or in combination of two or more kinds thereof.

<Antioxidant>

The curable composition preferably further contains an antioxidant. The curable composition can contain an antioxidant, thereby allowing coloration of a cured product due to heat of solder reflow or the like to be suppressed.

Specific examples of the antioxidant include phenol-based antioxidants such as 2,6-di-t-butylphenol, 2,6-di-t-butyl-p-cresol, n-octadecyl-3-(3',5'-di-t-butyl-4'-hydroxyphenyl)propionate, tetrakis-[methylene-3-(3',5'-di-t-butyl-4'-hydroxyphenyl)propionate]methane, triethylene glycol bis[3-(3-t-butyl-5-methyl-4-hydroxyphenyl)propionate], and 1,6-hexanediolbis[3-(3,5-di-t-butyl-4-hydroxyphenyl)propionate]; phosphorus-based antioxidants such as triphenylphosphite, trisisodecylphosphite, tristridecylphosphite, tris(2,4-di-t-butylphenyl)phosphite, and tetra(C12 to 15alkyl)-4,4'-isopropylidenediphenyldiphosphite; and sulfur-based antioxidants such as dilauryl-3,3'-thiodipropionate, ditridecyl-3,3'-thiodipropionate, dimyristyl-3,3'-thiodipropionate, distearyl-3,3'-thiodipropionate, pentaerythritol tetrakis($\beta$-laurylthiopropionate). Such antioxidants may be used singly or in combination of two or more kinds thereof.

(Other Component(s))

The curable composition of the present invention may include other component(s) such as a filler, a curing inhibitor, and/or a viscosity adjuster. Such other component(s) can be appropriately contained as long as there are not impaired any effects with respect to mechanical properties, the flash point, the linear expansion coefficient, the viscosity, and the like of a cured product of the polyorganosiloxane according to the present embodiment.

The viscosity of the curable composition is also not particularly limited, and may be an appropriate viscosity depending on a molding procedure.

The curable composition of the present invention may be any mode where the composition contains the MT resin or a cage-type silsesquioxane, as described above. In the case where the curable composition of the polyorganosiloxane contains a cage-type silsesquioxane, the content of the cage-type silsesquioxane is preferably less than 5% by weight. The content of the cage-type silsesquioxane is equal to or less than the upper limit value, thereby allowing the cage-type silsesquioxane to be hardly precipitated, allowing the degree of transparency to be easily increased, and allowing the haze of a cured product described below to be suppressed. A liquid phase is also easily kept.

(Cured Product of Polyorganosiloxane Composition)

A cured product obtained by curing of the curable composition is also according to another embodiment of the present invention. The curing procedure is not particularly limited, and a known technique with heat, ultraviolet light or the like can be appropriately applied depending on the type of the polyorganosiloxane.

The haze of the cured product obtained by curing of the curable composition is preferably less than 1%, more preferably 0.6% or less. The haze is in such a range, thereby allowing the influence by diffusion of light to be decreased, resulting in a degree of transparency which can allow for use in an optical resin application.

The haze can be measured by a measurement apparatus (haze meter) according to "Plastics-Determination of the total luminous transmittance of transparent materials-Part 1: Single beam/compensation method (JIS K 7361)" and "Plastics-Method of determining haze of transparent materials (JIS K 7136)".

The yellow index of the cured product obtained by curing of the curable composition, after a treatment at 85° C. and a relative humidity of 85% for 168 hours, is preferably 0 to 10, more preferably 0 to 5, further preferably 0 to 3. The yellow index is in such a range, thereby resulting in a cured product which is improved in durability even under the influences of ambient temperature and humidity in use in an optical application and thus can be used in an optical application.

The yellow index can be measured by a measurement apparatus according to "Plastics-Determination of yellowness index and change of yellowness index (JIS K 7373)".

(Method for Producing Polyorganosiloxane)

The method for producing the polyorganosiloxane according to the present embodiment is not particularly limited as long as the method can provide the polyorganosiloxane having the structure. For example, the method may be any of production methods including a method of condensing a disiloxane compound or a disilazane compound, or a hydrolyzate thereof, or an alkoxysilane compound, or a hydrolysate or partially hydrolyzed condensate thereof, a method of condensing a chlorosilane compound, or a hydrolysate or a partially hydrolyzed condensate thereof, a method of ring-opening polymerizing a cyclic siloxane compound, and a method of chain polymerization such as anionic polymerization, and a plurality of such production methods may be used in combination. A polyorganosiloxane having a desired amount of a reactive functional group and a desired molecular weight may be fractioned by column chromatography or GPC, extraction with a solvent, distillation off of unnecessary component(s), or the like. In the case where the weight loss of the polyorganosiloxane component in heating at 110° C. under a reduced pressure of 0.15 torr for 2 hours is more than 5% by weight, namely, a low-boiling point component is generated in a large amount, such a low-boiling point component can be removed by heating or pressure reduction and then formed into the polyorganosiloxane according to the present embodiment.

The method for introducing the reactive functional group into the polyorganosiloxane according to the present embodiment is not particularly limited. For example, the reactive functional group can be introduced with, as a raw material, a disiloxane compound having the reactive functional group, a disilazane compound having the reactive functional group, an alkoxysilane compound of the M unit, the D unit or the T unit having the reactive functional group, a chlorosilane compound of the M unit, the D unit or the T unit having the reactive functional group, a cyclic siloxane compound having the reactive functional group, or the like. The reactive functional group here introduced may be converted into another reactive functional group according to a chemical procedure. For example, the reactive functional group can be converted into another reactive functional group by a method including converting the reactive functional group into another reactive functional group by a reaction of a polyorganosiloxane having an alkenyl group and a monofunctional thiol having a reactive functional group, a method including oxidizing an alkenyl group with an oxidizing substance for conversion into an epoxy group, a method including converting the reactive functional group into another reactive functional group by a reaction of a polyorganosiloxane having a hydrogen atom directly bound to a silicon atom and a vinyl compound having a reactive functional group, a method including ring-opening a cyclic ether group introduced into the polyorganosiloxane for conversion into an alcoholic hydroxyl group, or the like.

The polyorganosiloxane according to the present embodiment is low in viscosity and small in the amount of weight loss in heating under reduced pressure, and thus is extremely excellent in handleability. Moreover, a cured product obtained by curing of the polyorganosiloxane according to the present embodiment has high strength and high thermal shock properties, and thus can be used in various applications. For example, the polyorganosiloxane can be used in applications such as a viscosity adjuster, a compatibilizing agent, a lubricant, a dispersant, an aggregating agent, an adhesive, a pressure-sensitive adhesive, a release agent, a water-proofing agent, an oil-proofing agent, a coating agent, a surface modifier, a metal surface repairing agent, a flame retarder, a sealing material and a substrate for a semiconductor device such as an inorganic or organic light-emitting element, a coating material, and an optical member.

The present invention also encompasses the following embodiment (second embodiment).

(Polyorganosiloxane)

It is necessary for an increase in the Abbe's number of a cured product, as one effect of the present invention, that a (meth)acryloyl group-containing functional group be included as the reactive functional group in the general formula (101) and the percentage of a unit having such a (meth)acryloyl group, M2+D2+T2, be more than 0.25, and the percentage is preferably 0.4 or more, more preferably 0.5 or more, further preferably 0.6 or more. A (meth)acryloyl group is preferably present in the M unit or the T unit from the viewpoint of an enhancement in compatibility with other acrylic resin, from the viewpoint of an increase in the content of the (meth)acryloyl group and from the viewpoint of an enhancement in liquid storage stability, and thus M2+T2>0.25 is preferably satisfied, M2+T2 is more preferably 0.4 or more, and M2+T2 is further preferably 0.5 or more, particularly preferably 0.6 or more.

It is preferable that M1 corresponding to the percentage of an M unit having no (meth)acryloyl group be also present, namely, M1>0 be satisfied. The reason for this is because the alkoxy group and the silanol group of the polyorganosiloxane are substituted with the M unit to thereby allow storage stability of the polyorganosiloxane to be improved and allow the viscosity to be low, and a polyorganosiloxane modified by a bulk group like a (meth)acryloyl group causes an M unit less in steric hindrance to easily approach a silicon atom in substitution of the alkoxy group and the silanol group with such an M unit and thus the M unit having no (meth)acryloyl group is useful for substitution. $R^{101}$ to $R^{103}$ are particularly preferably each a methyl group or a hydrogen atom from the viewpoint of steric hindrance, and most preferably a methyl group from the viewpoint of storage stability. With respect to the amount of substitution, factor M1 is preferably 0.09 or more from the viewpoint of storage stability. The upper limit is usually 0.6 or less, preferably 0.5 or less, more preferably 0.4 or less.

In the present invention, an MQ resin, an MTQ resin, and an MT resin are preferable from the viewpoint of an increase in the content of the (meth)acryloyl group and from the viewpoint of an enhancement in liquid storage stability, and the D unit can also be incorporated into such resins in order to impart appropriate flexibility. D1≤0.1 is preferably satisfied, and D1≤0.05 is more preferably satisfied in order to provide a material high in elastic modulus and low in coefficient of linear expansion, and suitable as an optical material.

The Q unit is a form of silicon most oxidized, and can be included in the structure of the polyorganosiloxane to result in an enhancement in heat resistance. Accordingly, an MQ resin and an MTQ resin each having the Q unit in its structure are preferable, and the content of the Q unit is as follows: factor Q is preferably more than 0, preferably 0.04 or more, and the upper limit is usually 0.6 or less, more preferably 0.4 or less because a large amount of the Q unit causes a solid to be generated or causes the viscosity to be high, resulting in deterioration in handleability.

$(O_{1/2}R^{110})$ corresponds to an alkoxy group bound to silicon or a silanol group, and each of the groups can control the viscosity of the polyorganosiloxane and adjust the viscosity to a viscosity suitable for molding. The silanol group has an effect of increasing the viscosity, and the silanol group is replaced with the alkoxy group, thereby allowing the effect of decreasing the viscosity to be exerted.

Factor Y1 is 0 or a positive value. The range of factor Y1 is usually 0 or more, preferably 0.01 or more from the viewpoint of adjustment of a required viscosity for molding, and is usually 0.25 or less, preferably 0.2 or less, more preferably 0.1 or less from the viewpoint of storage stability and cure shrinkage.

Factor Y2 corresponds to the content of an organic group containing a (meth)acryloyl group bound to silicon, and contributes to increases in refractive index and Abbe's number and thus can be incorporated into the structure of the polyorganosiloxane. Y2≥0.25 can be satisfied instead of M2+D2+T2≥0.25, thereby allowing for use as an optical material. That is, another mode of the present invention may be a mode where the requirement of M2+D2+T2≥0.25 is replaced with the requirement of Y2≥0.25 in the general formula (101). It is noted that a compound where a (meth) acryloyloxy group is bound to silicon is easily hydrolyzed by water and desorbed to result in an increase in water absorption rate in some cases, and therefore is preferably used in a way so as to be hardly affected by moisture.

That is, (meth)acryloyloxy-modified Q resin, T resin, MQ resin, MT resin, and MTQ resin, and a polyorganosiloxane including such resins and the D unit can be adopted.

($R^{101}$ to $R^{110}$)

Next, the substituent will be described.

In the present invention, the reactive functional group or $R^{106}$ corresponds to an organic group substituted with a (meth)acryloyl group. A preferable group has one or more functional groups selected from groups represented by the following structural formulae [2], [3], [4], and [5], in one molecule, an acryloyloxypropyl group, an acryloyloxyoctyl group, a methacryloyloxypropyl group, and a methacryloyloxyoctyl group are more preferable, and in particular, an acryloyloxypropyl group and a methacryloyloxypropyl group are preferable.

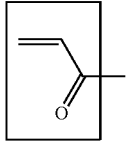

[2]

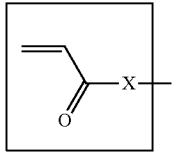

[3]

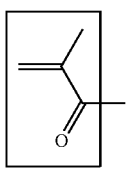

[4]

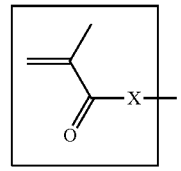

[5]

Herein, X in the formulae is a divalent organic functional group, and may include a branched structure and/or a cyclic structure. X may also include not only carbon and hydrogen, but also any selected from the group consisting of oxygen, nitrogen, phosphorus, sulfur, and halogen. In the case where a silicon atom and X are bound, an atom located at an end of X and directly bound to such a silicon atom is a carbon atom. In the case where an oxygen atom directly bound to a silicon atom, and X are bound, an atom located at an end of X and directly bound to such an oxygen atom is a carbon atom.

It is not necessary in the present invention that all the respective units constituting the M unit, the D unit, and the T unit be the same. In other words, a unit $(R^{101}R^{102}R^{103}SiO_{1/2})$ at a proportion of M1 may have a different structure, for example, one $R^{101}$ is a hydrogen atom and one $R^{101}$ is a methyl group. This event is also common for other R and X.

$R^{101}$ to $R^{105}$, and $R^{107}$ to $R^{110}$ are each independently a group selected from an organic functional group and a hydrogen atom. $R^{101}$ to $R^{103}$, $R^{107}$, $R^{108}$, and $R^{110}$ include no (meth)acryloyl group. Such definitions are made because, for example, in the case where $R^{101}$ to $R^{103}$ are each an organic group containing a (meth)acryloyl group, the moiety at a proportion of M1 and the moiety at a proportion of M2 are not distinguished from each other.

On the other hand, $R^{104}$ and $R^{105}$ each corresponding to the moiety at a proportion of M2 does not have such a problem even if being an organic group containing a (meth) acryloyl group, and thus are not limited to the definitions. $R^{107}$, $R^{108}$, and $R^{110}$ also include no (meth)acryloyl group from the same reason with respect to the moiety at a proportion of D1 and the moiety at a proportion of T1.

$R^{101}$ to $R^{105}$, and $R^{107}$ to $R^{110}$ are each independently preferably an alkyl group such as a methyl group, an ethyl group, a propyl group, an isopropyl group, a butyl group, a sec-butyl group, a tert-butyl group, an octyl group, or a cyclohexyl group, an aromatic functional group such as a phenyl group, a naphthyl group, a carbazole group, or a phenethyl group, or an ether group such as a furanyl group, a polyethylene glycol group, a glycidoxypropyl group, or a cyclic epoxy group, more preferably a methyl group, a phenyl group, or a hydrogen atom.

$R^{110}$ includes no (meth)acryloyl group, and represents a group selected from an organic group having 1 to 20 carbon atoms, and a hydrogen atom. In particular, a methyl group is preferable.

(Other Characteristics of Polyorganosiloxane)

Preferable characteristics of the polyorganosiloxane of the present invention correspond to a liquid form at 25° C., and a viscosity at 25° C. of 10 to 100,000 mPa·s, as measured by an E-type viscosity meter, from the viewpoint of handling. In order that the polyorganosiloxane is in the form of a liquid, the number average molecular weight in terms of polystyrene in gel permeation chromatography (GPC) measurement is preferably 10,000 or less. Such a liquid form more preferably includes a low molecular weight component in a small amount, and preferably has a number average molecular weight of 1,000 or more. Although a large amount of a low molecular weight component easily provides a liquid form, such a liquid form may be low in elastic modulus of a cured article thereof and also may be remarkably changed in elastic modulus in temperature change to thereby cause an optical member to be degraded due to such temperature change.

(Method for Producing Polyorganosiloxane)

The polyorganosiloxane of the present invention can be obtained by hydrolytic condensation of a silicon raw material produced in a general-purpose manner, and examples of a raw material which can be used for production are exemplified below.

One example of an M unit source which can be used is trimethylsilanol, trimethylmethoxysilane, hexamethyldisiloxane, hexamethyldisilazane, dimethylsilanol, dimethylmethoxysilane, tetramethyldisiloxane, tetramethyldisilazane, dimethylvinylsilanol, dimethylvinylmethoxysilane, 1,3-divinyltetramethyldisiloxane, 1,3-divinyltetramethyldisilazane, dimethylmethacryloyloxypropylsilanol, dimethylmethacryloyloxypropylmethoxysilane, 1,3-dimethacryloyloxypropyltetramethyldisiloxane, dimethylglycidyloxypropylsilanol, dimethylglycidyloxypropylmethoxysilane, 1,3-diglycidyloxypropyltetramethyldisiloxane, 1,3-diphenyltetramethyldisiloxane, 1,3-diphenyltetramethyldisilazane, dimethylphenylsilanol, dimethylmethoxyphenylsilane, 1,4-bis(dimethylmethoxysilyl)benzene, 1,4-bis(dimethylethoxysilyl)benzene, or any of the compounds listed containing a silanolic hydroxyl group and an alkoxy group, where halogen is bound instead of the silanolic hydroxyl group or the alkoxy group, and hexamethyldisiloxane can be particularly suitably used. Any of the above compounds containing an aromatic compound is also preferably used for the purpose of an increase in refractive index.

One example of a D unit source which can be used is dimethyldisilanol, dimethyldimethoxysilane, tetramethyldisiloxane, dimethylsiloxane oligomer, methacryloyloxypropyldimethoxymethylsilane, methyldimethoxyphenylsilane, diethoxymethylphenylsilane, methylphenyldisilanol, 1,4-bis(methyldimethoxysilyl)benzene, 1,4-bis(methyldiethoxysilyl)benzene, or any of the compounds listed containing a silanolic hydroxyl group and an alkoxy group, where halogen is bound instead of the silanolic hydroxyl group or the alkoxy group, or a polymerized product thereof, and dimethyldimethoxysilane can be particularly suitably used. Any of the above compounds containing an aromatic compound is also preferably used for the purpose of an increase in refractive index.

One example of a T unit source which can be used is trimethoxysilane, trimethoxysilane with a C1 to C20 long-chain alkoxy group modified, such as methyltrimethoxysilane, ethyltrimethoxysilane, propyltrimethoxysilane, hexyltrimethoxysilane, or decyltrimethoxysilane, vinyltrimethoxysilane, phenyltrimethoxysilane, 3,3,3-trifluoropropyltrimethoxysilane, 3-methacryloyloxypropyltrimethoxysilane, 8-methacryloyloxyoctyltrimethoxysilane, 3-acryloyloxypropyltrimethoxysilane, 8-acryloyloxyoctyltrimethoxysilane, 3-glycidyloxypropyltrimethoxysilane or 8-glycidyloxyoctyltrimethoxysilane, or an ethoxysilane compound thereof, phenyltrisilanol, 1,4-bis(trimethoxysilyl)benzene or 1,4-bis(triethoxysilyl)benzene, or trichlorosilane, trihydrosilylsilane or trisilanol other than such alkoxysilanes, or a polymerized product thereof, and 3-methacryloyloxypropyltrimethoxysilane, 8-methacryloyloxyoctyltrimethoxysilane, 3-acryloyloxypropyltrimethoxysilane, or 8-acryloyloxyoctyltrimethoxysilane can be particularly suitably used. Any of the above compounds containing an aromatic compound is also preferably used for the purpose of an increase in refractive index.

One example of a Q unit source which can be used is tetrachlorosilane, alkoxysilane such as tetramethoxysilane, tetraethoxysilane, tetraisopropoxysilane, tetrapropoxysilane, tetrabutoxysilane, tetrapentyloxysilane, tetraphenyloxysilane, trimethoxymonoethoxysilane, dimethoxydiethoxysilane, triethoxymonomethoxysilane, trimethoxymonopropoxysilane, monomethoxytributoxysilane, monomethoxytripentyloxysilane, monomethoxytriphenyloxysilane, dimethoxydipropoxysilane, tripropoxymonomethoxysilane, trimethoxymonobutoxysilane, dimethoxydibutoxysilane, triethoxymonopropoxysilane, diethoxydipropoxysilane, tributoxymonopropoxysilane, dimethoxymonoethoxymonobutoxysilane, diethoxymonomethoxymonobutoxysilane, diethoxymonopropoxymonobutoxysilane, dipropoxymonomethoxymonoethoxysilane, dipropoxymonomethoxymonobutoxysilane, dipropoxymonoethoxymonobutoxysilane, dibutoxymonomethoxymonoethoxysilane, dibutoxymonoethoxymonopropoxysilane or monomethoxymonoethoxymonopropoxymonobutoxysilane, aryloxysilane, a tetramethoxysilane oligomer such as methyl silicate MS51, MS56, MS57, or MS60 manufactured by Mitsubishi Chemical Corporation, or a tetraethoxysilane oligomer such as an ethyl silicate oligomer ES40 or ES48 manufactured by Tama Chemicals Co., Ltd., and methyl silicate MS51 is particularly suitable.

A catalyst for hydrolytic condensation of such a silicon raw material, which can be used, is an acid catalyst, a base catalyst, or an inorganic salt, and an acid catalyst can be particularly suitably used.

One example of the acid catalyst which can be used is hydrochloric acid, sulfuric acid, trifluoroacetic acid, acetic acid, methacrylic acid, or acrylic acid, and hydrochloric acid can be particularly suitably used.

One example of the base catalyst which can be used is ammonia, hexamethyldisilazane, triethylamine, tetraethylammoniumhydroxide, diazabicycloundecene, potassium hydroxide, sodium hydroxide, potassium carbonate, or sodium carbonate, and potassium hydroxide is particularly suitable.

The inorganic salt which can be used is, for example, sodium chloride, potassium chloride, magnesium chloride, calcium chloride, sodium bromide, potassium bromide, magnesium bromide, or calcium bromide.

One example of the solvent for use in the hydrolytic condensation reaction, which can be used, is tetrahydrofuran, toluene, methanol, ethanol, isopropanol, hexane, or heptane, tetrahydrofuran is particularly preferable, two or more kinds of solvents may be used depending on the solubility of a product, and a mixed liquid of toluene and methanol or a mixed liquid of tetrahydrofuran and methanol is particularly preferable.

The method for producing the MT resin may be a method of simultaneously adding the M unit, in which respective raw materials of the M and T units are initially mixed together and hydrolytically condensed with the catalyst, or a method of subsequently adding the M unit, in which a raw material of the T unit is hydrolytically condensed in advance and thereafter a raw material of the M unit is added, and the resultant is hydrolytically condensed. The method of subsequently adding the M unit is preferable from the viewpoint of suppression of the amount of a low molecular component.

The remaining alkoxy group and silanol group which are not hydrolytically condensed may also be, if necessary, substituted with an organic acid or alcohol, one example of the organic acid which can be used is acetic acid, acrylic acid, or methacrylic acid, one example of the alcohol which can be used is methanol, ethanol, propanol, butyl alcohol, pentanol, hexanol, heptanol, or a structural isomer thereof as one including no (meth)acryloyl group, or 2-hydroxyethyl acrylate or 2-hydroxyethyl methacrylate as one including a (meth)acryloyl group, and 2-hydroxyethyl acrylate or 2-hydroxyethyl methacrylate is preferable from the viewpoint of stability.

The method for producing the MTQ resin may be a method of simultaneously adding the M unit, in which respective raw materials of the M, T, and Q units are initially mixed together and hydrolytically condensed with the catalyst, a method of subsequently adding the M unit, in which raw materials of the T and Q units are hydrolytically condensed in advance and thereafter a raw material of the M unit is added, and the resultant is hydrolytically condensed, or a multi-stage synthesis method in which a raw material of the T unit and a raw material of the M unit are hydrolytically condensed in advance and also a raw material of the Q unit and a raw material of the M unit are hydrolytically condensed in advance, and such hydrolytic condensates are mixed and further hydrolytically condensed, and the method of subsequently adding the M unit or the multi-stage synthesis is preferable from the viewpoint of suppression of the amount of a low molecular component.

The remaining alkoxy group and silanol group which are not hydrolytically condensed may also be, if necessary, substituted with an organic acid or alcohol, one example of the organic acid which can be used is acetic acid, acrylic acid, or methacrylic acid, one example of the alcohol which can be used is methanol, ethanol, propanol, butyl alcohol, pentanol, hexanol, heptanol, or a structural isomer thereof as one including no (meth)acryloyl group, or 2-hydroxyethyl acrylate or 2-hydroxyethyl methacrylate as one including a (meth)acryloyl group, and 2-hydroxyethyl acrylate or 2-hydroxyethyl methacrylate is preferable from the viewpoint of stability.

The method for producing the MQ resin may be a method of simultaneously adding the M unit, in which respective raw materials of the M and Q units are initially mixed together and hydrolytically condensed with the catalyst, or a method of subsequently adding the M unit, in which a raw material of the Q unit is hydrolytically condensed in advance and thereafter a raw material of the M unit is added, and the resultant is hydrolytically condensed. The method of subsequently adding the M unit is preferably used from the viewpoint of suppression of the amount of a low molecular component, and silicate hydrolytically condensed in advance is further preferably used as a raw material.

The remaining alkoxy group and silanol group which are not hydrolytically condensed may also be, if necessary, substituted with an organic acid or alcohol, one example of the organic acid which can be used is acetic acid, acrylic acid, or methacrylic acid, one example of the alcohol which can be used is methanol, ethanol, propanol, butyl alcohol, pentanol, hexanol, heptanol, or a structural isomer thereof as one including no (meth)acryloyl group, or 2-hydroxyethyl acrylate or 2-hydroxyethyl methacrylate as one including a (meth)acryloyl group, and 2-hydroxyethyl acrylate or 2-hydroxyethyl methacrylate is preferable from the viewpoint of stability.

It is also preferable that the MQ resin be hydrolytically condensed with a raw material having a hydrosilyl group for the M unit and thereafter a vinyl compound be modified by hydrosilylation with a platinum catalyst such as a Karstedt catalyst.

The method for producing the Q resin can be a method including mixing an organic acid or alcohol with the catalyst, and substituting a terminal alkoxy group of a raw material of the Q unit with the organic acid or alcohol.

One example of the organic acid which can be used is acrylic acid or methacrylic acid, one example of the alcohol which can be used is 2-hydroxyethyl acrylate or 2-hydroxyethyl methacrylate, and 2-hydroxyethyl acrylate or 2-hydroxyethyl methacrylate is preferable from the viewpoint of stability.

The MT resin, the MTQ resin, the MQ resin, and the Q resin can be each hydrolytically condensed with a raw material of the D unit to thereby achieve toughness.

The MT resin, the MTQ resin, the MQ resin, and the Q resin preferably have no cage-type structure because such resins, when have a rigid structure like a cage-type silsesquioxane, cause a cured product to have hard and brittle characteristics and cause such a cured product to be hardly released from stress in a solder reflow step and thus be cracked. Such resins, which have a cage-type structure, have an absorption peak of Si—O stretching vibration in the wavenumber range from 1070 to 1150 $cm^{-1}$ in infrared absorption spectrum analysis, and therefore there is not any maximum absorption wavenumber of a Si—O stretching vibration in the wavenumber range and thus an extremely hardened structure as in the structure of a cage-type silsesquioxane can be avoided. It is noted that a characteristic absorption band derived from an organic molecule, other than that derived from Si—O, may be present in the wavenumber range from 1070 to 1150 $cm^{-1}$. Examples of such a characteristic absorption band derived from an organic molecule include those derived from C—O of a hydroxyl group, derived from C—O—C of ester, derived from C—O—C of acid anhydride, derived from C—O—C of ether, derived from C—N of amine, derived from sulfonic acid, derived from sulfoxide, derived from C—F of a fluorine compound, derived from P=O or P—O of a phosphorous compound, and derived from $SO_4^{2-}$ or $ClO_4^-$ of an inorganic salt, and such structures are known as structures high in absorption intensity. It is to be noted that attribution of those derived from such structures is not confounded with attribution of that derived from a Si—O stretching vibration.

The molar number of water for use in hydrolysis is preferably 0.5 equivalents or more, more preferably 0.8 equivalents or more, further preferably 1.1 equivalents or more based on the total molar number of the alkoxy groups included in the M, D, T, and Q units. One example of the type of such water, which may be used, is water contained in commercially available hydrochloric acid, or water purified by distillation or an ion exchange resin.

The polyorganosiloxane of the present embodiment preferably includes the MT resin, the MTQ resin, or the MQ resin, particularly preferably the MTQ resin, as its structure.

(Polyorganosiloxane Composition)

The polyorganosiloxane composition of the present embodiment can contain not only any of the above-mentioned polyorganosiloxanes, but also a monofunctional (meth)acrylate compound, a polyfunctional (meth)acrylate compound, and/or a (meth)acrylic polymer. Furthermore, a polymerization initiator for polymerization and curing of a (meth)acrylate compound can be contained. Moreover, an organic solvent may be further contained.

Hereinafter, components which may be contained in the polyorganosiloxane composition of the present invention will be described.

In the present invention, the "(meth)acryloyl group" collectively means an acryloyl group and a methacryloyl group, and is represented by $CH_2$=C(R)—C(=O)—. R represents a hydrogen atom or a methyl group. The "(meth)acrylic" collectively means acrylic and methacrylic. The "(meth) acrylate" collectively means acrylate and methacrylate.

(Monofunctional (Meth)Acrylate Compound)

Specific examples of the monofunctional (meth)acrylate compound include (meth)acrylic acid, and (meth)acrylates containing a carboxyl group, such as 2-(meth)acryloyloxyethyl succinate, 2-(meth)acryloyloxyethyl maleate, 2-(meth) acryloyloxyethyl phthalate, and 2-(meth)acryloyloxyethyl hexahydrophthalate;

- (meth)acrylates containing a hydroxyl group, such as 2-hydroxyethyl (meth)acrylate, 2-hydroxypropyl (meth)acrylate, 2-hydroxybutyl (meth)acrylate, 4-hydroxybutyl (meth)acrylate, or 6-hydroxyhexyl (meth) acrylate;
- alkyl (meth)acrylates such as methyl (meth)acrylate, ethyl (meth)acrylate, propyl (meth)acrylate, n-butyl (meth) acrylate, i-butyl (meth)acrylate, t-butyl (meth)acrylate, pentyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, decyl (meth)acrylate, lauryl (meth) acrylate, tridecyl (meth)acrylate, and stearyl (meth) acrylate;
- (meth)acrylates containing an alicyclic structure, such as cyclohexyl (meth)acrylate, dicyclopentenyl (meth) acrylate, 2-dicyclopentenoxyethyl (meth)acrylate, isobornyl (meth)acrylate, dicyclopentanyl (meth)acrylate, adamantyl (meth)acrylate, and 4-t-butylcyclohexyl (meth)acrylate;
- (meth)acrylates containing an aromatic ring structure, such as phenyl (meth)acrylate, benzyl (meth)acrylate, phenoxyethyl (meth)acrylate, phenoxydiethylene glycol (meth)acrylate, phenoxypolyethylene glycol (meth) acrylate, nonylphenoxypolyethylene glycol (meth) acrylate, phenoxypolypropylene glycol (meth)acrylate, phenylphenyl (meth)acrylate, phenylphenoxyethyl (meth)acrylate, phenoxybenzyl (meth)acrylate, phenylbenzyl (meth)acrylate, naphthyl (meth)acrylate, and (1-naphthyl)methyl (meth)acrylate;
- (meth)acrylates containing a heterocyclic structure, such as tetrahydrofurfuryl (meth)acrylate, glycidyl (meth) acrylate, and (meth)acryloyl morpholine;
- alkoxy (meth)acrylates such as methoxyethyl (meth)acrylate, ethoxyethyl (meth)acrylate, and butoxyethyl (meth)acrylate;
- 3-(meth)acryloxypropyltrimethoxysilane, 3-(meth)acryloxypropyltriethoxysilane, 2-(meth)acryloyloxyethyl acid phosphate, trifluoroethyl (meth)acrylate, heptadecafluorodecyl (meth)acrylate, and 2-(meth)acryloyloxyethyl isocyanate.

(Polyfunctional (Meth)Acrylate Compound)

Specific examples of the polyfunctional (meth)acrylate compound include polyfunctional monomers, for example, alkylene glycol di(meth)acrylates such as ethylene glycol di(meth)acrylate, propylene glycol di(meth)acrylate, butylene glycol di(meth)acrylate, 1,6-hexanediol di(meth)acrylate, 1,9-nonanediol di(meth)acrylate, 1,10-decanediol di(meth)acrylate, and neopentyl glycol di(meth)acrylate;

- polyalkylene glycol di(meth)acrylates such as polyethylene glycol di(meth)acrylate, polypropylene glycol di(meth)acrylate, and polybutylene glycol di(meth) acrylate;
- di(meth)acrylates containing an alicyclic structure, such as cyclohexanedimethanol di(meth)acrylate, tricyclodecanedimethanol di(meth)acrylate, ethoxylated hydrogenated bisphenol A di(meth)acrylate, propoxylated hydrogenated bisphenol A di(meth)acrylate, and adamantane diol di(meth)acrylate;
- bifunctional (meth)acrylates such as polycarbonate diol di(meth)acrylate, polyester diol di(meth)acrylate, ethoxylated bisphenol A di(meth)acrylate, propoxylated bisphenol A di(meth)acrylate, 9,9-bis(4-acryloyloxyethoxyphenyl)fluorene, and polyurethane di(meth) acrylate;
- trifunctional (meth)acrylates such as trimethylolpropane tri(meth)acrylate, ethoxylated isocyanuric acid tri (meth)acrylate, and ε-caprolactone-modified tris ((meth)acryloxyethyl)isocyanurate;
- tetrafunctional (meth)acrylates such as ditrimethylolpropane tetra(meth)acrylate;
- pentafunctional (meth)acrylates such as dipentaerythritol penta(meth)acrylate; and
- hexafunctional (meth)acrylates such as dipentaerythritol hexa(meth)acrylate.

((Meth)Acrylic Polymer)

The (meth)acrylic polymer is a polymer including 50% by mass or more of a (meth)acrylate unit in its composition. The "unit" means a repeating unit constituting the polymer. The (meth)acrylate compound may be monofunctional or polyfunctional.

The (meth)acrylate unit included in the (meth)acrylic polymer may be included singly or in combination of two or more kinds thereof.

Any monomer other than the (meth)acrylate unit may be included. Such any other monomer may be any monomer copolymerizable with (meth)acrylate, and examples thereof include aromatic vinyl monomers such as styrene and α-methylstyrene; vinyl cyanide monomers such as acrylonitrile; and vinyl ester-based monomers such as vinyl acetate.

The polymerization method for providing the (meth) acrylic polymer is not particularly limited, and can be made by a known method such as a solution polymerization method, a suspension polymerization method, an emulsification polymerization method, or a partial polymerization method. In the present invention, a suspension polymerization method is preferable because control of a polymerization reaction and separation of a polymer produced are relatively easily made.

The (meth)acrylic polymer which may be used is one modified by introduction of a functional group including a double bond such as a (meth)acryloyl group or a vinyl group into a side chain by chemical modification. Such a chemical modification method which can be used is, for example, a reaction of a carboxyl group and a glycidyl group or a reaction of a hydroxyl group and an isocyanate group.

In the case where the reaction of a carboxyl group and a glycidyl group is used as the chemical modification method, examples thereof include a procedure including producing a (meth)acrylic polymer containing a (meth)acrylate unit having a carboxyl group, and reacting a compound having a glycidyl group and a double bond, such as glydicyl (meth) acrylate, with the resulting (meth)acrylic polymer.

A reaction catalyst is preferably used for a decrease in reaction time in the reaction of such a compound having a glycidyl group and a double bond with such a (meth)acrylic polymer containing a (meth)acrylic monomer unit having a carboxyl group. Examples of the reaction catalyst include quaternary ammonium salts such as tetrabutylammonium bromide, quaternary phosphonium salts such as ethyltriphenylphosphonium bromide, and phosphine-based compounds such as triphenylphosphine. A quaternary ammonium salt is particularly preferable because the polyorganosiloxane composition of the present invention is hardly colored.

In particular, alkyl (meth)acrylate, (meth)acrylate having an alicyclic structure, alkylene glycol di(meth)acrylate, and di(meth)acrylate containing an alicyclic structure are particularly preferable from the viewpoint of an enhancement in Abbe's number.

The weight average molecular weight (Mw) of the (meth) acrylic polymer is preferably 5,000 to 500,000, more preferably 10,000 to 200,000. The weight average molecular weight is 5,000 or more, thereby allowing strength of the cured product to be improved. The weight average molecular weight is 500,000 or less, thereby allowing the viscosity of the polyorganosiloxane composition of the present invention to be reduced, resulting in improved workability.

(Polymerization Initiator)

Examples of the polymerization initiator include a photo-polymerization initiator, a thermal polymerization initiator, and peroxide for use in redox polymerization. The type of the polymerization initiator can be appropriately selected depending on the polymerization method.

(Photo-Polymerization Initiator)

The photo-polymerization initiator is a radical polymerization initiator for use in photo-polymerization. Specific examples of the photo-polymerization initiator include benzophenone-type compounds such as benzophenone, 4-methylbenzophenone, 2,4,6-trimethylbenzophenone, methyl o-benzoylbenzoate, and 4-phenylbenzophenone; anthraquinone-type compounds such as t-butylanthraquinone and 2-ethylanthraquinone; alkylphenone-type compounds such as 2-hydroxy-2-methyl-1-phenylpropan-1-one, oligo{2-hydroxy-2-methyl-1-[4-(1-methylvinyl)phenyl]propanone}, benzyldimethylketal, 1-hydroxycyclohexylphenyl ketone, benzoin methyl ether, 2-methyl-[4-(methylthio)phenyl]-2-morpholino-1-propanone, and 2-hydroxy-1-{4-[4-(2-hydroxy-2-methylpropionyl)benzyl]phenyl}-2-methylpropan-1-one; thioxanthone-type compounds such as 2-benzyl-2-dimethylamino-1-(4-morpholinophenyl)-butanone-1, diethylthioxanthone, and isopropylthioxanthone; acylphosphine oxide-type compounds such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)-phenylphosphine oxide; and phenyl glyoxylate-type compounds such as phenyl glyoxylic acid methyl ester.

In particular, an alkylphenone-type compound is preferable, and 2-hydroxy-2-methyl-1-phenylpropan-1-one and 1-hydroxycyclohexylphenyl ketone are more preferable from the viewpoint that coloration of the cured product can be suppressed. An acylphosphine oxide-type compound is preferable from the viewpoint that the cured product is easily sufficiently cured to the inside thereof, and 2,4,6-trimethylbenzoyldiphenylphosphine oxide is more preferable from the viewpoint that coloration of the cured product can be suppressed. Such photo-polymerization initiators may be used singly or in combination of two or more kinds thereof.

In the case where the cured product is obtained by curing the curable composition by photo-polymerization, the wavelength of light with which the curable composition is irradiated is not particularly limited, and the curable composition is preferably irradiated with ultraviolet light having wavelengths of 200 to 400 nm. Specific examples of the source of ultraviolet light include an ultrahigh-pressure mercury lamp, a high-pressure mercury lamp, a metal halide lamp, a high-power metal halide lamp, a UV-LED lamp, a chemical lamp, and a black light. The curable composition may be further subjected to postcure after photo-polymerization. Thus, the amount of an unreacted (meth)acryloyl group remaining in the cured product can be decreased and the strength of the cured product can be more enhanced. The postcure is preferably performed in conditions of 70 to 150° C. and 0.01 to 24 hours, more preferably 80 to 130° C. and 0.1 to 10 hours.

(Thermal Polymerization Initiator)

The thermal polymerization initiator is a radical polymerization initiator for use in thermal polymerization. Examples of the thermal polymerization initiator include organic peroxide and an azo compound.

Specific examples of the organic peroxide include ketone peroxides such as methyl ethyl ketone peroxide; peroxyketals such as 1,1-di(t-hexylperoxy)-3,3,5-trimethylcyclohexane, 1,1-di(t-hexylperoxy)cyclohexane, and 1,1-di(t-butylperoxy)cyclohexane; hydroperoxides such as 1,1,3,3-tetramethylbutyl hydroperoxide, cumene hydroperoxide, and p-menthane hydroperoxide; dialkyl peroxides such as dicumyl peroxide and di-t-butyl peroxide; diacyl peroxides such as dilauroyl peroxide and dibenzoyl peroxide; peroxydicarbonates such as di(4-t-butylcyclohexyl)peroxydicarbonate and di(2-ethylhexyl)peroxydicarbonate; and peroxyesters such as t-butylperoxy-2-ethylhexanoate, t-hexylperoxyisopropylmonocarbonate, t-butylperoxybenzoate, and 1,1,3,3-tetramethylbutylperoxy-2-ethylhexanoate.

Specific examples of the azo compound include 2,2'-azobisisobutyronitrile, 2,2'-azobis(2-methylbutyronitrile), 2,2'-azobis(2,4-dimethylvaleronitrile), 1,1'-azobis-1-cyclohexanecarbonitrile, dimethyl-2,2'-azobisisobutyrate, 4,4'-azobis-4-cyanovaleric acid, and 2,2'-azobis-(2-amidinopropane)dihydrochloride.

Such thermal polymerization initiators may be used singly or in combination of two or more kinds thereof. The thermal polymerization initiator is preferably organic peroxide because air bubbles hardly occur in the cured product. The 10-hour half-life temperature of the organic peroxide is preferably 35 to 80° C., more preferably 40 to 75° C., further preferably 45 to 70° C. in consideration of the balance between the curing time and the pot life of the curable composition. The 10-hour half-life temperature is 35° C. or more, thereby allowing the curable composition to be hardly gelated at ordinary temperature, resulting in improved pot life. On the other hand, the 10-hour half-life temperature is 80° C. or less, thereby enabling the curing time of the curable composition to be shortened.

Examples of such organic peroxide include 1,1,3,3-tetramethylbutylperoxy-2-ethylhexanoate, t-butylperoxy-2-ethylhexanoate, and di(4-t-butylcyclohexyl)peroxydicarbonate. Examples of commercially available products of 1,1,3,3-tetramethylbutylperoxy-2-ethylhexanoate include PEROCTA O (trade name, manufactured by NOF CORPORATION, 10-hour half-life temperature: 65.3° C.). Examples of commercially available products of t-butylperoxy-2-ethylhexanoate include PERBUTYL O (trade name, manufactured by NOF CORPORATION, 10-hour half-life temperature: 72.1° C.). Examples of commercially available products of di(4-t-butylcyclohexyl)peroxydicarbonate include PERLOYL TCP (trade name, manufactured by NOF CORPORATION, 10-hour half-life temperature: 40.8° C.).

In the case where the cured product is obtained by curing the curable composition by thermal polymerization, curing conditions are not particularly limited, and the curing temperature is preferably 40 to 200° C., more preferably 60 to 150° C. from the viewpoint that a resin for an optical member, suppressed in coloration, is easily obtained. The curing time (heating time) varies depending on the curing temperature, and is preferably 1 to 120 minutes, more preferably 1 to 60 minutes.

The curable composition is preferably further subjected to postcure after thermal polymerization. The postcure is preferably performed in conditions of 50 to 150° C. and 0.1 to 10 hours, more preferably 70 to 130° C. and 0.2 to 5 hours.
(Redox Polymerization)

A redox-type polymerization initiator is usually used in redox polymerization. The redox-type polymerization initiator is a polymerization initiator where peroxide and a reducing agent are used in combination. Examples of the peroxide for use in redox polymerization include dibenzoyl peroxide and hydroperoxide. Such peroxides may be used singly or in combination of two or more kinds thereof. In the case where such peroxide is used as the redox-type polymerization initiator, a combination thereof with the reducing agent is as follows.

(1) A combination of dibenzoyl peroxide (peroxide) with an aromatic tertiary amine compound (reducing agent) such as N,N-dimethylaniline, N,N-dimethyl-p-toluidine, or N,N-bis(2-hydroxypropyl)-p-toluidine.
(2) A combination of hydroperoxide (peroxide) with metal soap (reducing agent).
(3) A combination of hydroperoxide (peroxide) with a thiourea compound (reducing agent).

In the case where the cured product is obtained by curing the curable composition by redox polymerization, such curing can be made at an ordinary temperature of 5 to 40° C. by use of the redox-type polymerization initiator. The curing temperature is preferably 15 to 40° C. from the viewpoint that the amount of an unreacted (meth)acryloyl group remaining in the resulting resin for an optical member can be decreased and the strength of such a resin for an optical member can be more enhanced.

A preferable method is a method of performing curing according to a procedure including dissolving the reducing agent in the curable composition in advance and adding the peroxide thereto, from the viewpoint that the curable composition is hardly gelated and stably handled.

In curing of the curable composition, the curable composition is preferably cured with being sealed in order that inhibition of curing due to oxygen is suppressed. Examples of the sealing method include a method including sandwiching the curable composition between glass or PET films.
(Organic Solvent)

An organic solvent can be contained for the purpose of dilution of the polyorganosiloxane and the composition of the present invention. The type of such an organic compound is not particularly limited as long as physical properties demanded for the cured products of the polyorganosiloxane and the composition of the present invention are not impaired, and any of aromatic hydrocarbons (for example, toluene, xylene, ethyl benzoate, ethylbenzene, and benzyl alcohol), ketone compounds (for example, acetone, methyl ethyl ketone, methyl isobutyl ketone, diisobutyl ketone, cyclohexanone, and diacetone alcohol), ester compounds (for example, methyl acetate, ethyl acetate, butyl acetate, sec-butyl acetate, methoxybutyl acetate, amyl acetate, n-propyl acetate, ethyl lactate, methyl lactate, butyl lactate, propylene glycol monomethyl ether acetate, and γ-butyrolactone), ether compounds (for example, isopropyl ether, ethylene glycol monomethyl ether, propylene glycol monomethyl ether, ethylene glycol monobutyl ether, 1,4-dioxane, methyl tert-butyl ether, and tetrahydrofuran), alcohol compounds (for example, methanol, ethanol, n-propanol, isopropanol, butanol, sec-butanol, tert-butanol, and n-pentanol), halogen-based solvents (for example, methylene chloride, trichloroethylene, tetrachloroethylene, bromopropane, chloroform), others (for example, dimethylsulfoxide and N,N-dimethylformamide), and the like which are favorable in solubility may be used, and two or more kinds of solvents may be used.

The content is not particularly limited as long as physical properties demanded for the cured products of the polyorganosiloxane and the composition of the present invention are not impaired, and the content is preferably more than 0% by weight and 25% by weight or less based on the total of the polyorganosiloxane or the composition in the case where the viscosity is aim to be low with the volatile content being suppressed to a low value. The content is preferably 75% by weight or more and less than 100% by weight based on the total of the composition in the case where a cured product as a thin film is demanded to be obtained.
(Cured Product of Polyorganosiloxane Composition)

The polyorganosiloxane composition of the present invention can be cured by heat or light.

The curing conditions of the polyorganosiloxane composition of the present invention are not particularly limited, and the curing can be made in any conditions which are appropriately adopted in curing of a silicone resin, depending on the type of the polymerization initiator, and the like.
(Characteristics of Cured Product)

The polyorganosiloxane and the composition of the present invention, which have 40% by mol or more of a unit including a (meth)acryloyl group based on the total amount of the M, D, T, and Q units, can be each cured to thereby provide a cured product having the following characteristics.
High Abbe's Number and High Refractive Index A cured product high in Abbe's number and high in refractive index can be obtained which not only usually has an Abbe's number of 44 or more, preferably 50 or more, more preferably 56 or more, but also usually has a refractive index of 1.43 or more, preferably 1.45 or more, more preferably 1.50 or more. Moreover, a cured product which is higher in Abbe's number and higher in refractive index than a single cured product of a (meth)acrylic resin composition used can be obtained in the case of the polyorganosiloxane composition. The Abbe's number and the refractive index are measured according to methods described in Examples below.
Low Water Absorption Rate A cured product can be obtained where the cured product dried usually has a water absorption rate of 2% by mass or less, preferably 1% by mass or less, further preferably 0.8% by mass or less after standing under an environment of 85° C. and a humidity of 85% RH for 168 hours. Moreover, a cured product which is lower in water absorption rate than a single cured product of a (meth)acrylic resin composition used can be obtained in the case of the polyorganosiloxane composition. The water absorption rate is measured according to a method described in Examples below.
High Pencil Hardness A cured product usually having a pencil strength of H or more, preferably 3H or more, more preferably 8H or more can be obtained. Moreover, a cured product which is higher in pencil hardness than a single cured product of a (meth) acrylic resin composition used can be obtained in the case of the polyorganosiloxane composition. The pencil hardness is measured according to a method described in Examples below.

High Storage Elastic Modulus

A cured product usually having a storage elastic modulus at 100° C. of 750 MPa or more, preferably 1000 MPa or more, more preferably 2000 MPa or more can be obtained. Moreover, a cured product which is higher in storage elastic modulus than a single cured product of a (meth)acrylic resin composition used can be obtained in the case of the polyorganosiloxane composition. The storage elastic modulus is measured according to a method described in Examples below.

Colorless and Transparent

A cured product usually having a total light transmittance of 85% or more, preferably 90% or more, more preferably 95% or more can be obtained. Moreover, a transparent cured product can be obtained without any reduction in total light transmittance of a single cured product of a (meth)acrylic resin composition used, in the case of the polyorganosiloxane composition.

A cured product usually having a yellow index (YI) of 2 or less, preferably 1 or less, more preferably 0.5 or less can be obtained. Moreover, a colorless cured product which is not increased in YI of a single cured product of a (meth) acrylic resin composition used can be obtained in the case of the polyorganosiloxane composition.

A cured product usually having a haze of 2 or less, preferably 1 or less, more preferably 0.1 or less can be obtained. Moreover, a transparent cured product can be obtained without any increase in haze of a single cured product of a (meth)acrylic resin composition used, in the case of polyorganosiloxane composition. The total light transmittance, the YI, and the haze are measured according to methods described in Examples below.

High Glass Transition Temperature (High Tg)

A cured product usually having a Tg of 100° C. or more, preferably 200° C. or more, more preferably having no Tg confirmed can be obtained. Moreover, the Tg of a single cured product of a (meth)acrylic resin composition used can be increased in the case of the polyorganosiloxane composition.

Low Linear Expansion Coefficient

A cured product usually having a linear expansion coefficient of 200 ppm/K or less, preferably 140 ppm/K or less, more preferably 70 ppm/K or less can be obtained. Moreover, a cured product which is lower in linear expansion coefficient than a single cured product of a (meth)acrylic resin composition used can be obtained in the case of the polyorganosiloxane composition. The linear expansion coefficient is measured according to a method described in Examples below.

High Thermal Shock Resistance

A cured product having a high solder reflow resistance can be obtained.

(Use as Optical Member)

The polyorganosiloxane and the polyorganosiloxane composition of the present invention is high in Abbe's number and high in refractive index, excellent in optical characteristics, high in strength, and also high in solder reflow resistance and thus excellent in production process suitability, and therefore can be preferably used for an optical member.

There can be used for various optical members, for example, any plastic lens such as a camera lens, a pickup lens, an eyeglass lens, a fresnel lens, and a prism lens, an optical over-coating agent, a hard coating agent, an antireflection film, an optical fiber, an optical waveguide, a hologram, a prism lens, and an optical member for an optical semiconductor, and among them, use for a plastic lens such as a camera lens is suitable.

The present invention also encompasses the following embodiment (third aspect).

The following electrolytic solution for an electrolytic capacitor includes at least a solvent, a solute, and a polyorganosiloxane represented by specific general formula (201).

(Polyorganosiloxane)

The polyorganosiloxane according to the present embodiment is represented by the following general formula (201).

$$(R^{201}R^{202}R^{203}SiO_{1/2})_a(R^{204}R^{205}SiO_{2/2})_b(R^{206}SiO_{3/2})_c(SiO_{4/2})_d(O_{1/2}R^{207})_e(O_{1/2}H)_f \quad (201)$$

In the formula (201), $R^{201}$ to $R^{206}$ are each independently a hydrocarbon group having 1 to 10 carbon atoms, a group having a reactive functional group, or a hydrogen atom, and $R^{207}$ is an organic group having 1 to 8 carbon atoms, provided that at least one of $R^{201}$ to $R^{206}$ is a group having a reactive functional group, or a hydrogen atom, that the reactive functional group may be directly bound to silicon or may be bound with having a linking group other than a siloxane bond, and that a+b+c+d=1, a≥0.1, b≤0.5, c+d≥0.1, and e+f≤1.0 are satisfied.

The formula (201) means the polyorganosiloxane where the content of an M unit ($R^{201}R^{202}R^{203}SiO_{1/2}$) relative to the total of silicon, represented by a, is 10% by mol or more, the content of a D unit ($R^{201}R^{202}R^{203}SiO_{2/2}$) relative to the total of silicon, represented by b, is 50% by mol or less, the total of the content of a T unit ($R^{206}SiO_{3/2}$), represented by c, and the content of a Q unit ($SiO_{4/2}$), represented by d, is 10% by mol or more relative to the total of silicon, e+f, corresponding to the total of the content of an organic group bound to a main chain of the polyorganosiloxane via an oxygen atom, represented by e, and the content of a hydroxyl group directly bound to the main chain of the polyorganosiloxane, represented by f, is 1.0 or less under assumption that the total of silicon constituting the main chain of the polyorganosiloxane is 1, $R^{201}$ to $R^{206}$ are each independently a group having a hydrocarbon group having 1 to 10 carbon atoms or a reactive functional group, or a hydrogen atom, and $R^{207}$ is an organic group having 1 to 8 carbon atoms.

The group having a reactive functional group means that a reactive functional group directly bound to silicon in the formula (201) or a reactive functional group bound to silicon via a linking group in the formula (201) is present.

Moreover, a, b, c, and d are defined in terms of numerical values under assumption that a+b+c+d=1 is satisfied in terms of numerical values each representing the percentage of a unit containing silicon in the main chain of the polysiloxane in the present embodiment.

In the formula (201) for use in the present embodiment, a representing the percentage of the M unit is 0.1 or more, preferably 0.2 or more. In addition, a is less than 1, preferably 0.8 or less, more preferably 0.7 or less. Preferably, a falls within the range, because the molecular weight of the polyorganosiloxane represented by the formula (201) is easily controlled, more specifically, not only the molecular weight can easily fall within a proper range which is not too low, but also a structure having appropriate crosslinked structure, branched structure, and/or cyclic structure can be obtained to result in enhancements in strength and uniformity of a protective layer of an electrode.

In the polyorganosiloxane represented by the formula (201) for use in the present embodiment, b representing the percentage of the D unit in the formula (201) is 0.5 or less, preferably 0.4 or less, more preferably 0.3 or less, and may also be 0. In the formula (201), preferably, b falls within the range to enable the polyorganosiloxane to have a structure having appropriate crosslinked structure, branched structure, and/or cyclic structure, resulting in enhancements in strength and uniformity of a protective layer of an electrode.

In the polyorganosiloxane represented by the formula (201) for use in the present embodiment, c+d, with respect to c representing the percentage of the T unit and d representing the percentage of the Q unit, is 0.1 or more, preferably 0.15 or more, more preferably 0.2 or more. Moreover, c+d preferably satisfies 0.9 or less, more preferably 0.8 or less. In the formula (201), c+d falls within the range to enable the polyorganosiloxane represented by the formula (201) to have a structure having appropriate crosslinked structure, branched structure, and/or cyclic structure, resulting in enhancements in strength and uniformity of a protective layer of an electrode.

The upper limit of e+f meaning the total of the organic group and the hydroxyl group bound to the polyorganosiloxane serving as a matrix modified by the reactive functional group, via an oxygen atom, satisfies 1.0, preferably 0.5 or less, more preferably 0.2 or less. The numerical value preferably falls within the range because of an enhancement in preservation stability of the polyorganosiloxane serving as a matrix. Moreover, e+f preferably satisfies 0.001 or more because it is considered that a reaction or interaction with the reactive functional group or the surface of an electrode occurs to result in enhancements in strength of a protective layer of an electrode and in a binding force to an electrode.

In the formula (201), $R^{201}$ to $R^{206}$ are each independently a hydrocarbon group having 1 to 10 carbon atoms, a group having a reactive functional group, or a hydrogen atom, provided that at least one of $R^{201}$ to $R^{206}$ is a group having a reactive functional group, or a hydrogen atom, and the reactive functional group may be directly bound to silicon, or may be bound with having a linking group other than a siloxane bond.

The hydrocarbon group having 1 to 10 carbon atoms is not particularly limited as long as the number of carbon atoms is in such a range, and examples include not only linear alkyl groups such as a methyl group, an ethyl group, a n-propyl group, a n-butyl group, a n-pentyl group, a n-hexyl group, a n-heptyl group, a n-octyl group, a n-nonyl group, and a n-decyl group, but also groups having a branched structure, such as an isopropyl group, an isobutyl group, a sec-butyl group, a tert-butyl group, an isoamyl group, a sec-amyl group, a tert-amyl group, a texyl group, and a 2-ethylhexyl group, and groups having a cyclic structure, such as a cyclohexyl group, a cyclobutyl group, a cyclopentyl group, a cyclohexyl group, a phenyl group, a benzyl group, a phenethyl group, a 1-phenylethyl group, and a naphthyl group.

The type of the reactive functional group is not particularly limited, and the reactive functional group may include a branched structure or a cyclic structure and preferably includes at least one group selected from the group consisting of an alkenyl group, a methacryloyl group, an acryloyl group, an acyl group, a cyclic ether group, a hydroxyl group, an acetoxy group, a monohydroxysilyl group, a dihydroxysilyl group, a trihydroxysilyl group, a monoalkoxysilyl group, a dialkoxysilyl group, and a trialkoxysilyl group, and a hydrogen atom taken together with silicon to form a hydrosilyl group from the viewpoint of solubility and stability, a reaction or interaction with the surface of an electrode, strength of a protective layer of an electrode, and a binding force to an electrode, and the like. Such groups may be used singly or in combination of a plurality of kinds thereof.

In particular, more preferable is at least one group selected from the group consisting of a cyclic ether group, a hydroxyl group, a monohydroxysilyl group, a dihydroxysilyl group, a trihydroxysilyl group, a monoalkoxysilyl group, a dialkoxysilyl group, and a trialkoxysilyl group. The cyclic ether group is particularly preferably an epoxy group. The epoxy group suitably used is an epoxy group obtained by oxidizing and thus converting a glycidyloxy group, an alicyclic epoxy group, or an alkenyl group, and an epoxy group obtained by converting an alkenyl group is particularly preferable.

The reactive functional group is considered to be effective for an enhancement in withstand voltage by enhancements in solubility of the polyorganosiloxane in a solvent used, and dispersing stability, or the occurrence of an interaction or reaction with the solute in the electrolytic solution or in a capacitor, an interaction or condensation reaction of the polyorganosiloxane, and/or an interaction or reaction with the surface of an electrode. Addition of a polyorganosiloxane into which the reactive functional group is introduced can allow for avoidance of the problem of easy occurrence of gelation due to a reaction with a solvent and/or a solute in addition of an organic silica colloid particle modified, resulting in an enhancement in withstand voltage.

The reactive functional group may be directly bound to silicon in the formula (201), or may be bound with having a linking group other than a siloxane bond. The linking group is not particularly limited as long as such a group includes no siloxane bond, and the linking group is usually preferably a divalent organic group, may have a branched or cyclic structure or both thereof and may have a heteroatom such as an oxygen atom, a nitrogen atom, a sulfur atom, or a phosphorus atom. Specifically, for example, a linear alkylene group or a branched alkylene group having 1 to 10 carbon atoms, a cyclic hydrocarbon group such as a cyclohexylene group or a phenylene group, or an oligoethylene glycol group such as an ethylene glycol group, a diethylene glycol group, or a triethylene glycol group is suitably used. In the case where the linking group here includes an oxygen atom, the atom directly bound to silicon in the polyorganosiloxane, in a linking chain, is an atom other than an oxygen atom.

The number of such reactive functional groups per a molecular weight of 1000 in the formula (201) is preferably 3 to 12. The lower limit value is 3 or more, more preferably 4 or more, and the upper limit is preferably 12 or less, more preferably 9 or less. The number of such reactive functional groups preferably falls within the range because the proportions of a polysiloxane moiety and a reactive functional group moiety in the entire structure of the polyorganosiloxane represented by the formula (201) are proper and not only the solubility in the solvent, but also strength and uniformity of a protective layer of an electrode can be simultaneously satisfied. The M unit, the D unit, and the T unit may be each used in combination of a plurality of kinds thereof, and for example, a unit where all $R^{201}$, $R^{202}$, and $R^{203}$ are methyl groups and a unit where $R^{201}$ and $R^{202}$ are methyl groups and $R^{203}$ is such a reactive functional group may be simultaneously used in the M unit represented by $(R^{201}R^{202}R^{203}SiO_{1/2})$.

$R^{207}$ is not particularly limited as long as it is an organic group having 1 to 8 carbon atoms, and is preferably a hydrocarbon group or an acyl group. Examples of the hydrocarbon group include not only linear alkyl groups such as a methyl group, an ethyl group, a n-propyl group, a n-butyl group, a n-pentyl group, a n-hexyl group, a n-heptyl group, and a n-octyl group, but also groups having a branched structure, such as an isopropyl group, an isobutyl group, a sec-butyl group, a tert-butyl group, an isoamyl group, a sec-amyl group, a tert-amyl group, a texyl group, and a 2-ethylhexyl group, and groups having a cyclic structure, such as a cyclohexyl group, a cyclobutyl group, a cyclopentyl group, a cyclohexyl group, a phenyl group, a benzyl group, a phenethyl group, and a 1-phenylethyl group, and among them, a methyl group, an ethyl group, a n-propyl group, a n-butyl group, an isopropyl group, and a phenyl group are particularly preferable. Examples of the acyl group include a formyl group, an acetyl group, a propionyl group, and a benzoyl group, and among them, an acetyl group is particularly preferable.

(Determination of Number of Reactive Functional Groups Bound to Silicon Per Molecular Weight of 1000)

The number of the reactive functional groups bound to silicon per a molecular weight of 1000 of the polyorganosiloxane represented by the formula (201), for use in the present embodiment, is determined as follow.

Weighed is 50 mg of a polyorganosiloxane for measurement, and 15 mg of toluene is added and precisely weighed as an internal standard. Furthermore, 1 g of deuterochloroform is placed and dissolved, and Relaxation Delay in 400 MHz $^1$H-NMR (AL-400 manufactured by JEOL Ltd.) is set to 20 seconds for measurement. The ratio of the signal intensity of each component and the signal intensity of toluene as the internal standard, and the values weighed are used to calculate the content of the reactive functional group per gram (mmol/g), namely, the number of the reactive functional groups per a molecular weight of 1000 of the polyorganosiloxane. Here, impurities such as an organic substance, water, and a metal not bound to the polyorganosiloxane are needed to be removed to amounts of less than 0.1% by mass so as not to affect any measurement results. In the case where such impurities are present in amounts of more than 0.1% by mass, these are removed by distillation, filtration, and/or other purification method, and thereafter a sample is prepared and subjected to $^1$H-NMR measurement. In the case where such removal is difficult, the resulting difference obtained by calculating the content of the impurities by $^1$H-NMR measurement and/or other analysis method and subtracting the weight of the impurities from the weight of the sample weighed, so that the impurities are not subjected as a part of the polyorganosiloxane to calculation, is used as the true amount of the sample. Herein, the internal standard which can be used is any substance such as not only toluene, but also N,N-dimethylformamide or tribromoethane, provided that such a substance does not react with the polyorganosiloxane of the present invention.

The polyorganosiloxane represented by the formula (201), for use in the present embodiment, may include a hydroxysilyl group remaining, not condensed, or an organic group bound to the polyorganosiloxane via an oxygen atom, as long as the formula (201) is satisfied. The hydroxysilyl group remaining in the polyorganosiloxane and the organic group bound to the polyorganosiloxane via an oxygen atom may contribute to a condensation reaction, an interaction with the reactive functional group, and/or an interaction with an electrode, resulting in an enhancement in withstand voltage. While such groups correspond to a hydroxy group directly bound to the polyorganosiloxane serving as a matrix, and an organic group bound to such a polyorganosiloxane via an oxygen atom, respectively, such groups may be each introduced as a separate reactive functional group via a linking group other than a siloxane bond.

The molecular weight of the polyorganosiloxane represented by the formula (201) for use in the present embodiment is not particularly limited, and the number average molecular weight Mn is usually 600 or more, preferably 800 or more, more preferably 900 or more, further preferably 950 or more, and is usually 50000 or less, preferably 30000 or less, more preferably 10000 or less, further preferably 5000 or less. The weight average molecular weight Mw is usually 800 or more, preferably 900 or more, more preferably 1000 or more, and is usually 100000 or less, preferably 80000 or less, more preferably 50000 or less. The number average molecular weight or the weight average molecular weight is equal to or more than the lower limit value, resulting in an enhancement in stability of a protective layer on the surface of an electrode. On the other hand, the number average molecular weight or the weight average molecular weight is equal to or less than the upper limit value, resulting in improvements in solubility in the solvent and compatibility with the solute, and thus an enhancement in stability of the electrolytic solution.

The number average molecular weight Mn and the weight average molecular weight Mw are measured in the following conditions by gel permeation chromatography (GPC), and can be each represented as a value in terms of standard polystyrene. A sample used is an about 10% by mass solution in THF, and is subjected to filtration by a 0.45-μm filter before measurement (Apparatus: TOSOH HLC-8220 GPC, Columns: KF-G, KF-401HQ, KF-402HQ, and KF-402.5HQ (manufactured by SHOWA DENKO K.K.), column temperature 40° C., Eluent: tetrahydrofuran, Flow rate 0.2 mL/min).

(Method for Producing Polyorganosiloxane)

The method for producing the polyorganosiloxane, with respect to the polyorganosiloxane represented by the formula (201), for use in the present embodiment, is not particularly limited as long as the method can provide the polyorganosiloxane having the structure. For example, the method may be any of production methods including a method of condensing a disiloxane compound or a disilazane compound, or a hydrolyzate thereof, or an alkoxysilane compound, or a hydrolysate or partially hydrolyzed condensate thereof, a method of condensing a chlorosilane compound, or a hydrolysate or a partially hydrolyzed condensate thereof, a method of ring-opening polymerizing a cyclic siloxane compound, and a method of chain polymerization such as anionic polymerization, and a plurality of such production methods may be used in combination. A polyorganosiloxane having a desired amount of a functional group and a desired molecular weight may be fractioned by column chromatography or GPC, extraction with a solvent, distillation off of unnecessary component(s), or the like.

The method for introducing the reactive functional group into the polyorganosiloxane represented by the formula (201), for use in the present embodiment, is not particularly limited. For example, the reactive functional group can be introduced with, as a raw material, a disiloxane compound having the reactive functional group, a disilazane compound having the reactive functional group, an alkoxysilane compound of the M unit, the D unit or the T unit having the reactive functional group, a chlorosilane compound of the M unit, the D unit or the T unit having the reactive functional group, a cyclic siloxane compound having the reactive functional group, or the like. The reactive functional group here introduced may be converted into another reactive functional group according to a chemical procedure. For example, the reactive functional group can be converted into another reactive functional group by a method including converting the reactive functional group into another reactive functional group by a reaction of a polyorganosiloxane having an alkenyl group and a monofunctional thiol having a reactive functional group, a method including oxidizing an alkenyl group with an oxidizing substance for conversion into an epoxy group, a method including converting the reactive functional group into another reactive functional group by a reaction of a polyorganosiloxane having a hydrogen atom directly bound to a silicon atom and a vinyl compound having a reactive functional group, a method including ring-opening a cyclic ether group introduced into the polyorganosiloxane for conversion into an alcoholic hydroxyl group, a method including hydrolyzing an alkoxy group present in the polyorganosiloxane for conversion into a hydroxysilyl group, or the like.

Examples of a method for converting an alkenyl group into an epoxy group include a method including reacting an oxidant with an alkenyl group, and a method including converting an alkenyl group into halohydrin and then allowing a base to act thereto for ring-closing, to thereby provide an epoxy group. Examples of the oxidant for epoxidation include organic peracids such as metachloroperbenzoic acid and peracetic acid, a combination of hydrogen peroxide and a metal catalyst, a combination of hydrogen peroxide and a compound having a nitrile group, and a dioxirane compound such as dimethyldioxirane.

(Solvent)

The electrolytic solution of the present embodiment includes a solvent, and the solvent may be usually a solvent for use in an electrolytic capacitor. Specific examples of such a solvent include alcohol solvents such as ethylene glycol, glycerin, and methyl cellosolve; lactone solvents such as γ-butyrolactone, γ-valerolactone, and δ-valerolactone; amide solvents such as N-methylformamide, N-ethylformamide, N,N-dimethylformamide, N,N-dimethylacetamide, and N-methylpyrrolidinone; carbonate solvents such as ethylene carbonate, propylene carbonate, and butylene carbonate; nitrile solvents such as 3-methoxypropionitrile and glutaronitrile; phosphate solvents such as trimethyl phosphate and triethyl phosphate; sulfone solvents such as dimethylsulfone, ethylmethylsulfone, diethylsulfone, ethylisopropylsulfone, ethylbutylsulfone, sulfolane, 3-methylsulfolane, and 2,4-dimethylsulfolane; sulfoxide solvents such as dimethylsulfoxide, methylethylsulfoxide, and diethylsulfoxide; urea solvents such as 1,3-dimethyl-2-imidazolidinone and 1,3-dimethyl-3,4,5,6-tetrahydro-2(1H)-pyrimidinone; and urethane solvents such as 3-methyl-2-oxazolidinone, or mixtures thereof. In particular, preferable are ethylene glycol and γ-butyrolactone being organic solvents which are high in solvency for various solutes and which provide an electrolytic solution excellent in temperature characteristics.

(Solute)

The electrolytic solution of the present embodiment includes a solute, and the solute may be usually a solute for use in an electrolytic capacitor. Specific examples of such a solute for use in the present invention include organic acid and/or inorganic acid onium salt(s).

Specific examples of the organic acid include aromatic monocarboxylic acids such as benzoic acid, toluic acid, cuminic acid, t-butylbenzoic acid, salicylic acid, and anisic acid; aliphatic monocarboxylic acids such as formic acid, acetic acid, propionic acid, 7-phenyl-7-methoxy-1-octanecarboxylic acid, and 6-phenyl-6-methoxy-1-heptanecarboxylic acid; aromatic dicarboxylic acids such as phthalic acid, 4-methylphthalic acid, and 4-nitrophthalic acid; unsaturated aliphatic dicarboxylic acids such as maleic acid, citraconic acid, dimethylmaleic acid, and 1,2-cyclohexenedicarboxylic acid; linear saturated aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, and tridecanedioic acid; saturated aliphatic dicarboxylic acid compounds having a branched chain, such as dimethylmalonic acid, diethylmalonic acid, dipropylmalonic acid, 2-methylglutaric acid, 3-methylglutaric acid, 3,3-dimethylglutaric acid, 3-methyladipic acid, 2,2,4-trimethyladipic acid, 2,4,4-trimethyladipic acid, 1,6-decanedicarboxylic acid, 5,6-decanedicarboxylic acid, 1,7-octanedicarboxylic acid, 7-methyl-7-carbomethoxy-1,9-decanedicarboxylic acid, 2,8-nonanedicarboxylic acid, 7,8,11,12-tetramethyl-1,18-octadecanedicarboxylic acid, 1-methyl-3-ethyl-1,7-heptanedicarboxylic acid, 1,3-dimethyl-1,7-heptanedicarboxylic acid, 5-methyl-1,7-octanedicarboxylic acid, 7,12-dimethyl-1,18-octadecanedicarboxylic acid, 7-ethyl-1,16-hexadecanedicarboxylic acid, 7,8-dimethyl-1,14-tetradecanedicarboxylic acid, 1,6-heptanedicarboxylic acid, 6-methyl-6-carbomethoxy-1,8-nonanedicarboxylic acid, 1,8-nonanedicarboxylic acid, 8-methyl-8-carbomethoxy-1,10-undecanedicarboxylic acid, 6-ethyl-1,4-tetradecanedicarboxylic acid, and cyclohexanedicarboxylic acid; tricarboxylic acids such as 7-methyl-1,7,9-decanetricarboxylic acid, 6-methyl-1,6,8-nonanetricarboxylic acid, and 8-methyl-1,8,10-undecanetricarboxylic acid; acidic phosphates such as dibutyl phosphate and bis(2-ethylhexyl) phosphate; and (2-ethylhexyl) 2-ethylhexylphosphonate, or mixtures thereof. Specific examples of such an inorganic acid component include boric acid and phosphoric acid.

Phthalic acid, maleic acid, benzoic acid, and adipic acid, among the organic acid components and the inorganic acid components, are preferable for a low-pressure capacitor having a rated voltage of 100 V or less because an electrolytic solution having a high electric conductivity is obtained. Azelaic acid, sebacic acid, 1,6-decanedicarboxylic acid, 1,7-octanedicarboxylic acid, and boric acid are preferable for a high-pressure capacitor having a rated voltage of 300 V or more because an electrolytic solution having a high withstand voltage is obtained. Benzoic acid, adipic acid, and azelaic acid are preferable for a moderate-pressure capacitor having a rated voltage of more than 100 V and less than 300 V because an electrolytic solution having moderate electric conductivity and withstand voltage is obtained.

Specific examples of the onium salt include ammonium; monoalkylammoniums such as methylammonium and ethylammonium; dialkylammoniums such as dimethylammonium, diethylammonium, and ethylmethylammonium; tertiary ammoniums such as trimethylammonium, ethyldimethylammonium, diethylmethylammonium, and triethylammonium; quaternary ammoniums such as tetramethylammonium, triethylmethylammonium, tetraethylammonium, N,N-dimethylpyrrolidinium, N-ethyl-N-methylpyrrolidinium, N,N-diethylpyrrolidinium, N,N-tetramethylenepyrrolidinium, N,N-dimethylpiperidinium, N-ethyl-N-methylpiperidinium, N,N-diethylpiperidinium, N,N-tetramethylenepiperidinium, N,N-pentamethylenepiperidinium, and N,N-spirobipyrrolidinyl; quaternary imidazoliums such as 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-methyl-3-n-propyl-2,4-dimethylimidazolium, 1,2,3,4-tetramethylimidazolium, 1,2,3,4,5-pentamethylimidazolium, and 2-ethyl-1,3-dimethylimidazolium;

quaternary imidazoliums such as 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-methyl-3-n-propyl-2,4-dimethylimidazolium, 1,2,3,4-tetramethylimidazolium, and 2-ethyl-1,3-dimethylimidazolium; tetrahydropyrimidiniums such as 1,3-dimethyltetrahydropyrimidinium, 1,3-diethyltetrahydropyrimidinium, 1-ethyl-3-methyltetrahydropyrimidinium, 1,2,3-trimethyltetrahydropyrimidinium, 1,2,3-triethyltetrahydropyrimidinium, 1-ethyl-2,3-dimethyltetrahydropyrimidinium, 2-ethyl-1,3-dimethyltetrahydropyrimidinium, 1,2-diethyl-3-methyltetrahydropyrimidinium, and 1,3-diethyl-2-methyltetrahydropyrimidinium, or mixtures thereof.

Ammonia is preferable for such moderate- to high-pressure capacitors, which allows an electrolytic solution having a high withstand voltage to be obtained in a combination of an ethylene glycol solvent with any dicarboxylic acid such as 1,6-decanedicarboxylic acid.

1,2,3,4-Tetramethylimidazolium, 1-ethyl-2,3-dimethylimidazolium, tetramethylammonium, triethylmethylammonium, and tetraethylammonium are preferable for such a low-pressure capacitor, which allow an electrolytic solution having a high electric conductivity to be obtained in a combination of a γ-butyrolactone solvent with phthalic acid.

The amount of the solute to be used is preferably in the range from 5 to 30% by mass based on the total weight of the solvent and the solute.

The polyorganosiloxane represented by the formula (201), for use in the present embodiment, is preferably contained at a content of about 0.5% by mass to 18% by mass in the entire electrolytic solution, and is more preferably at a lower limit value of 1% by mass or more, more preferably 5% by mass or more, and more preferably at an upper limit value of 15% by mass or less, more preferably 10% by mass or less.

In the present embodiment, the electrolytic solution can also contain water for the purpose of an enhancement in chemical conversion properties. The content of such water is preferably in the range from 0.01 to 30% by mass, further preferably in the range from 0.01 to 10% by mass. Still other additive(s) can also be, if necessary, contained in the electrolytic solution. Examples of such other additive(s) include boron compounds such as boric acid and a complex compound of boric acid with any polyhydric alcohol (ethylene glycol, mannitol, sorbitol, or the like); phosphorus compounds such as phosphoric acid, acidic phosphates [dibutyl phosphate and bis(2-ethylhexyl) phosphate], and acidic phosphonates [(2-ethylhexyl) 2-ethylhexylphosphonate]; and nitro compounds such as p-nitrobenzoic acid and m-nitroacetophenone.

The electrolytic solution of the present embodiment can be used in, for example, a winding-type aluminum electrolytic capacitor illustrated in FIG. 1 or FIG. 2, and a separator (also referred to as "spacer") illustrated by reference numeral 3 in the Fig. is impregnated with the electrolytic solution. Kraft paper or Manila paper is generally used for the separator.

EXAMPLES

Hereinafter, the present invention will be specifically described with reference to Examples, but the present invention is not intended to be limited thereto. Materials used in Examples and measurement methods of evaluation items are as follows. In Examples, "part(s)" and "%" are on a mass basis, unless particularly noted.

Evaluation I: Examples 1-1 to 1-5 and Comparative Examples 1-1 to 1-6

[Measurement Methods]

1. Measurement of Amount of Reactive Functional Group in Polyorganosiloxane

Weighed was 50 mg of a polyorganosiloxane for measurement, and 15 mg of toluene was added and precisely weighed as an internal standard. Furthermore, 1 g of deuterochloroform was placed and dissolved, and Relaxation Delay in 400 MHz $^1$H-NMR (AL-400 manufactured by JEOL Ltd.) was set to 20 seconds for measurement. The ratio of the signal intensity of each component and the signal intensity of toluene as the internal standard, and the values weighed were used to calculate the content of the alkoxy group, and the content of the reactive functional group per gram (mmol/g), namely, the number of the reactive functional groups per a molecular weight of 1000 of the polyorganosiloxane. Here, impurities such as an organic substance, water, and a metal not bound to the polyorganosiloxane were needed to be removed to amounts of less than 0.1% by weight so as not to affect any measurement results. In the case where such impurities were present in amounts of more than 0.1% by weight, these were removed by distillation, filtration, and/or other purification method, and thereafter a sample was adjusted and subjected to $^1$H-NMR measurement. In the case where such removal was difficult, the resulting difference obtained by calculating the content of the impurities by $^1$H-NMR measurement and/or other analysis method and subtracting the weight of the impurities from the weight of the sample weighed, so that the impurities were not subjected as a part of the polyorganosiloxane to calculation, was used as the true amount of the sample. Herein, the internal standard usable was any substance such as not only toluene, but also N,N-dimethylformamide or tribromoethane, provided that such a substance did not react with the polyorganosiloxane.

2. Measurement Method of $^{29}$Si-NMR

Apparatus: JNM-ECS 400 manufactured by JEOL Ltd., TUNABLE (10), Si-free, AT10 probe Measurement conditions: Relaxation Delay/15 seconds, number of scanning times/1024, measurement mode/non-gated decoupling pulse method (NNE), spinning/none, measurement temperature/25° C.

Adjustment of sample: Tris(2,4-pentanedionato)chromium III was added to deuterochloroform so as to be in an amount of 0.5% by weight, thereby providing a solvent for $^{29}$Si-NMR measurement. Weighed was 1.5 g of a polyorganosiloxane for measurement, 2.5 ml of the solvent for $^{29}$Si-NMR measurement was placed therein for dissolution, and the resulting solution was placed in a NMR sampling tube made of Teflon (registered trademark) having a diameter of 10 mm.

3. Measurement of Molecular Weight

The number average molecular weight Mn and the weight average molecular weight Mw of each polyorganosiloxane were measured in the following conditions by gel permeation chromatography (GPC), and were each represented as a value in terms of standard polystyrene. A sample used was an about 10% by weight solution in THF, and was subjected to filtration by a 0.45-μm filter before measurement.

Apparatus: TOSOH HLC-8220 GPC
Columns: KF-G, KF-401HQ, KF-402HQ, and KF-402.5HQ (manufactured by SHOWA DENKO K.K.), column temperature 40° C.
Eluent: tetrahydrofuran, Flow rate 0.3 mL/min
4. Infrared Absorption Measurement (IR Measurement)
Fourier Transform Infrared Spectroscopy
Apparatus: Nic-Plan manufactured by Thermo Fisher Scientific
Resolution: 4 cm$^{-1}$
Accumulated number: 64
The maximum absorption wavenumber was measured according to an ATR method (Attenuated Total Reflection)
5. Measurement of Amount of Weight Loss in Heating Under Reduced Pressure
$^1$H-NMR measurement was conducted to calculate the weight of each component other than the polyorganosiloxane, such as an organic solvent. A rotor was placed in an eggplant flask, and the total weight of both was measured. Thereafter, the polyorganosiloxane was placed in the eggplant flask, and the weight of the polyorganosiloxane was measured. The eggplant flask was heated in an oil bath, stirring was made by rotation of the rotor by a magnetic stirrer to some extent that the liquid surface was allowed to flow, the temperature was raised to an internal temperature of 110° C., and pressure reduction was made by an oil system vacuum pump. The oil system vacuum pump used was one having the pressure reduction ability which enabled a degree of pressure reduction of 0.15 Torr to be achieved. After 2 hours, cooling to room temperature and returning to ordinary pressure were made, any oil attached to the eggplant flask was sufficiently wiped, and the weight of the polyorganosiloxane placed in the eggplant flask was measured and the total weight of both the eggplant flask and the rotor measured in advance was subtracted therefrom, thereby allowing the weight of volatilization due to the above operation to be calculated. The polyorganosiloxane after the above operation was subjected to $^1$H-NMR measurement, and the weight of each component other than the polyorganosiloxane, such as an organic solvent, was calculated. The amount of each component other than the polyorganosiloxane was subtracted from the weight of volatilization, and the amount of weight loss of the polyorganosiloxane was calculated.
6. Method for Confirming Characteristics at 40° C.
A 500-ml eggplant flask was charged with 100 g of each polyorganosiloxane and a rotor having a diameter of 8 mm and a length of 30 mm, and the content was heated by an oil bath with stirring by a magnetic stirrer until the internal temperature reached 40° C. Thereafter, a mode was determined to be a liquid in the case where an oil was attached to a glass bar in touch of the polyorganosiloxane with the glass bar and 90% or more of a liquid was moved from the bottom toward a side surface of the flask over 30 minutes after tipping of the eggplant flask right beside by 90°.
7. Measurement of Viscosity
The viscosity was measured as a value at a temperature of 25° C., by a Brookfield viscometer (E-type viscosity meter).
8. Measurement Method of Flash Point
The flash point was measured as a value determined by measurement with a Pensky-Martens closed cup according to JIS K 2265-3:2007 or ISO 2719:2002 in the case of a flash point of 80° C. or less, or as a value obtained by measurement with a Cleveland open cup according to JIS K 2265-4:2007 or ISO 2592:2000 in the case of a flash point of 80° C. or more. Here, the flash point of VQ 2012 manufactured by Siltech Corporation was 49° C. as a value described in the catalog of Siltech Corporation.
9. Measurement Method of Linear Expansion Coefficient
The linear expansion coefficient of each cured product was determined as a measurement value obtained by subjecting such a cured product having a thickness of 1 mm to measurement with the following apparatus, mode and temperature program, and providing the average linear expansion coefficient of values obtained at 50° C. to 100° C. in the second temperature rise.
Apparatus: TMA/SS 6100 manufactured by SII NanoTechnology Inc.
Mode: compression mode
Temperature program:
1. temperature rise from 30° C. to 120° C. at 5° C./min
2. held at 120° C. for 5 minutes
3. temperature drop from 120° C. to 30° C. at 50° C./min
4. held at 30° C. for 5 minutes
5. temperature rise from 30° C. to 120° C. at 5° C./min
6. held at 120° C. for 5 minutes
10. Measurement Method of Three-Point Bending Elastic Modulus
Apparatus: tabletop-type universal testing machine AG-Xplus manufactured by Shimadzu Corporation
Load cell: 5 kN
Measurement jig: plastic three-point bending testing jig
Test piece: 2 mm thickness, 14.25 mm width, 30 mm length
Distance between lower pivot points: 17.6 mm
Rate of loading: 0.5 mm/min
11. Shore D Hardness
Measurement was made using an Asker rubber hardness meter D according to JIS K 6253.
[Production of Sample]
[Silicone Resin Used]
Reagents, solvents, and the like used in synthesis are as follows.
Hexamethyldisiloxane (manufactured by NuSil Technology LLC, product name: S-7205)
1,3-Divinyltetramethyldisiloxane (manufactured by NuSil Technology LLC, product name: PLY-70)
Tetraethoxysilane (manufactured by Kishida Chemical Co., Ltd.)
Ethyl silicate ES-40 (manufactured by COLCOAT CO., LTD.)
Methyl silicate MS-51 (manufactured by Mitsubishi Chemical Corporation)
(3-Methacryloyloxypropyl)trimethoxysilane (manufactured by Shin-Etsu Chemical Co., Ltd., trade name: KBM-503) Tetrahydrofuran (manufactured by Kishida Chemical Co., Ltd.)
Toluene (manufactured by Kishida Chemical Co., Ltd.)
Ethanol (manufactured by Kishida Chemical Co., Ltd.)
Methanol (manufactured by Kishida Chemical Co., Ltd.)
1 N Hydrochloric acid (manufactured by Kishida Chemical Co., Ltd.)
Heptane (manufactured by Kishida Chemical Co., Ltd.)
(1) Polyorganosiloxane 1
After 18.3 parts by weight of hexamethyldisiloxane, 64.3 parts by weight of 1,3-divinyltetramethyldisiloxane, and 105 parts by weight of tetraethoxysilane were dissolved in 187 parts by weight of tetrahydrofuran, a mixture of 24.7 parts by weight of 1 N hydrochloric acid and 24.7 parts by weight of ethanol was added, and stirred at 40° C. for 4 hours. The resultant was diluted with 374 parts by weight of heptane, and thereafter washed with demineralized water. The solvent was distilled off at 76° C. under a reduced pressure of 15

Torr by use of a rotary evaporator until distillation of the solvent was not visually observed. Subsequently, the resultant was heated at 110° C. under a reduced pressure of 0.15 torr for 2 hours, thereby providing 85.7 parts by weight of objective polyorganosiloxane 1.

(2) Polyorganosiloxane 2

After 18.3 parts by weight of hexamethyldisiloxane, 64.3 parts by weight of 1,3-divinyltetramethyldisiloxane, and 74.7 parts by weight of ethyl silicate ES-40 were dissolved in 157 parts by weight of tetrahydrofuran, a mixture of 17.9 parts by weight of 1 N hydrochloric acid and 17.9 parts by weight of ethanol was added, and stirred at 40° C. for 4 hours. The resultant was diluted with 315 parts by weight of heptane, and thereafter subjected to the same treatment as in the synthesis of polyorganosiloxane 1, thereby providing 87.2 parts by weight of objective polyorganosiloxane 2.

(3) Polyorganosiloxane 3

After 277 parts by weight of 1,3-divinyltetramethyldisiloxane and 132 parts by weight of methyl silicate MS-51 were dissolved in a mixed solvent of 205 parts by weight of toluene and 205 parts by weight of methanol, a mixture of 46.0 parts by weight of 1 N hydrochloric acid and 37.6 parts by weight of methanol was added, and stirred at 40° C. for 4 hours. The resultant was diluted with 409 parts by weight of heptane, and thereafter subjected to the same treatment as in the synthesis of polyorganosiloxane 1, thereby providing objective polyorganosiloxane 3.

(4) Polyorganosiloxane 4

After 2.6 parts by weight of hexamethyldisiloxane, 9.16 parts by weight of 1,3-divinyltetramethyldisiloxane, and 8.24 parts by weight of methyl silicate MS-51 were dissolved in a mixed solvent of 10.0 parts by weight of toluene and 10.0 parts by weight of methanol, a mixture of 5.10 parts by weight of 1 N hydrochloric acid and 2.55 parts by weight of methanol was added, and stirred at 40° C. for 4 hours. The resultant was diluted with 17.5 parts by weight of heptane, and thereafter subjected to the same treatment as in the synthesis of polyorganosiloxane 1, thereby providing 13.2 parts by weight of objective polyorganosiloxane 4.

(5) Polyorganosiloxane 5

After 33.8 parts by weight of hexamethyldisiloxane, 295 parts by weight of (3-methacryloyloxypropyl)trimethoxysilane, and 11.4 parts by weight of methyl silicate MS-51 were dissolved in a mixed solvent of 170 parts by weight of toluene and 170 parts by weight of methanol, a mixture of 79.2 parts by weight of 1 N hydrochloric acid and 79.2 parts by weight of methanol was added, and stirred at 40° C. for 4 hours. The resultant was diluted with 466 parts by weight of toluene, and thereafter subjected to the same treatment as in the synthesis of polyorganosiloxane 1, thereby providing 216 parts by weight of objective polyorganosiloxane 5.

(6) Polyorganosiloxane 6

The same synthesis as in polyorganosiloxane 1 was performed except that no treatment at 110° C. under a reduced pressure of 0.15 torr was performed, thereby providing 100 parts by weight of objective polyorganosiloxane 6.

(7) Polyorganosiloxane 7

Silmer VQ2012 manufactured by Siltech Corporation was used as polyorganosiloxane 7 as it was. This is sold as a liquid vinyl group-substituted MQ resin, and is considered to be a commercially available product closest to that of the present invention.

(8) Polyorganosiloxane 8

After 207 parts by weight of hexamethyldisiloxane, 87.5 parts by weight of 1,3-divinyltetramethyldisiloxane, and 186 parts by weight of methyl silicate MS-51 were dissolved in a mixed solvent of 180 parts by weight of toluene and 180 parts by weight of methanol, a mixture of 37.7 parts by weight of 1 N hydrochloric acid and 37.7 parts by weight of methanol was added, and stirred at 40° C. for 4 hours. The resultant was diluted with 151 parts by weight of heptane, and thereafter subjected to the same treatment as in the synthesis of polyorganosiloxane 1, thereby providing 196 parts by weight of objective polyorganosiloxane 8.

(9) Polyorganosiloxane 9

After 210 parts by weight of hexamethyldisiloxane, 17.9 parts by weight of 1,3-divinyltetramethyldisiloxane, and 172 parts by weight of methyl silicate MS-51 were dissolved in a mixed solvent of 200 parts by weight of toluene and 200 parts by weight of methanol, a mixture of 107 parts by weight of 1 N hydrochloric acid and 53.7 parts by weight of methanol was added, and stirred at 40° C. for 4 hours. The resultant was diluted with 350 parts by weight of heptane, and thereafter subjected to the same treatment as in the synthesis of polyorganosiloxane 1, thereby providing 204 parts by weight of objective polyorganosiloxane 9.

(10) Polyorganosiloxane 10

Vinyl POSS Cage Mixture (OL1170) (trade name) manufactured by Hybrid Plastics, Inc. was used as polyorganosiloxane 10 as it was.

(11) Polyorganosiloxane 11

Methalryl POSS Cage Mixture (MA0735) (trade name) manufactured by Hybrid Plastics, Inc. was used as polyorganosiloxane 11 as it was.

[Production Method 1 of Cured Product]

Mixed were 80 parts by weight of the polyorganosiloxane synthesized according to the above method, 20 parts by weight of vinyl group-containing silicone (manufactured by NuSil Technology LLC, trade name: PLY7511), and 0.5 parts by weight of dicumyl peroxide (manufactured by NOF CORPORATION, trade name: PERCUMYL D). The resulting mixed liquid was sandwiched between glass plates separated from each other with a 1-mm spacer being interposed, and heated from 40° C. to 140° C. at 5° C./min and held at 140° C. for 2 hours. After cooling to 40° C., the glass plate serving as an upper surface was removed, and the resultant was further heated from 40° C. to 190° C. at 5° C./min and held at 190° C. for 2 hours. After cooling to 40° C. or less, the other remaining glass plate was removed, thereby providing a cured product of such a polyorganosiloxane composition.

[Production Method 2 of Cured Product]

Mixed were 100 parts by weight of the polyorganosiloxane synthesized according to the above method and 3 parts by weight of 2-hydroxy-2-methylpropiophenone (manufactured by Tokyo Chemical Industry Co., Ltd.). The resulting mixed liquid was sandwiched between glass plates separated from each other with a 1-mm spacer being interposed, and irradiated with light by a high-pressure mercury lamp (accumulated amount of light: 3000 mJ/cm$^2$) by use of I6P1/LH manufactured by Fusion UV Systems, Inc., and thereafter the glass plates used were removed, thereby a cured product of the polyorganosiloxane.

[Production Method 3 of Cured Product]

To 100 parts by weight of the vinyl group-containing polyorganosiloxane synthesized by the above method and 100 parts by weight of silicone with both terminals each modified by a vinyl group (manufactured by NuSil Technology LLC, trade name: PLY-7500) was added silicone modified by a hydrosilyl group (manufactured by NuSil Technology LLC, trade name: XL-1) so that the ratio of the molar numbers of the vinyl group and the hydrosilyl group was 1:1. Furthermore, a solution of 2% by weight of a Karstedt catalyst in xylene (manufactured by Sigma-Aldrich) was added so that the weight as the weight of platinum was 3 ppm, and 6 ppm of 1-ethynyl-1-cyclohexanol was added. The mixture thus obtained was defined as mixture A. To 15 parts by weight of mixture A were added 83 parts by weight of spherical silica (manufactured by Denka Company Limited., trade name: FB-5D) and 2 parts by weight of fumed silica with a terminal modified by a trimethylsilyl group (manufactured by Evonik Japan, trade name RX-200) as inorganic fillers, the resultant was mixed by use of a centrifugal defoaming/mixing apparatus, and thereafter packed into a mold having a width of 14.25 mm, a length of 30 mm, and a thickness of 2 mm. Next, the resultant was pressed at 200° C. and at a pressure of 50 kg/cm$^2$ for 3 minutes, thereby providing a cured product of such a polyorganosiloxane composition.

Each polyorganosiloxane was prepared by the above method according to Examples 1-1 to 1-5 and Comparative Examples 1-1 to 1-6 in Table 1, and each cured product was produced according to Production methods 1 to 3 of cured product.

Various measurement values of the polyorganosiloxane and the cured product were shown in Table 1.

The polyorganosiloxane of Comparative Example 1-1 was large in the number of alkoxy groups bound to silicon, and also large in weight loss in heating at 110° C. for 2 hours.

The polyorganosiloxane of Comparative Example 1-2 was a commercially available product closest to that of the present invention among those known by the Applicant, but was large in weight loss in heating at 110° C. for 2 hours.

Those of Comparative Examples 1-3 and 1-4 were poor in the amount of the reactive functional group based on the prescription of the present invention.

Those of Comparative Examples 1-5 and 1-6 had a different maximum absorption wavenumber of Si—O vibration observed in infrared absorption spectrum analysis, and corresponded to a cage-type silsesquioxane having a substituent. These were substantially solids.

TABLE 1

| | Example 1-1 | Example 1-2 | Example 1-3 | Example 1-4 | Example 1-5 |
|---|---|---|---|---|---|
| Polyorganosiloxane | Polyorganosiloxane 1 | Polyorganosiloxane 2 | Polyorganosiloxane 3 | Polyorganosiloxane 4 | Polyorganosiloxane 5 |
| Type of functional group | Vinyl | Vinyl | Vinyl | Vinyl | Methacryloyloxypropyl |
| a (Percentage of M unit) | 0.61 | 0.58 | 0.65 | 0.62 | 0.22 |
| b (Percentage of D unit) | 0 | 0 | 0 | 0 | 0 |
| c (Percentage of T unit) | 0 | 0 | 0 | 0 | 0.65 |
| d (Percentage of Q unit) | 0.39 | 0.42 | 0.35 | 0.38 | 0.13 |
| Amount of functional group mmol/g | 5.4 | 5.3 | 7.8 | 5.9 | 4.5 |
| Trimethylsiloxy group mmol/g | 1.6 | 2.1 | 0 | 1.9 | 1.5 |
| Alkoxy group % by weight | 3.7 | 2.9 | 2.5 | 1.8 | 1.6 |
| Weight loss % in treatment at 110° C. and 0.15 Torr | 0.5 or less | 0.5 or less | 0.5 or less | 0.5 or less | 0.5 or less |
| Maximum absorption wavenumbers (cm$^{-1}$) of 1030 to 1150 cm$^{-1}$ | 1047 | 1047 | 1047 | 1049 | 1043 |
| Number average molecular weight | 920 | 1190 | 900 | 940 | 1280 |
| Flash point | — | — | — | 160° C. | — |
| Viscosity | 92 | 1500 | 110 | 150 | 1150 |
| Linear expansion coefficient (ppm/K) (production method of cured product) | 208 (Method 1) | 193 (Method 1) | — | 205 (Method 1) | 73 (Method 2) |
| Three-point bending elastic modulus(N/mm$^2$) (production method of cured product) | — | — | 1700 (Method 3) | 1390 (Method 3) | — |
| Shore D hardness (production method of cured product) | — | — | 74 (Method 3) | 74 (Method 3) | — |

TABLE 1-continued

| | Comparative Example 1-1 | Comparative Example 1-2 | Comparative Example 1-3 | Comparative Example 1-4 | Comparative Example 1-5 | Comparative Example 1-6 |
|---|---|---|---|---|---|---|
| Polyorganosiloxane | Polyorganosiloxane 6 | Polyorganosiloxane 7 | Polyorganosiloxane 8 | Polyorganosiloxane 9 | Polyorganosiloxane 10 | Polyorganosiloxane 11 |
| Type of functional group | Vinyl | Vinyl | Vinyl | Vinyl | Vinyl | Methacryloyloxy-propyl |
| a (Percentage of M unit) | 0.58 | 0.63 | 0.67 | 0.61 | 0 | 0 |
| b (Percentage of D unit) | 0 | 0 | 0 | 0 | 0 | 0 |
| c (Percentage of T unit) | 0 | 0 | 0 | 0 | 1 | 1 |
| d (Percentage of Q unit) | 0.42 | 0.37 | 0.33 | 0.39 | 0 | 0 |
| Amount of functional group mmol/g | 5.6 | 4.8 | 2.2 | 0.6 | 13 | 5.6 |
| Trimethylsiloxy group mmol/g | 1.8 | 3.2 | 6.4 | 7.6 | 0 | 0 |
| Alkoxy group % by weight | 4.1 | 1.7 | 3.0 | 1.4 | 0 | 0 |
| Weight loss % in treatment at 110° C. and 0.15 Torr | 13 | 5.3 | 0.5 or less | 0.5 or less | 0.5 or less | 0.5 or less |
| Maxinium absorption wavenumbers ($cm^{-1}$) of 1030 to 1150 $cm^{-1}$ | 1049 | 1047 | 1047 | 1047 | 1105 | 1099 |
| Number average molecular weight | 840 | 1120 | 1030 | 1080 | 690 | 1100 |
| Flash point | — | 49° C. | — | — | — | — |
| Viscosity | 51 | 90 | 88 | 520 | Solid | >20000 |
| Linear expansion coefficient (ppm/K) (production method of cured product) | 293 (Method 1) | 238 (Method 1) | — | — | — | 67 (Method 2) |
| Three-point bending elastic modulus ($N/mm^2$) (production method of cured product) | — | — | 290 (Method 3) | 320 (Method 3) | — | — |
| Shore D hardness (production method of cured product) | — | — | 55 (Method 3) | 43 (Method 3) | — | — |

[Discussion]
[Linear Expansion Coefficient]

Although polyorganosiloxanes 1, 2, and 4 used in Examples 1-1, 1-2, and 1-4, respectively, were close to polyorganosiloxane 6 used in Comparative Example 1-1 in terms of the content of each silicon, and the type and the amount of the reactive functional group, in the polyorganosiloxanes, those of Examples 1-1, 1-2, and 1-4 were extremely small in amount of weight loss in heating and pressure reduction. It was found that the resulting cured product was decreased in linear expansion coefficient in such a case. It can be thus seen that a small weight loss in heating and pressure reduction has the advantage of the ability to allow a cured product favorable in dimensional stability at wide temperatures to be produced.

[Flash Point]

Although polyorganosiloxane 4 used in Example 1-4 was close to polyorganosiloxane 7 used in Comparative Example 1-2 in terms of the content of each silicon, and the type and the amount of the reactive functional group, it was small in the amount of weight loss in heating and pressure reduction. It was found that the flash point was significantly increased in such a case. While polyorganosiloxane 6 is classified to the second petroleum group of the fourth class (non-water soluble), polyorganosiloxane 4 is classified to the third petroleum group of the fourth class (non-water soluble), in terms of application to classification of hazardous materials according to the Fire Service Act. It can be thus seen that polyorganosiloxane 4 has the advantage of being lower in cost in storage and transportation because of not only a smaller amount of weight loss in heating and pressure reduction and thus safer handling, but also classification as a lower-risk class in classification of hazardous materials according to the Fire Service Act.

[Viscosity]

Polyorganosiloxane 10 and polyorganosiloxane 11 used in Comparative Examples 1-5 and 1-6, respectively, had a maximum absorption wavenumber of a Si—O stretching vibration in the wavenumber range from 1075 to 1150 $cm^{-1}$ unique for a cage-type structure, in the wavenumber range from 1030 to 1150 $cm^{-1}$ in infrared absorption spectrum analysis. On the other hand, polyorganosiloxanes used in other Examples and Comparative Examples had a maximum absorption wavenumber of a Si—O stretching vibration in the wavenumber range from 1030 to 1070 $cm^{-1}$ in infrared absorption spectrum analysis, and had no cage-type structure. Such polyorganosiloxanes were subjected to viscosity measurement, and as a result, it was found that any polyorganosiloxane having a maximum absorption wavenumber of a Si—O stretching vibration in the wavenumber range from 1030 to 1070 cm$^{-1}$, namely, any polyorganosiloxane having no cage-type structure was low in viscosity. On the other hand, it was also found that any polyorganosiloxane having a maximum absorption wavenumber of a Si—O stretching vibration in the wavenumber range from 1075 to 1150 cm$^{-1}$, namely, any polyorganosiloxane having a cage-type structure was high in viscosity or was a solid. Accordingly, the polyorganosiloxane of the present invention is a liquid low in viscosity, and thus has the advantages of having favorable handleability and being not only significantly decreased in the time taken for weighing, mixing, and molding, but also decreased in the time taken for washing and further decreased in the amount of a cleaning agent.

[Three-Point Bending Elastic Modulus and Shore D Hardness]

Polyorganosiloxanes 3 and 4 used in Examples 1-3 and 1-4, respectively, had 3 to 12 vinyl groups as reactive functional groups per a molecular weight of each of the polyorganosiloxanes, of 1000. On the other hand, polyorganosiloxanes 8 and 9 used in Comparative Examples 1-3 and 1-4, respectively, had the same reactive functional groups as in those of polyorganosiloxanes 3 and 4, but the number of such reactive functional groups was smaller than the range from 3 to 12. Such polyorganosiloxanes were each subjected to production of a cured product, and as a result, it was found that the number of the reactive functional groups was 3 to 12 per a molecular weight of each of the polyorganosiloxanes, of 1000, resulting in higher three-point bending elastic modulus and shore D hardness. Accordingly, production of a cured product by use of the polyorganosiloxane of the present invention has the advantage of providing a material high in elasticity and high in hardness.

[Evaluation II: Examples 2-1 to 2-22 and Comparative Examples 2-1 to 2-11]

[Measurement Method]

1. Measurement of Amount of Reactive Functional Group in Polyorganosiloxane

The amount of the reactive functional group in each polyorganosiloxane was measured in the same manner as in the above method.

2. Measurement Method of $^{29}$Si-NMR $^{29}$Si-NMR measurement was performed in the same manner as in the above method.

3. Measurement of Molecular Weight

The molecular weight was measured in the same manner as in the above method.

4. Measurement of Refractive Index 4-1. Measurement of refractive index of liquid sample before curing: the refractive index was measured at 20° C. at a wavelength of sodium D ray by use of Refractometer RX-7000α manufactured by ATAGO CO., LTD.

4-2. Measurement of refractive index of cured product:

Measurement method 1. The refractive index and the Abbe's number were measured with 1-bromonaphthalene as an intermediate liquid at 25° C. by use of multiwavelength Abbe refractometer DR-M2 manufactured by ATAGO CO., LTD.

Measurement method 2. The refractive index and the Abbe's number were measured with a mixture of diiodomethane, monobromonaphthalene, and liquid paraffin as an intermediate liquid at a temperature of 23° C. by use of Kalnew Precision Refractometer KPR2000 manufactured by Shimadzu Corporation.

5. Measurement of Viscosity

The viscosity was measured in the same manner as in the above method.

6. Measurement Method by Gas Chromatography

Apparatus: gas chromatograph GC-14B manufactured by Shimadzu Corporation

Column: DB-5 manufactured by Agilent Technologies

Injection temperature: 290° C.

Temperature rise method: temperature rise from 50° C. to 290° C. at 10° C./min

A mixture of each polyorganosiloxane and THF weighed at a mass ratio of 1:1 was subjected to measurement. A 1-L eggplant flask was charged with each polyorganosiloxane and a rotor, the content thereof was subjected to pressure reduction by a vacuum pump having an evacuation power of a degree of pressure reduction of 10 torr and heated so that the internal temperature was 110° C., and thus distillation under reduced pressure was performed for 2 hours. After the present distillation, gas chromatography was performed for comparison with the polyorganosiloxane not subjected to the distillation, and any reduced peak was confirmed. The method of confirmation was as follows. The peak from THF with which the polyorganosiloxane not subjected to the distillation was diluted was defined as a reference peak, the intensity of each peak from the polyorganosiloxane was confirmed, thereafter each peak from the polyorganosiloxane subjected to the distillation was normalized by the reference peak and also the intensity of such each peak was corrected by the values weighed of the polyorganosiloxane subjected to the distillation and THF to compare the respective intensities of such peaks from the polyorganosiloxane not subjected and subjected to the distillation. Any peak where the intensity was reduced by 10% or more was observed at retention times of 0 minutes to 12 minutes.

7. Measurement Method of Infrared Absorption Spectrum (IR Measurement)

The infrared absorption spectrum was measured in the same manner as in the above method.

8. Measurement Methods of Haze and Yellow Index

Apparatus: haze meter HM-150 Model manufactured by MURAKAMI COLOR RESEARCH LABORATORY CO., LTD.

The haze was measured based on JIS K7105.

Measurement method of yellow index (YI)

Apparatus: spectroscopic colorimeter CM-5 manufactured by KONICA MINOLTA JAPAN, INC.

YI evaluation was performed by a method for measuring permeation.

9. Pencil Hardness

The pencil hardness was measured by the measurement method according to JIS K5600-5-4.

10. Measurement of Storage Elastic Modulus and Measurement of Glass Transition Point Apparatus: dynamic viscoelasticity measuring apparatus RSAII manufactured by TA Instruments Measurement mode: Tension mode Measurement frequency: 10 Hz Various cured products were subjected to measurement, and the storage elastic modulus at 100° C. or 200° C. was calculated.

The tan δ peak temperature was defined as the glass transition point.

11. Measurement of Linear Expansion Coefficient

The linear expansion coefficient was measured by any of the following methods.

Method 1
Apparatus: thermomechanical analyzer Q400 manufactured by TA Instruments
Rate of temperature rise: 20° C./min
Measurement range: 20 to 200° C.
The linear expansion coefficient in the range from 30 to 150° C. was calculated.

Method 2
Apparatus: thermomechanical analyzer TMA/SS6100 manufactured by SII NanoTechnology Inc.
Rate of temperature rise: 5° C./min
Measurement range: 30 to 200° C.
The linear expansion coefficient in the range from 50 to 100° C. was calculated.

12. Measurement of Water Absorption Rate
Apparatus
IR measurement: ultraviolet-visible-near-infrared spectrometer V780 manufactured by JASCO Corporation
Dryer: square shape vacuum constant temperature dryer DP63 manufactured by Yamato Scientific Co., Ltd.
Environment tester: compact environment tester SH-221 manufactured by ESPEC CORP.
Drying and moisture absorption conditions
Drying: IR measurement after drying at 50° C. for 24 hours
Moisture absorption: IR measurement after moisture absorption at 85° C. and 85% for 168 hours
Each measurement was performed within 1 hour after the drying and the moisture absorption.
Measurement method
A cured product having a thickness of 1 mm was subjected to each IR measurement after the drying and the moisture absorption.
The area of an absorption peak appearing around 1850 to 2000 nm, derived from water, was observed to determine the water absorption rate from the difference between the area of such an absorption peak after the moisture absorption and the area of such an absorption peak after the drying.

13. Measurement Method of Acid Value
A particulate (meth)acrylic polymer and a syrup composition produced were dissolved in a mixed solvent of toluene and ethanol, and the amount (mg) of potassium hydroxide for neutralization of 1 g of the (meth)acrylic polymer was measured and defined as the acid value.

Figure 4:
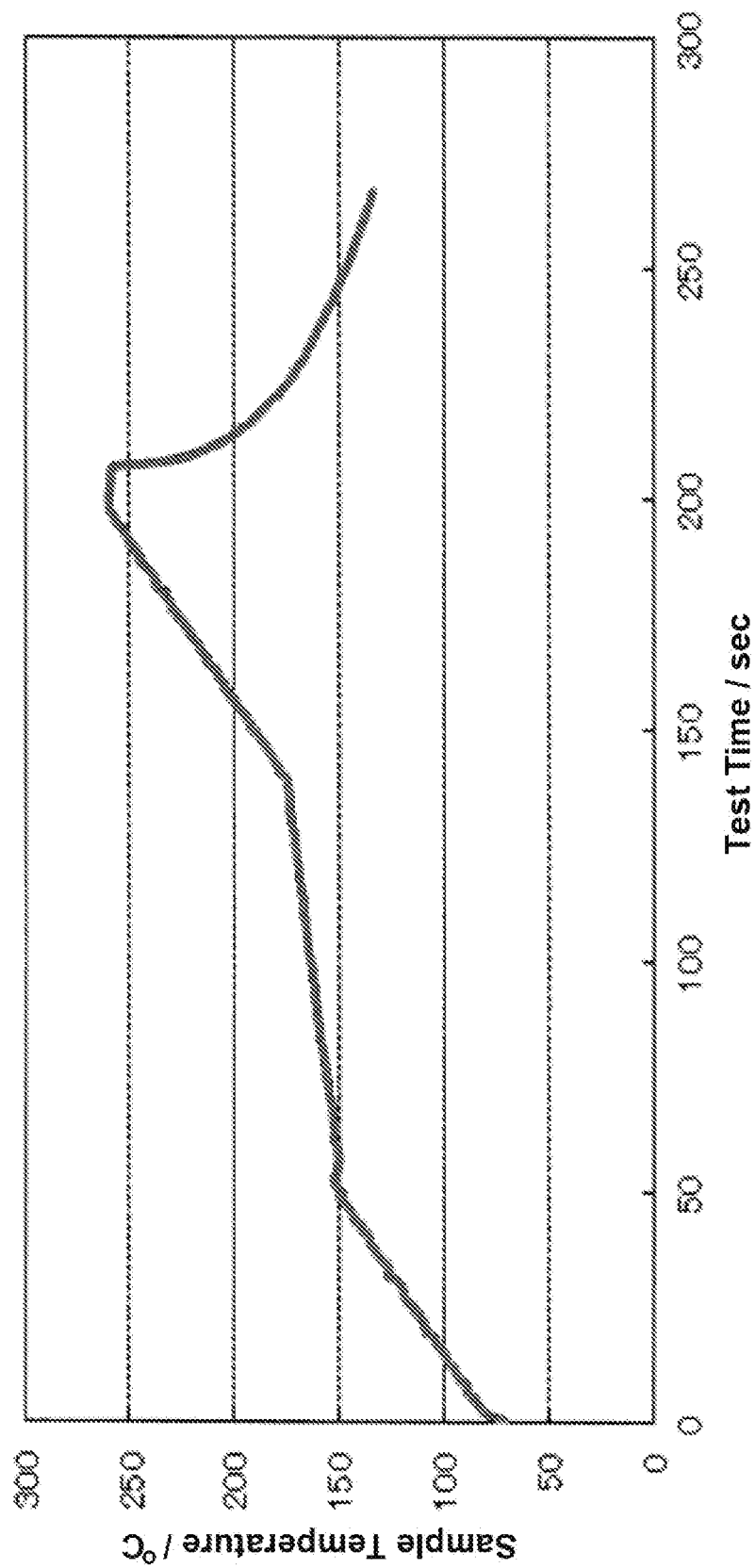
FIG. 4 illustrates a temperature profile in a solder reflow condition.

14. Evaluation of Solder Reflow
Apparatus: reflow simulator SRS-1C manufactured by Malcom Co., Ltd.
Solder reflow conditions: the temperature profile illustrated in FIG. 4 was performed for 3 cycles. The peak temperature was 260° C. and kept for 10 seconds.
Evaluation: the cured product was observed by a microscope after such a test.

[Production of Sample]

[Synthesis Example 2-1] Synthesis Method of Polyorganosiloxane

Hydrolytic condensation was performed by use of 22 g of methyl silicate MS51 manufactured by Mitsubishi Chemical Corporation, 263 g of 3-methacryloyloxypropyltrimethoxysilane KBM503 manufactured by Shin-Etsu Chemical Co., Ltd., and 56 g of hexamethyldisiloxane manufactured by Nusil Technology, LLC as raw materials of a polyorganosiloxane, 170 g of toluene and 170 g of methanol as solvents, and a mixture of 1 N 81 g of hydrochloric acid and 81 g of methanol as a catalyst and water, with the temperature being kept at 15° C. to 40° C. Thereafter, hydrochloric acid was removed by demineralized water, the solvents and water were then removed, and the resultant was filtered, thereby providing 221 g of an objective liquid polyorganosiloxane.

Although a versatile process and inexpensive raw materials were used, the polyorganosiloxane could be obtained at a high yield of 65% by mass based on the total of the raw materials thereof, and the variable cost and the production cost could be kept low.

The resulting polyorganosiloxane was analyzed by gas chromatography, and it was confirmed that no peaks from toluene and methanol, hexamethyldisiloxane, trimethylsilanol, trimethylmethoxysilane, and 3-methacryloyloxypropyltrimethoxysilane were detected. The resulting polyorganosiloxane was subjected to $^1$H-NMR and $^{29}$Si-NMR, and GPC measurements, and was found to be organosiloxane D shown in Table 2. Physical properties were measured by an E-type viscosity meter and a refractometer.

The maximum absorption wavenumber derived from SiO was 1047 cm$^{-1}$ according to IR measurement, and it was supposed that the main structure was not a cage-type structure. The polyorganosiloxane synthesized in the present procedure was found to have no cage-type structure or have a cage-type structure in a small amount to such an extent that no peak characteristic for a cage-type structure was detected by IR measurement even in the case where any polyorganosiloxane having a cage-type structure was present. The molecular composition ratio and physical properties of each of polyorganosiloxanes A to C, E to G, I, K, and L synthesized in the same manner except for appropriate changes in the amounts of the raw materials of each of such polyorganosiloxanes are shown in Table 2.

[Synthesis Example 2-2] Synthesis Method of Non-Cage-Type Silsesquioxane

Hydrolytic condensation was performed by use of 170 g of 3-methacryloyloxypropyltrimethoxysilane KBM503 as a raw material of a polyorganosiloxane, 85 g of toluene and 85 g of methanol as solvents, and a mixture of 40 g of 1 N hydrochloric acid and 40 g of methanol as a catalyst and water, with the temperature being kept at 15° C. to 40° C. Thereafter, hydrochloric acid was removed by demineralized water, the solvents and water were then removed, and the resultant was filtered, thereby providing 235.6 g of a liquid polyorganosiloxane. It was confirmed by gas chromatography that no peaks from toluene and methanol, and 3-methacryloyloxypropyltrimethoxysilane were detected. The resulting polyorganosiloxane was subjected to $^1$H-NMR and $^{29}$Si-NMR, and GPC measurements, and was found to be organosiloxane J shown in Table 2. Physical properties were measured by an E-type viscosity meter and a refractometer.

The maximum absorption wavenumber derived from SiO was 1045 cm$^{-1}$ according to IR measurement, and it was supposed that the main structure was not a cage-type structure. The polyorganosiloxane synthesized in the present procedure was found to have no cage-type structure or have a cage-type structure in a small amount to such an extent that no peak characteristic for a cage-type structure was detected by IR measurement even in the case where any polyorganosiloxane having a cage-type structure was present.

The cage-type silsesquioxane used was polyorganosiloxane H (Methacryloyl TA-100 manufactured by TOAGOSEI CO., LTD.).

[Synthesis Example 2-3] Synthesis Method 1 of Polyorganosiloxane Including Two or More Kinds of T Units Hydrolytic condensation was performed by use of 9 g of methyl silicate MS51, 120 g of 3-methacryloyloxypropyltrimethoxysilane KBM503, 154 g of 8-methacryloyloxyoctyltrimethoxysilane KBM5803, and 27 g of hexamethyldisiloxane as raw materials of a polyorganosiloxane, 139 g of toluene and 139 g of methanol as solvents, and a mixture of 64 g of 1 N hydrochloric acid and 64 g of methanol as a catalyst and water, with the temperature being kept at 15° C. to 40° C. Thereafter, hydrochloric acid was removed by demineralized water, the solvents and water were then removed, and the resultant was filtered, thereby providing 214 g of a liquid polyorganosiloxane. It was confirmed by gas chromatography that no peaks from toluene, methanol, hexamethyldisiloxane, trimethylsilanol, trimethylmethoxysilane, 3-methacryloyloxypropyltrimethoxysilane, and 8-methacryloyloxyoctyltrimethoxysilane were detected. The resulting polyorganosiloxane was subjected to $^1$H-NMR and $^{29}$Si-NMR, and GPC measurements, and was found to be organosiloxane N shown in Table 2. Measurement was performed by an E-type viscosity meter and a refractometer. The molecular composition ratio and physical properties of each of polyorganosiloxanes M and O synthesized in the same manner except for appropriate changes in the amounts of the raw materials of each of such polyorganosiloxanes are shown in Table 2.

[Synthesis Example 2-4] Synthesis Method 2 of Polyorganosiloxane Including Two or More Kinds of T Units The molecular composition ratio and physical properties of each of polyorganosiloxanes P to S synthesized in the same manner except for use of decyltrimethoxysilane KBM3103C manufactured by Shin-Etsu Chemical Co., Ltd. instead of 8-methacryloyloxyoctyltrimethoxysilane KBM5803 described in Synthesis Example 2-3 and appropriate changes in the amounts of the raw materials of each of such polyorganosiloxanes are shown in Table 2.

The molecular composition ratio and physical properties of each of polyorganosiloxanes T and U synthesized in the same manner except for decyltrimethoxysilane KBM3103C manufactured by Shin-Etsu Chemical Co., Ltd. instead of 3-methacryloyloxypropyltrimethoxysilane KBM503 described in Synthesis Example 2-3 and appropriate changes in the amounts of the raw materials of each of such polyorganosiloxanes are shown in Table 2.

[Production Method of Cured Product of Polyorganosiloxane]

A mixture of 100 parts by mass of each polyorganosiloxane shown in Table 3 with 3 parts by mass of Irgacure 1173 as a photo-polymerization initiator was sealed with glass, photo-cured by a high-pressure mercury lamp (accumulated amount of light: 3,000 mJ/cm$^2$), and heated in a heating furnace set to 100° C., for 30 minutes, thereby providing each test piece having a thickness of 1 mm in Examples 2-1 to 2-5 and Comparative Examples 2-1 and 2-2. Various physical properties of the test piece measured are shown in Table 3.

[Production Method of Photo-Curable Syrup Composition and Production Method of Cured Product]

A polymerization apparatus equipped with a stirrer, a cooling tube, and a thermometer was charged with 145 parts by mass of deionized water and 0.5 parts by mass of polyvinyl alcohol (degree of saponification: 80%, degree of polymerization: 1,700) as a dispersion stabilizer, and the resultant was stirred. After complete dissolution of the polyvinyl alcohol, stirring was stopped, and 96 parts by mass of methyl methacrylate, 4 parts by mass of methacrylic acid, 0.3 parts of 2,2'-azobis(2-methylbutyronitrile) (trade name: AMBN manufactured by Otsuka Chemical Co., Ltd.) as a polymerization initiator, and 1 part of n-dodecylmercaptan as a chain transfer agent were added and again stirred. Purging with nitrogen was performed under stirring, and the temperature was raised to 80° C. to perform polymerization. After an exothermic peak due to the polymerization was detected, the temperature was raised to 95° C. to perform a reaction for additional 0.5 hours, and cooled to 30° C. The resulting aqueous suspension was filtered by a filtration cloth made of nylon, having an aperture of 45 μm, and a filtered product was washed with deionized water. After dewatering, the resultant was dried at 40° C. for 24 hours, thereby providing a particulate (meth)acrylic polymer (Mw=40,000, acid value=26 mg of KOH/g).

Subsequently, a reaction container equipped with a condenser was charged with 60 parts by mass of benzyl methacrylate, 0.04 parts by mass of butylated hydroxytoluene (BHT) as a polymerization inhibitor, 3.2 parts by mass of glycidyl methacrylate as a compound having a glycidyl group and a double bond, and 0.12 parts by mass of tetrabutylammonium bromide as a reaction catalyst. While the resulting liquid in the reaction container was stirred, 40 parts by mass of the particulate (meth)acrylic polymer produced was added thereto, and the temperature in the reaction container was raised to 95° C. A reaction of introduction of a double bond into the (meth)acrylic polymer was performed by stirring for 10 hours with the temperature being kept. After 10 hours, the resultant was cooled to ordinary temperature, thereby providing a syrup composition. The acid value of the (meth)acrylic polymer in the syrup composition was 0.5 mg of KOH/g.

Stirred and mixed were 37 parts by mass of each polyorganosiloxane shown in Table 4, 23 parts by mass of the resulting syrup composition, 37.7 parts by mass of benzyl methacrylate, and 2.3 parts by mass of 1-hydroxycyclohexylphenyl ketone (trade name; IRGACURE 184 manufactured by BASF SE) as a photo-polymerization initiator, thereby providing each photo-curable syrup composition in Examples 2-6 to 2-8 and Comparative Examples 2-3 to 2-5.

Such each photo-curable syrup composition was sealed with glass, photo-cured by a high-pressure mercury lamp (accumulated amount of light: 3,000 mJ/cm$^2$), and heated in a heating furnace set to 100° C., for 30 minutes, thereby providing a test piece having a thickness of 1 mm. Various physical properties of the test piece measured are shown in Table 4.

[Production Methods of Photo-Curable Polyfunctional Oligomer Composition and Cured Product]

Stirred and mixed were 17 parts by mass of each polyorganosiloxane shown in Table 5, 16.4 parts by mass of benzyl methacrylate, 41 parts by mass of ethoxylated isocyanuric acid triacrylate (trade name; NK Ester A-9300 manufactured by Shin-Nakamura Chemical Co., Ltd.), 24 parts by mass of ε-caprolactone-modified tris(acryloxyethyl) isocyanurate (trade name; ARONIX M-327 manufactured by TOAGOSEI CO., LTD.), and 1.6 parts by mass of 1-hydroxycyclohexylphenyl ketone as a photo-polymerization initiator, thereby providing each photo-curable polyfunctional oligomer composition in Examples 2-9 to 2-11 and Comparative Examples 2-6 to 2-8.

Such each photo-curable polyfunctional oligomer composition was sealed with glass, photo-cured by a high-pressure mercury lamp (accumulated amount of light: 3,000 mJ/cm$^2$), and heated in a heating furnace set to 100° C., for 30 minutes, thereby providing a test piece having a thickness of 1 mm. Various physical properties of the test piece measured are shown in Table 5.

[Comparison with Silsesquioxane]

Silsesquioxane means polyorganosiloxane configured from only a T unit, and can be roughly classified to one having a cage-type structure or one having a non-cage-type structure.

Respective mixtures of 100 parts by mass of polyorganosiloxane I synthesized in Synthesis Example 2-1, polyorganosiloxane H, and polyorganosiloxane J synthesized in Synthesis Example 2-2, with 3 parts by mass of Irgacure 1173 as a photo-polymerization initiator were sealed with glass, photo-cured by a high-pressure mercury lamp (accumulated amount of light: 3,000 mJ/cm$^2$), and heated in a heating furnace set to 100° C., for 30 minutes, thereby providing test pieces having a thickness of 1 mm in Example 2-12, Comparative Example 2-9, and Comparative Example 2-10. Various physical properties of the compositions before curing and the test pieces measured are shown in Table 6.

[Comparison in Change in Ratio of M, T, and Q Units]

Respective mixtures of 100 parts by mass of polyorganosiloxanes D, K, and L synthesized in Synthesis Example 2-1, with 3 parts by mass of Irgacure 1173 as a photo-polymerization initiator were sealed with glass, photo-cured by a high-pressure mercury lamp (accumulated amount of light: 3,000 mJ/cm$^2$), and heated in a heating furnace set to 100° C., for 30 minutes, thereby providing test pieces having a thickness of 1 mm in Examples 2-13 to 2-15. Various physical properties of the compositions before curing and the test pieces measured are shown in Table 7.

[Comparison in Change in Type of T Unit and Combination of Two or More Kinds Thereof]

Respective mixtures of 100 parts by mass of polyorganosiloxanes E, M, N, and O synthesized in Synthesis Examples 2-1 and 2-3, with 3 parts by mass of Irgacure 1173 as a photo-polymerization initiator were sealed with glass, photo-cured by a high-pressure mercury lamp (accumulated amount of light: 3,000 mJ/cm$^2$), and heated in a heating furnace set to 100° C., for 30 minutes, thereby providing test pieces having a thickness of 1 mm in Examples 2-3 and 2-16 to 2-18. Various physical properties of the compositions before curing and the test pieces measured are shown in Table 8.

TABLE 2

| | | | A | B | C | D | E | F | G | H | I | J | K | L |
|---|---|---|---|---|---|---|---|---|---|---|---|---|---|---|
| Molecular composition ratio of polyorganosiloxane | | $(Me_3SiO_{1/2})$ M1 | 0.50 | 0.44 | 0.39 | 0.33 | 0.21 | 0.09 | 0.11 | 0.00 | 0.22 | 0.00 | 0.25 | 0.32 |
| | | $(R^{106}SiO_{3/2})$ T2 | 0.12 | 0.25 | 0.40 | 0.53 | 0.64 | 0.78 | 0.84 | 1.00 | 0.65 | 1.00 | 0.50 | 0.45 |
| | | $(SiO_{4/2})$ Q | 0.38 | 0.30 | 0.21 | 0.15 | 0.14 | 0.13 | 0.04 | 0.00 | 0.13 | 0.00 | 0.25 | 0.23 |
| | | $(O_{1/2}Me)$ Y | 0.05 | 0.05 | 0.05 | 0.04 | 0.05 | 0.02 | 0.03 | 0.00 | 0.08 | 0.08 | 0.03 | 0.04 |
| Conditions with respect to (A5) | $0 \leq M1 < 0.6$ | Numerical value, ○: within range, x: out of range | 0.5, ○ | 0.44, ○ | 0.39, ○ | 0.33, ○ | 0.21, ○ | 0.09, ○ | 0.11, ○ | 0, ○ | 0.22, ○ | 0, ○ | 0.25, ○ | 0.32, ○ |
| | $0 \leq D1 < 0.6$ | Numerical value, ○: within range, x: out of range | 0, ○ | 0, ○ | 0, ○ | 0, ○ | 0, ○ | 0, ○ | 0, ○ | 0, ○ | 0, ○ | 0, ○ | 0, ○ | 0, ○ |
| | $0 \leq T1 < 0.6$ | Numerical value, ○: within range, x: out of range | 0, ○ | 0, ○ | 0, ○ | 0, ○ | 0, ○ | 0, ○ | 0, ○ | 0, ○ | 0, ○ | 0, ○ | 0, ○ | 0, ○ |
| | $0 \leq Q < 0.6$ | Numerical value, ○: within range, x: out of range | 0.38, ○ | 0.30, ○ | 0.21, ○ | 0.15, ○ | 0.14, ○ | 0.13, ○ | 0.04, ○ | 0, ○ | 0.13, ○ | 0, ○ | 0.25, ○ | 0.23, ○ |
| | $0 < M1 + M2$ | Numerical value, ○: within range, x: out of range | 0.5, ○ | 0.44, ○ | 0.39, ○ | 0.33, ○ | 0.21, ○ | 0.09, ○ | 0.11, ○ | 0, x | 0.22, ○ | 0, x | 0.25, ○ | 0.32, ○ |
| | $0 < T1 + T2 + Q$ | Numerical value, ○: within range, x: out of range | 0.5, ○ | 0.55, ○ | 0.61, ○ | 0.68, ○ | 0.78, ○ | 0.91, ○ | 0.88, ○ | 1, ○ | 0.78, ○ | 1, ○ | 0.75, ○ | 0.68, ○ |
| | $0.25 < M2 + D2 + T2$ | Numerical value, ○: within range, x: out of range | 0.12, x | 0.25, x | 0.40, ○ | 0.53, ○ | 0.64, ○ | 0.78, ○ | 0.84, ○ | 1, ○ | 0.65, ○ | 1, ○ | 0.50, ○ | 0.45, ○ |
| | $M1 + M2 + D1 + D2 + T1 + T2 + Q = 1$ | Numerical value (one decimal place) | 1.0 | 1.0 | 1.0 | 1.0 | 1.0 | 1.0 | 1.0 | 1.0 | 1.0 | 1.0 | 1.0 | 1.0 |
| | $0 \leq Y1$ | Numerical value, ○: within range, x: out of range | 0.05, ○ | 0.05, ○ | 0.05, ○ | 0.04, ○ | 0.05, ○ | 0.02, ○ | 0.03, ○ | 0, ○ | 0.08, ○ | 0.08, ○ | 0.03, ○ | 0.03, ○ |
| | $0 \leq Y2$ | Numerical value, ○: within range, x: out of range | 0, ○ | 0, ○ | 0, ○ | 0, ○ | 0, ○ | 0, ○ | 0, ○ | 0, ○ | 0, ○ | 0, ○ | 0, ○ | 0, ○ |
| Conditions with respect to (A1) | $0.1 \leq M1$ | Numerical value, ○: within range, x: out of range | 0.5, ○ | 0.44, ○ | 0.39, ○ | 0.33, ○ | 0.21, ○ | 0.09, ○ | 0.11, ○ | 0, x | 0.22, ○ | 0, x | 0.25, ○ | 0.32, ○ |
| | $T2 \leq 0.8$ | Numerical value, ○: within range, x: out of range | 0.12, ○ | 0.25, ○ | 0.40, ○ | 0.53, ○ | 0.64, ○ | 0.78, ○ | 0.84, ○ | 1, x | 0.65, ○ | 1, x | 0.50, ○ | 0.45, ○ |
| | Alkoxy group, Presence, Absence | ○: Presence, x: Absence | ○ | ○ | ○ | ○ | ○ | ○ | ○ | x | ○ | ○ | ○ | ○ |
| | Reactive functional group, Presence, Absence | ○: Presence, x: Absence | ○ | ○ | ○ | ○ | ○ | ○ | ○ | ○ | ○ | ○ | ○ | ○ |
| | $0.07 \leq Si\text{-}OR^{110} \leq 4$ wt % | Numerical value, ○: within range, x: out of range | 0.84, ○ | 0.72, ○ | 1.2, ○ | 1.1, ○ | 0.71, ○ | 0.35, ○ | 0.49, ○ | 0, x | 1.6, ○ | 1.3, ○ | 0.66, ○ | 1.1, ○ |
| | 3 to 12 Reactive functional groups per molecular weight of 1000 | Numerical value, ○: within range, x: out of range | 1.4, x | 2.5, x | 3.4, ○ | 4.0, ○ | 6.0, ○ | 5.0, ○ | 5.2, ○ | 5.8, ○ | 4.6, ○ | 5.3, ○ | 4.0, ○ | 3.7, ○ |
| Conditions with respect to (A3) | $SiO_{4/2}$, Presence, Absence | ○: Presence, x: Absence | ○ | ○ | ○ | ○ | ○ | ○ | ○ | x | ○ | x | ○ | ○ |
| | Reactive functional groups, Presence, Absence | ○: Presence, x: Absence | ○ | ○ | ○ | ○ | ○ | ○ | ○ | ○ | ○ | ○ | ○ | ○ |
| | 3 to 12 Reactive functional groups per molecular weight of 1000 | Numerical value, ○: within range, x: out of range | 1.4, x | 2.5, x | 3.4, ○ | 4.0, ○ | 6.0, ○ | 5.0, ○ | 5.2, ○ | 5.8, ○ | 4.6, ○ | 5.3, ○ | 4.0, ○ | 3.7, ○ |

TABLE 2-continued

| | | | 1102 | 1104 | 654 | 640 | 1220 | 3627 | 4992 | 3711 | 1150 | 2980 | 2854 | 1933 |
|---|---|---|---|---|---|---|---|---|---|---|---|---|---|---|
| Physical Properties of polyorganosiloxane before curing | Viscosity | mPa·s | 1102 | 1104 | 654 | 640 | 1220 | 3627 | 4992 | 3711 | 1150 | 2980 | 2854 | 1933 |
| | Refractive index at 20° C. | nD | 1.4275 | 1.4414 | 1.4519 | 1.4590 | 1.4675 | 1.4757 | 1.4746 | 1.4797 | 1.4670 | 1.4782 | 1.4632 | — |
| Initiator | Irgancure1173 | 3 wt % | ○ | ○ | ○ | ○ | ○ | ○ | ○ | ○ | ○ | ○ | ○ | ○ |
| Physical Properties of polyorganosiloxane after curing | Measurement methods of refractive index and Abbe's number | 1 or 2 | 1 | 1 | 1 | 1 | 1 | 1 | 1 | 2 | 1 | 2 | 1 | 1 |
| | Abbe's number | — | 46.8 | 46.3 | 44.3 | 46.3 | 49.3 | 49.5 | 50.0 | 52.4 | 48.9 | 52.7 | 46.9 | 45.6 |
| | Refractive index at 25° C. | nD | 1.4395 | 1.4583 | 1.4738 | 1.4816 | 1.4882 | 1.5001 | 1.4996 | 1.5006 | 1.4891 | 1.5022 | 1.4831 | 1.4784 |
| | | nC | 1.4368 | 1.4553 | 1.4712 | 1.4788 | 1.4858 | 1.4972 | 1.4967 | 1.4978 | 1.4864 | 1.4994 | 1.4802 | 1.4761 |
| | | nF | 1.4462 | 1.4652 | 1.4819 | 1.4892 | 1.4957 | 1.5073 | 1.5087 | 1.5073 | 1.4964 | 1.5089 | 1.4905 | 1.4866 |

| | | | | Type of polyorganosiloxane | | | | | | | | | |
|---|---|---|---|---|---|---|---|---|---|---|---|---|---|
| | | | M | N | O | P | Q | R | S | T | U | | |
| Molecular composition ratio of polyorganosiloxane | $(Me_3SiO_{1/2})$ | M1 | 0.22 | 0.21 | 0.21 | 0.29 | 0.31 | 0.30 | 0.18 | 0.10 | 0.35 | | |
| | $(R^{106}SiO_{3/2})$ | T2 | 0.54 | 0.33 | 0.00 | 0.32 | 0.43 | 0.23 | 0.29 | 0.00 | 0.00 | | |
| | $(R^{106}SiO_{3/2})$ | T2 | 0.11 | 0.31 | 0.63 | 0.00 | 0.00 | 0.00 | 0.00 | 0.58 | 0.36 | | |
| | $(R^{110}SiO_{3/2})$ | T1 | 0.00 | 0.00 | 0.00 | 0.32 | 0.19 | 0.24 | 0.31 | 0.16 | 0.25 | | |
| | $(SiO_{4/2})$ | Q | 0.13 | 0.15 | 0.16 | 0.08 | 0.08 | 0.23 | 0.22 | 0.16 | 0.04 | | |
| | $(O_{1/2}Me)$ | Y1 | 0.04 | 0.04 | 0.06 | 0.10 | 0.07 | 0.09 | 0.05 | 0.02 | 0.005 | | |
| Conditions with respect to (A5) | $0 \leq M1 < 0.6$ | Numerical value, ○: within range, x: out of range | 0, ○ | 0, ○ | 0, ○ | 0.32, ○ | 0.19, ○ | 0.24, ○ | 0.31, ○ | 0.16, ○ | 0.24, ○ | | |
| | $0 \leq Q < 0.6$ | Numerical value, ○: within range, x: out of range | 0.13, ○ | 0.15, ○ | 0.16, ○ | 0.08, ○ | 0.08, ○ | 0.23, ○ | 0.22, ○ | 0.16, ○ | 0.04, ○ | | |
| | $0 < M1 + M2$ | Numerical value, ○: within range, x: out of range | 0.22, ○ | 0.21, ○ | 0.21, ○ | 0.28, ○ | 0.31, ○ | 0.30, ○ | 0.18, ○ | 0.09, ○ | 0.34, ○ | | |
| | $0 < T1 + T2 + Q$ | Numerical value, ○: within range, x: out of range | 0.77, ○ | 0.78, ○ | 0.78, ○ | 0.72, ○ | 0.70, ○ | 0.70, ○ | 0.82, ○ | 0.90, ○ | 0.65, ○ | | |
| | $0.25 < M2 + D2 + T2$ | Numerical value, ○: within range, x: out of range | 0.64, ○ | 0.63, ○ | 0.62, ○ | 0.32, ○ | 0.43, ○ | 0.23, x | 0.29, ○ | 0.58, ○ | 0.79, ○ | | |
| | $M1 + M2 + D1 + D2 + T1 + T2 + Q = 1$ | Numerical value (one decimal place) | 1.0 | 1.0 | 1.0 | 1.0 | 1.0 | 1.0 | 1.0 | 1.0 | 1.0 | | |
| Conditions with respect to (A1) | $0 \leq Y1$ | Numerical value, ○: within range, x: out of range | 0.04, ○ | 0.04, ○ | 0.06, ○ | 0.10, ○ | 0.07, ○ | 0.09, ○ | 0.05, ○ | 0.02, ○ | 0.005, ○ | | |
| | $0 \leq Y2$ | Numerical value, ○: within range, x: out of range | 0, ○ | 0, ○ | 0, ○ | 0, ○ | 0, ○ | 0, ○ | 0, ○ | 0, ○ | 0, ○ | | |
| | $0.1 \leq M1$ | Numerical value, ○: within range, x: out of range | 0.22 | 0.21 | 0.21 | 0.29 | 0.31 | 0.23 | 0.18 | 0.10 | 0.35 | | |
| | $T2 \leq 0.8$ | Numerical value, ○: within range, x: out of range | 0.64, ○ | 0.63, ○ | 0.62, ○ | 0.32, ○ | 0.43, ○ | 0.23, ○ | 0.29, ○ | 0.58, ○ | 0.79, x | | |
| | Alkoxy group, Presence, Absence | ○: Presence, x: Absence | ○ | ○ | ○ | ○ | ○ | ○ | ○ | ○ | ○ | | |
| | $0.07 \leq Si-OR^{110} \leq 4$ wt % Reactive functional group, Presence, Absence | ○: Presence, x: Absence | ○ | ○ | ○ | ○ | ○ | ○ | ○ | ○ | ○ | | |
| | 3 to 12 Reactive functional groups per molecular weight of 1000 | Numerical value, ○: within range, x: out of range | 0.8, ○ | 0.8, ○ | 1.2, ○ | 2.0, ○ | 1.5, ○ | 2.1, ○ | 1.1, ○ | 0.3, ○ | 0.1, ○ | | |
| | | Numerical value, ○: within range, x: out of range | 4.1, ○ | 3.6, ○ | 3.3, ○ | 2.2, x | 3.1, ○ | 1.9, x | 2.1, x | 3.1, ○ | 2.8, x | | |
| Conditions with respect to (A3) | $SiO_{4/2}$, Presence, Absence | ○: Presence, x: Absence | ○ | ○ | ○ | ○ | ○ | ○ | ○ | ○ | ○ | | |
| | Reactive functional groups, Presence, Absence | ○: Presence, x: Absence | ○ | ○ | ○ | ○ | ○ | ○ | ○ | ○ | ○ | | |
| | 3 to 12 Reactive functional groups per molecular weight of 1000 | Numerical value, ○: within range, x: out of range | 4.1, ○ | 3.6, ○ | 3.3, ○ | 2.2, x | 3.1, ○ | 1.9, x | 2.1, x | 3.1, ○ | 2.8, x | | |

TABLE 2-continued

| | | 1328 | 750 | 495 | 218 | 195 | 639 | 10291 | 2496 | 215 |
|---|---|---|---|---|---|---|---|---|---|---|
| Physical properties of polyorganosiloxane before curing | Viscosity mPa·s<br>Refractive index at 20° C. nD | 1328<br>1.4669 | 750<br>1.4671 | 495<br>1.4675 | 218<br>1.4541 | 195<br>1.4556 | 639<br>1.4518 | 10291<br>1.4607 | 2496<br>1.4721 | 215<br>1.4602 |
| Initiator | Irgancure1173 3 wt% | ○ | ○ | ○ | — | — | — | — | — | — |
| | Measurement methods of refractive index and Abbe's number 1 of 2 | 1 | 1 | 1 | — | — | — | — | — | — |
| Physical properties of polyorganosiloxane after curing | Abbe's number | 51.0 | 51.1 | 51.2 | — | — | — | — | — | — |
| | Refractive index nD | 1.4900 | 1.4908 | 1.4912 | — | — | — | — | — | — |
| | nC | 1.4870 | 1.4881 | 1.4884 | — | — | — | — | — | — |
| | nF | 1.4966 | 1.4977 | 1.4980 | — | — | — | — | — | — |
| Initiator | Irgacure1173 3 wt% | ○ | ○ | ○ | — | — | — | — | — | ○ |
| | Measurement methods of refractive index and Abbe's number 1 or 2 | 2 | 2 | 2 | — | — | — | — | — | 2 |
| Physical properties of polyorganosiloxane after curing | Abbe's number | 52.4 | 53.0 | 53.6 | — | — | — | — | — | 53.3 |
| | Refractive index nD | 1.4894 | 1.4893 | 1.4895 | — | — | — | — | — | 1.4818 |
| | nC | 1.4866 | 1.4866 | 1.4868 | — | — | — | — | — | 1.4791 |
| | nF | 1.4960 | 1.4958 | 1.4959 | — | — | — | — | — | 1.4882 |
| Initiator | Irgacure184 2 wt% | ○ | ○ | — | ○ | ○ | ○ | ○ | ○ | ○ |
| | Measurement methods of refractive index and Abbe's number 1 or 2 | 2 | 2 | — | 2 | 2 | 2 | 2 | 2 | 2 |
| Physical properties of polyorganosiloxane after curing | Abbe's number | 52.6 | 53.3 | — | 54.0 | 53.2 | 54.2 | 54.3 | 54.7 | 53.8 |
| | Refractive index nD | 1.4898 | 1.4897 | — | 1.4717 | 1.4768 | 1.4668 | 1.4763 | 1.4921 | 1.4812 |
| | nC | 1.4871 | 1.4870 | — | 1.4690 | 1.4742 | 1.4642 | 1.4737 | 1.4894 | 1.4786 |
| | nF | 1.4964 | 1.4962 | — | 1.4778 | 1.4831 | 1.4728 | 1.4824 | 1.4984 | 1.4875 |

TABLE 3

| | | | Comparative Example 2-1 | Comparative Example 2-2 | Example 2-1 | Example 2-2 | Example 2-3 | Example 2-4 | Example 2-5 |
|---|---|---|---|---|---|---|---|---|---|
| Type of polyorganosiloxane | | | A | B | C | D | E | F | G |
| Molecular composition ratio of polyorganosiloxane | $(Me_3SiO_{1/2})$ | M1 | 0.50 | 0.44 | 0.39 | 0.33 | 0.21 | 0.09 | 0.11 |
| | $(R^{106}SiO_{3/2})$ | T2 | 0.12 | 0.25 | 0.40 | 0.53 | 0.64 | 0.78 | 0.84 |
| | $(SiO_{4/2})$ | Q | 0.38 | 0.30 | 0.21 | 0.15 | 0.14 | 0.13 | 0.04 |
| | $(O_{1/2}Me)$ | Y1 | 0.05 | 0.05 | 0.05 | 0.04 | 0.05 | 0.02 | 0.03 |
| Initiator | Irgacure1173 | 3 wt % | ○ | ○ | ○ | ○ | ○ | ○ | ○ |
| Physical properties of polyorganosiloxane after curing | Measurement methods of refractive index and Abbe's number | 1 or 2 | 1 | 1 | 1 | 1 | 1 | 1 | 1 |
| | Abbe's number | — | | 46.8 | 46.3 | 44.3 | 46.3 | 49.3 | 49.5 | 50.0 |
| | Refractive index | nD | 1.4395 | 1.4583 | 1.4738 | 1.4816 | 1.4882 | 1.5001 | 1.4996 |
| | | nC | 1.4368 | 1.4553 | 1.4712 | 1.4788 | 1.4858 | 1.4972 | 1.4967 |
| | | nF | 1.4462 | 1.4652 | 1.4819 | 1.4892 | 1.4957 | 1.5073 | 1.506 |
| | Haze, 1 mm thickness | % | 1.2 | 0.4 | 0.4 | 0.9 | 0.2 | 0.1 | 0.2 |
| | Pencil hardness | — | <6B | H | 4H | 5H | 8H | 8H | 8H |
| | Storage elastic modulus at 100° C. | MPa | 340 | 730 | 790 | 1100 | 1500 | 1990 | 2110 |
| | Linear expansion coefficient: method 1 | ppm/K | 220 | 170 | 140 | 140 | Not performed | Not performed | Not performed |
| | Linear expansion coefficient: method 2 | ppm/K | Not performed | Not performed | Not performed | 110 | 90.0 | 70.0 | 70.0 |
| | Total light transmittance, 1 mm thickness | % | 95 | 94.5 | 94.1 | 93.5 | 92.3 | 91.7 | 91.9 |

While it was found from Table 3 that the refractive index was increased according to an increase in the content of a methacryloyl group at T2 of 0.12 to 0.4, the Abbe's number was reduced as generally know, and introduction of an additional methacryloyl group more than the above value would not be conceived in design of a polyorganosiloxane for a lens material. However, a behavior with not only an increase in refractive index, but also an increase in Abbe's number, was surprisingly observed at T2 of 0.4 or more, and the Abbe's number in an amount of introduction of a methacryloyl group at T2 of more than 0.53 was above that at T2 of 0.12. Particularly, any polyorganosiloxane with T2 of more than 0.53 was high in refractive index and Abbe's number, and would be suitable for a lens material.

It was also found from Table 3 that high values were exhibited with respect to mechanical properties such as pencil hardness and storage elastic modulus, and a robust material providing a scratch-resistant lens could be produced. Furthermore, it was supposed that a lens was hardly cracked because of a low linear expansion coefficient and thus a small stress generated between such a lens and any member therearound, in heating of a lens module, such as a solder reflow step. Additionally, a transparent material extremely less in cloudiness was obtained because it had a total light transmittance of 90% or more and a haze of less than 1. Thus, the polyorganosiloxane of the present invention is suitable for a lens material.

TABLE 4

| | | | Reference example 2-1 | Comparative Example 2-3 | Comparative Example 2-4 | Example 2-6 | Example 2-7 | Example 2-8 | Comparative Example 2-5 |
|---|---|---|---|---|---|---|---|---|---|
| Type of polyorganosiloxane | | | None | A | B | C | D | E | H |
| Molecular composition ratio of polyorganosiloxane | $(Me_3SiO_{1/2})$ | M1 | None | 0.50 | 0.44 | 0.39 | 0.33 | 0.21 | 0.00 |
| | $(R^{106}SiO_{3/2})$ | T2 | None | 0.12 | 0.25 | 0.40 | 0.53 | 0.64 | 1.00 |
| | $(SiO_{4/2})$ | Q | None | 0.38 | 0.30 | 0.21 | 0.15 | 0.14 | 0.00 |
| | $(O_{1/2}Me)$ | Y | None | 0.05 | 0.05 | 0.05 | 0.04 | 0.05 | 0.00 |
| Mixing ratio | Polyorganosiloxane | Parts by mass | 0 | 37 | 37 | 37 | 37 | 37 | 37 |
| | Syrup composition | Parts by mass | 36.5 | 23 | 23 | 23 | 23 | 23 | 23 |
| | Benzyl methacrylate | Parts by mass | 59.8 | 37.7 | 37.7 | 37.7 | 37.7 | 37.7 | 37.7 |
| | IRGACURE184 | Parts by mass | 3.7 | 2.3 | 2.3 | 2.3 | 2.3 | 2.3 | 2.3 |
| Physical properties of cured product of mixture with acrylic compound | Compatibility | ○: Favorable, x: Poor | — | x, Separated | x, Non-uniform | ○, Admixed | ○, Admixed | ○, Admixed | ○, Admixed |
| | Haze, 1 mm thickness | % | 0.5 | Unmeasurable | 5.7 | 1.5 | 0.8 | 0.3 | 1.3 |

TABLE 4-continued

|  |  | Reference example 2-1 | Comparative Example 2-3 | Comparative Example 2-4 | Example 2-6 | Example 2-7 | Example 2-8 | Comparative Example 2-5 |
|---|---|---|---|---|---|---|---|---|
| Measurement methods of refractive index and Abbe's number | 1 or 2 | 1 | — | — | 1 | 1 | 1 | — |
| Abbe's number | Numerical value | 37.9 | Separated and unmeasurable | Clouded and unmeasurable | 42.4 | 41.2 | 42 | Embrittled and unmeasurable |
| Refractive index | nD | 1.5566 | Separated and unmeasurable | Clouded and unmeasurable | 1.5252 | 1.5278 | 1.533 | Embrittled and unmeasurable |
| Total light transmittance, 1 mm thickness | % | 92.4 | Unmeasurable | 91.5 | 93.3 | 93 | 92.9 | 92 |
| Pencil hardness | Rank | H | Unmeasurable | H | H | 2H | 3H | 3H |
| Storage elastic modulus at 200° C. | MPa | 0.16 | Unmeasurable | 41 | 90.0 | 122 | 200 | 220 |
| DMA Tan δ peak temperature | ° C. | 75 | Unmeasurable | 93 | 102 | 102 | 108 | 105 |
| Solder reflow, 3 cycles | — | x Molten and deformed | Unmeasurable | ○ No change | ○ No change | ○ No change | ○ No change | x Occurence of cracking |

It was found from Table 4 that any one with a methacryloyl group at T2 of less than 0.25 was inferior in compatibility with an acrylic resin, but any one with a methacryloyl group at T2 of more than 0.25 had compatibility with an acrylic resin, and thus a transparent material higher in Abbe's number and higher in refractive index than the original acrylic resin was provided and was suitable for a lens material. Mechanical strengths such as pencil hardness and storage elastic modulus were also improved. Furthermore, an increase in tan δ peak temperature, namely, an enhancement in heat resistance was achieved, and thus solder reflow resistance was imparted.

On the other hand, a cage-type silsesquioxane with T2 of 1, according to Comparative Example 2-5, caused a hard and embrittled cured product with an acrylic resin, neither the Abbe's number nor the refractive index could be measured, and furthermore cracking was caused in solder reflow. A cage-type silsesquioxane conventionally known had difficulty in satisfying high Abbe's number, high refractive index, and solder reflow resistance.

TABLE 5

|  |  |  | Reference example 2-2 | Comparative Example 2-6 | Comparative Example 2-7 | Example 2-9 | Example 2-10 | Example 2-11 | Comparative Example 2-8 |
|---|---|---|---|---|---|---|---|---|---|
| Type of polyorganosiloxane |  |  | None | A | B | C | D | E | H |
| Molecular composition ratio of polyorganosiloxane | $(Me_3SiO_{1/2})$ | M1 | None | 0.50 | 0.44 | 0.39 | 0.33 | 0.21 | 0.00 |
|  | $(R^{106}SiO_{3/2})$ | T2 | None | 0.12 | 0.25 | 0.40 | 0.53 | 0.64 | 1.00 |
|  | $(SiO_{4/2})$ | Q | None | 0.38 | 0.30 | 0.21 | 0.15 | 0.14 | 0.00 |
|  | $(O_{1/2}Me)$ | Y1 | None | 0.05 | 0.05 | 0.05 | 0.04 | 0.05 | 0.00 |
| Mixing ratio | Polyorganosiloxane | Parts by mass | 0 | 17 | 17 | 17 |  | 17 |  |
|  | NK ester A-9300 | Parts by mass | 13.6 | 16.4 | 16.4 | 16.4 | 16.4 | 16.4 | 16.4 |
|  | Alnix M-327 | Parts by mass | 19.9 | 24 | 24 | 24 | 24 | 24 | 24 |
|  | Benzyl methacrylate | Parts by mass | 34.0 | 41 | 41 | 41 | 41 | 41 | 41 |
|  | IRGACURE184 | Parts by mass | 1.3 | 1.6 | 1.6 | 1.6 | 1.6 | 1.6 | 1.6 |
| Physical properties of cured product of mixture with acrylic compound | Compatibility |  | ○: Favorable, x: Poor | — | x, Clouded | x, Clouded | ○, Admixed | ○, Admixed | ○, Admixed | ○, Admixed |
|  | Haze, 1 mm thickness | % | 0.5 | 74.1 | 82.6 | 10.7 | 0.8 | 0.4 | 0.3 |
|  | Measurement methods of refractive index and Abbe's number | 1 or 2 | 1 | 1 | 1 | 1 | 1 | 1 | 1 |
|  | Abbe's number | Numerical value | 43.9 | Clouded and Unmeasurable | Clouded and Unmeasurable | 48.3 | 47.3 | 44.7 | 45.1 |
|  | Refractive index | nD | 1.5358 | Clouded and Unmeasurable | Clouded and Unmeasurable | 1.5251 | 1.5253 | 1.5276 | 1.5325 |
|  | Total light transmittance, 1 mm thickness | % | 93.1 | 91.6 | 92.9 | 92.8 | 93.1 | 92.8 | 92.7 |
|  | Pencil hardness | Rank | 3H | HB | 3H | 3H | 2H | 3H | 3H |
|  | Storage elastic modus at 200° C. | MPa | 100 | 154 | 200 | 250 | 288 | 332 | 370 |

TABLE 5-continued

|  |  | Reference example 2-2 | Comparative Example 2-6 | Comparative Example 2-7 | Example 2-9 | Example 2-10 | Example 2-11 | Comparative Example 2-8 |
|---|---|---|---|---|---|---|---|---|
| DMA Tan δ peak temperature | °C. | 150 | 150 | 154 | 146 | 151 | 155 | 158 |
| Solder reflow, 3 cycles | — | ○ No change | ○ No change | ○ No change | ○ No change | ○ No change | ○ No change | ○ No change |

It was found from Table 5 that even a photo-curable polyfunctional acrylic oligomer composition was inferior in compatibility with an acrylic resin in the case of having a methacryloyl group at T2 of less than 0.25, but was compatible with an acrylic resin in the case of having a methacryloyl group at T2 of more than 0.25, and thus was higher in Abbe's number than the original acrylic resin. Such a photo-curable polyfunctional acrylic oligomer composition was found to be optimally balanced in compatibility, transparency, Abbe's number, and refractive index in the range of 0.25<T2<1.

TABLE 6

|  |  |  |  | Example 2-12 I | Comparative Example 2-9 H | Comparative Example 2-10 J |
|---|---|---|---|---|---|---|
| Type of polyorganosiloxane |  |  |  |  |  |  |
| Molecular composition ratio ofe polyorganosiloxan | $(Me_3SiO_{1/2})$ | M1 |  | 0.22 | 0.00 | 0.00 |
|  | $(R^{106}SiO_{1/2})$ | T2 |  | 0.65 | 1.00 | 1.00 |
|  | $(SiO_{4/2})$ | Q |  | 0.13 | 0.00 | 0.00 |
|  | $(O_{1/2}Me)$ | Y1 |  | 0.08 | 0.00 | 0.08 |
| Physical properties of polyorganosiloxane before curing | Viscosity | MPa·s |  | 1150 | 3711 | 2980 |
|  | Refractive index at 20° C. | nD |  | 1.4670 | 1.4797 | 1.4782 |
| Initiator | Irgacure1173 | 3 Wt % |  | ○ | ○ | ○ |
| Physical properties of polyorganosiloxane after curing | Heat resistance test, yellow index at 85° C. and 85% after 168 hours | — |  | 2.07 | 2.42 | 2.71 |
|  | Water absorption rate | % |  | 0.83 | 1.00 | 1.83 |

It was found from Table 6 that a structure including the M unit and the Q unit was suitable in terms of thermal coloration resistance and water absorption rate based on comparison between a cage-type silsesquioxane and a non-cage-type silsesquioxane, with T2 of 1. A structure including no alkoxy group was increased in viscosity and decreased in handleability, and thus a structure having a small amount of an alkoxy group was preferable.

TABLE 7

|  |  |  | Example 2-13 D | Example 2-14 K | Example 2-15 L |
|---|---|---|---|---|---|
| Type of polyorganosiloxane |  |  |  |  |  |
| Molecular composition ratio of polyorganosiloxane | $(Me_3SiO_{1/2})$ | M1 | 0.33 | 0.25 | 0.32 |
|  | $(R^{106}SiO_{3/2})$ | T2 | 0.53 | 0.50 | 0.45 |
|  | $(SiO_{4/2})$ | Q | 0.15 | 0.25 | 0.23 |
|  | $(O_{1/2}Me)$ | Y1 | 0.04 | 0.03 | 0.04 |
| Physical properties of polyorganosiloxane before curing | Viscosity | mPa·s | 640 | 2854 | 1933 |
|  | Refractive index at 20° C. | nD | 1.4590 | 1.4632 | — |
| Initiator | Irgacure1173 | 3 wt % | ○ | ○ | ○ |
| Physical properties of polyorganosiloxane after curing | Measurement methods of refractive index and Abbe's number | 1 or 2 | 1 | 1 | 1 |
|  | Abbe's number | — | 46.3 | 46.9 | 45.6 |
|  | Refractive index | nD | 1.4816 | 1.4831 | 1.4784 |
|  |  | nC | 1.4788 | 1.4802 | 1.4761 |
|  |  | nF | 1.4892 | 1.4905 | 1.4866 |

It was found based on comparison between Examples 2-13 and 2-14 in Table 7 that the Abbe's number was increased in a decreased ratio of the M1 unit and an equivalent or slightly lower ratio of the T2 unit, and thus incorporation of an excess of the M1 unit caused a decrease in Abbe's number. It was found based on comparison between Examples 2-13 and 2-15 that the Abbe's number was decreased in an equivalent ratio of the M1 unit and a low ratio of the T2 unit. It was found based on comparison between Examples 2-14 and 2-15 that the Abbe's number was decreased in an equivalent ratio of the Q unit, a high ratio of the M1 unit and a low ratio of the T2 unit.

amount of light: 3,000 mJ/cm$^2$), and heated in a heating furnace set to 100° C., for 30 minutes, thereby providing a test piece having a thickness of 1 mm. Various physical properties of the test piece measured are shown in Table 9. Substances used were dicyclopentanyl methacrylate (product name: FANCRYL FA-513M manufactured by Hitachi Chemical Co., Ltd.), polybutylene glycol (having a degree of polymerization of 28) dimethacrylate (product name: FA-PTG28M manufactured by Hitachi Chemical Co., Ltd.), dipentaerythritol hexa acrylate (KAYARAD DPHA manufactured by Nippon Kayaku Co., Ltd.), and a phosphorus-based antioxidant and/or a phenol-based antioxidant as antioxidant(s).

Physical properties such as elastic modulus and glass transition point could be improved without any impairment of optical characteristics of the methacrylic resin used as a base resin.

TABLE 8

| | | | Example 2-3 | Example 2-16 | Example 2-17 | Example 2-18 |
|---|---|---|---|---|---|---|
| | Type of polyorganosiloxane | | E | M | N | O |
| Molecular composition ratio of polyorganosiloxane | (Me$_3$SiO$_{1/2}$) | M1 | 0.21 | 0.22 | 0.21 | 0.21 |
| | (R$^{106}$SiO$_{3/2}$) | T2 | 0.64 | 0.54 | 0.33 | 0.00 |
| | (R$^{106}$SiO$_{3/2}$) | T2 | 0.00 | 0.11 | 0.31 | 0.63 |
| | (SiO$_{4/2}$) | Q | 0.14 | 0.13 | 0.15 | 0.16 |
| | (O$_{1/2}$Me) | Y1 | 0.05 | 0.04 | 0.04 | 0.06 |
| Physical properties of polyorganosiloxane before curing | Viscosity | mPa·s | 1220 | 1328 | 750 | 495 |
| | Refractive index at 20° C. | nD | 1.4675 | 1.4669 | 1.4671 | 1.4675 |
| Initiator | Irgacure1173 | 3 wt % | ○ | ○ | ○ | ○ |
| Physical properties of polyorganosiloxane after curing | Measurement methods of refractive index and Abbe's number | 1 or 2 | 1 | 1 | 1 | 1 |
| | Abbe's number | | — | 49.3 | 51.0 | 51.1 | 51.2 |
| | Refractive index | nD | 1.4882 | 1.4900 | 1.4908 | 1.4912 |
| | | nC | 1.4858 | 1.4870 | 1.4881 | 1.4884 |
| | | nF | 1.4957 | 1.4966 | 1.4977 | 1.4980 |

It was found from Table 8 that an equivalent Abbe's number was exhibited even in use of two or more kinds of T2 units as long as the total content of T2 was equivalent.

[Production Methods of Acrylic Composition and Cured Product]

Each mixture shown in Table 9 was sealed with glass, photo-cured by a high-pressure mercury lamp (accumulated

TABLE 9

| | | | Reference Example 2-3 | Comparative: Example 2-11 | Example 2-19 | Example 2-20 | Example 2-21 | Example 2-22 |
|---|---|---|---|---|---|---|---|---|
| | Type of polyorganosiloxane | | None | None | O | U | O | Q |
| Molecular composition ratio of polyorganosiloxane | (Me$_3$SiO$_{1/2}$) | M1 | None | None | 0.21 | 0.35 | 0.21 | 0.31 |
| | (R$^{106}$SiO$_{3/2}$) | T2 | None | None | 0.00 | 0.00 | 0.00 | 0.43 |
| | (R$^{106}$SiO$_{3/2}$) | T2 | Nose | None | 0.63 | 0.35 | 0.63 | 0.00 |
| | (R$^{110}$SiO$_{1/2}$) | T1 | None | None | 0.00 | 0.25 | 0.00 | 0.19 |
| | (SiO$_{4/2}$) | Q | None | None | 0.16 | 0.04 | 0.16 | 0.08 |
| | (O$_{1/2}$Me) | Y1 | None | None | 0.06 | 0.01 | 0.06 | 0.07 |
| Mixing ratio | Polyorganosiloxane | Parts by mass | 0 | 0 | 25 | 25 | 40 | 40 |
| | Fancryl FA-513M | Parts by mass | 25 | 25 | 25 | 25 | 25 | 25 |
| | Fancryl FA-PTG28M | Parts by mass | 75 | 50 | 50 | 50 | 35 | 35 |
| | DPHA | Parts by mass | 0 | 25 | 0 | 0 | 0 | 0 |
| | IRGACURE184 | Parts by mass | 2.0 | 2.0 | 2.0 | 2.0 | 2.0 | 2.0 |
| Physical properties of cured product of mixture | Compatibility | ○: Favorable, x: Poor | ○ | x Clouded | ○ | ○ | ○ | ○ |
| | Haze, 1 mm thickness | % | 0.3 | 77.2 | 0.5 | 0.3 | 0.3 | 1.0 |
| | Measurement methods of refractive index and Abbe's number | 1 or 2 | 2 | — | 2 | 2 | 2 | 2 |
| | Abbe's number | Numerical value | 55.8 | — | 55.5 | 55.4 | 55.2 | 54.7 |
| | Refractive index | nD | 1.4878 | — | 1.4941 | 1.4912 | 1.4973 | 1.4913 |
| | | nC | 1.4852 | — | 1.4914 | 1.4386 | 1.4946 | 1.4886 |
| | | nF | 1.4940 | — | 1.5004 | 1.4974 | 1.5036 | 1.4976 |

TABLE 9-continued

|  |  | Reference Example 2-3 | Comparative Example 2-11 | Example 2-19 | Example 2-20 | Example 2-21 | Example 2-22 |
|---|---|---|---|---|---|---|---|
| Total light transmittance, 1 mm thickness | % | 94.1 | 92.1 | 93.5 | 93.8 | 98.8 | 93.9 |
| Pencil hardness | Rank | — | — | — | — | 3B | 4B |
| Storage elastic modulus E' at 35° C. | MPa | Unmeasurable | — | 185 | 92 | 498 | — |
| Tan δ peak temperature | ° C. | <25 | — | 57 | 38 | 97 | — |

Evaluation III: Examples 3-1 to 3-3 and Comparative Examples 3-1 to 3-4

[Measurement Method]
1. Measurement of Amount of Reactive Functional Group in Polyorganosiloxane The amount of the reactive functional group in each polyorganosiloxane was measured in the same manner as in the above method.

2. Measurement Method of 29Si-NMR $^{29}$Si-NMR measurement was performed in the same manner as in the above method.

3. Measurement of Proportions of M, D, T, and Q

A compound containing silicon as a main component has a structure where oxygen atom(s) O, carbon atom(s) C, or the like are bound to each vertex of a tetrahedron of a silicon atom Si, and one where one oxygen atom is bound thereto is referred to as "M unit", one where two oxygen atoms are bound thereto is referred to as "D unit", one where three oxygen atoms are bound thereto is referred to as "T unit", and one where four oxygen atoms are bound thereto is referred to as "Q unit". The positions of signals in a spectrum obtained from $^{29}$Si-NMR measurement can be separated with respect to the above four units, generally, the M unit is observed at −20 to 0 ppm, the D unit is observed at 0 to −30 ppm, the T unit is observed at −40 to −80 ppm, and the Q unit is observed at −80 ppm to −130 ppm, the signal integration ratio among them is equal to the abundance ratio of each silicon atom, and thus the ratio of each of the M, D, T, and Q units can be calculated. Here, there may be out of the ranges depending on any atom or atomic group bound to a silicon atom and/or a carbon atom, and for example, the signal of a silicon atom to which a hydrogen atom is directly bound is often observed in a higher magnetic field than the signal of a silicon atom to which a methyl group is bound. In addition, the signal in a case where a hydrogen atom and/or a methyl group are/is further bound to an oxygen atom bound to a silicon atom, namely, the signal of a silicon atom to which a hydroxyl group and/or a methoxy group are/is bound is observed in a lower magnetic field. It is noted that there may also be thus out of the ranges due to such cases. In such cases, for example, any signal observed in $^{29}$Si-NMR can be assigned to each of the M, D, T, and Q units by confirming a relationship between the signal of silicon of interest and the signal of proton in a group introduced into silicon according to 1H-$^{29}$Si two-dimensional NMR measurement.

4. Measurement of Molecular Weight

The molecular weight was measured in the same manner as in the above method.

[Production of Sample]
[Reagents Used]

Reagents, solvents, and the like used in synthesis are as follows.

Hexamethyldisiloxane (manufactured by NuSil Technology LLC, product name: S-7205)
1,3-Divinyltetramethyldisiloxane (manufactured by NuSil Technology LLC, product name: PLY-70)
1,1,3,3-Tetramethyldisiloxane (manufactured by NuSil Technology LLC), methyl silicate MS-51 (manufactured by Mitsubishi Chemical Corporation)
Tetrahydrofuran (manufactured by Kishida Chemical Co., Ltd.)
Ethylene glycol monovinyl ether (manufactured by Tokyo Chemical Industry Co., Ltd.)
Diethylene glycol monovinyl ether (manufactured by Tokyo Chemical Industry Co., Ltd.)
Toluene (manufactured by Kishida Chemical Co., Ltd.)
Ethanol (manufactured by Kishida Chemical Co., Ltd.)
Methanol (manufactured by Kishida Chemical Co., Ltd.)
Heptane (manufactured by Kishida Chemical Co., Ltd.)
N,N-dimethylformamide (manufactured by Wako Pure Chemical Industries, Ltd.)
1 N Hydrochloric acid (manufactured by Kishida Chemical Co., Ltd.)
Aqueous 8 N potassium hydroxide solution (manufactured by Kishida Chemical Co., Ltd.)
Solution of platinum(0)-1,3-divinyl-1,1,3,3-tetramethyldisiloxane complex in xylene (up to 2% of platinum; manufactured by Sigma-Aldrich) Metachloroperbenzoic acid (manufactured by Kishida Chemical Co., Ltd.) having a purity of about 70%

[Synthesis of Polyorganosiloxane]

[Synthesis Example 3-1] Polyorganosiloxane 12

After 2.6 parts by weight of hexamethyldisiloxane, 9.16 parts by weight of 1,3-divinyltetramethyldisiloxane, and 8.24 parts by weight of methyl silicate MS-51 were dissolved in a mixed solvent of 10.0 parts by weight of toluene and 10.0 parts by weight of methanol, a mixture of 5.10 parts by weight of 1 N hydrochloric acid and 2.55 parts by weight of methanol was added, and stirred at 40° C. for 4 hours. The resultant was diluted with 17.5 parts by weight of heptane, and thereafter washed with demineralized water. The solvent was distilled off at 76° C. under a reduced pressure of 15 Torr by use of a rotary evaporator until distillation of the solvent was not visually observed. Subsequently, the resultant was heated at 110° C. under a reduced pressure of 0.15 torr for 2 hours, thereby providing "polyorganosiloxane 12".

Figure 5:
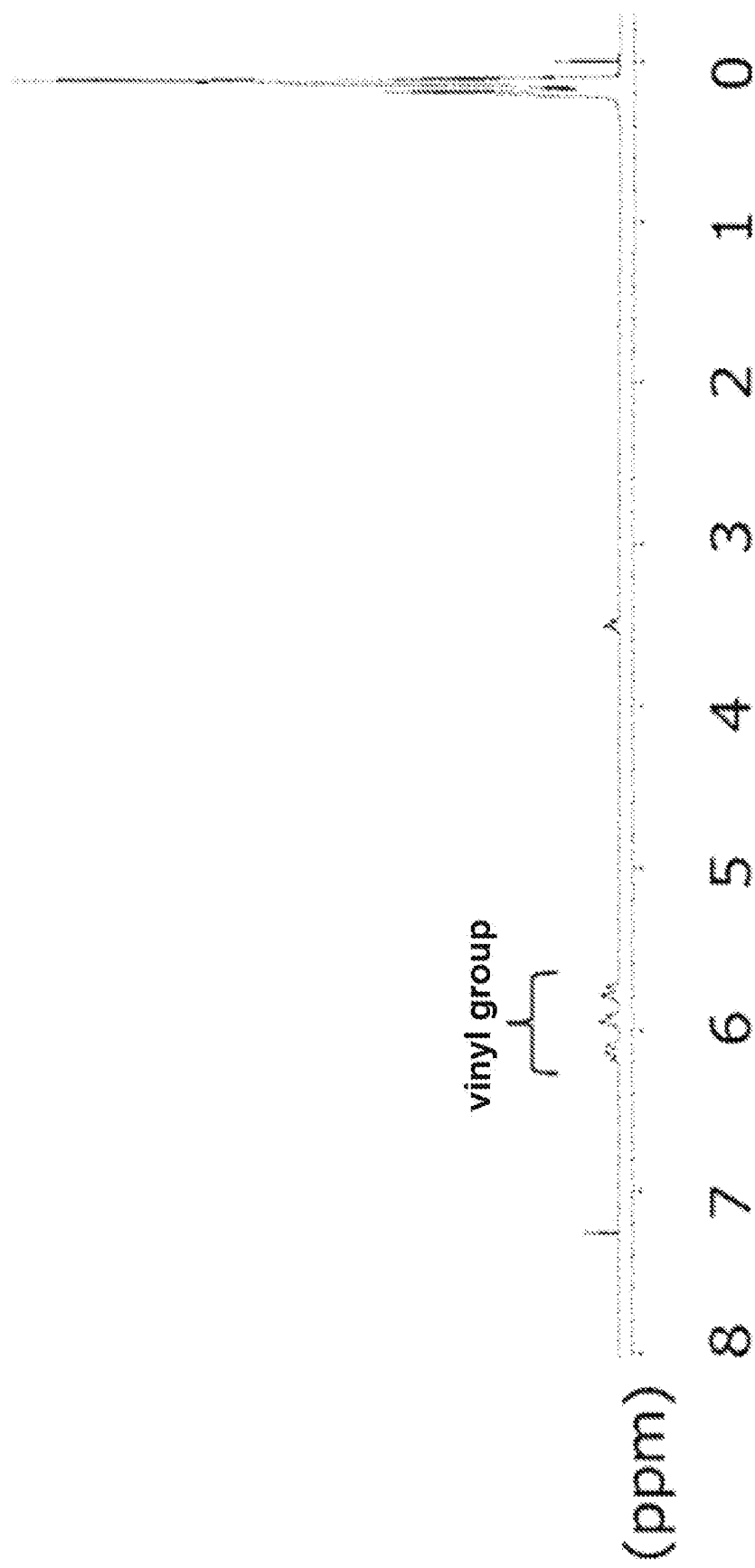
FIG. 5 illustrates the results of $^1$H-NMR measurement of a polyorganosiloxane obtained by Synthesis Example 3-1 of the present invention.

"Polyorganosiloxane 12" was subjected to $^1$H-NMR by the same method as the method described in [Measurement method] 1 above, and was confirmed to be a vinyl group-containing polyorganosiloxane. The chart in measurement is illustrated in FIG. 5. FIG. 5 illustrates a chart in no addition of an internal standard. The amount of the reactive functional group was determined by measurement with respect to a separate sample to which toluene was added as an internal standard.

[Synthesis Example 3-2] Polyorganosiloxane 13

After 74 parts by mass of 1,1,3,3-tetramethyldisiloxane and 95 parts by mass of methyl silicate MS-51 were dissolved in a mixed solvent of 84 parts by mass of toluene and 84 parts by mass of methanol, a mixture of 58 parts by mass of 1 N hydrochloric acid and 58 parts by mass methanol was added and stirred at 30° C. for 3 hours. Thereafter, the solvent was distilled off and a product was filtered, thereby providing "polyorganosiloxane 13".

Figure 6:
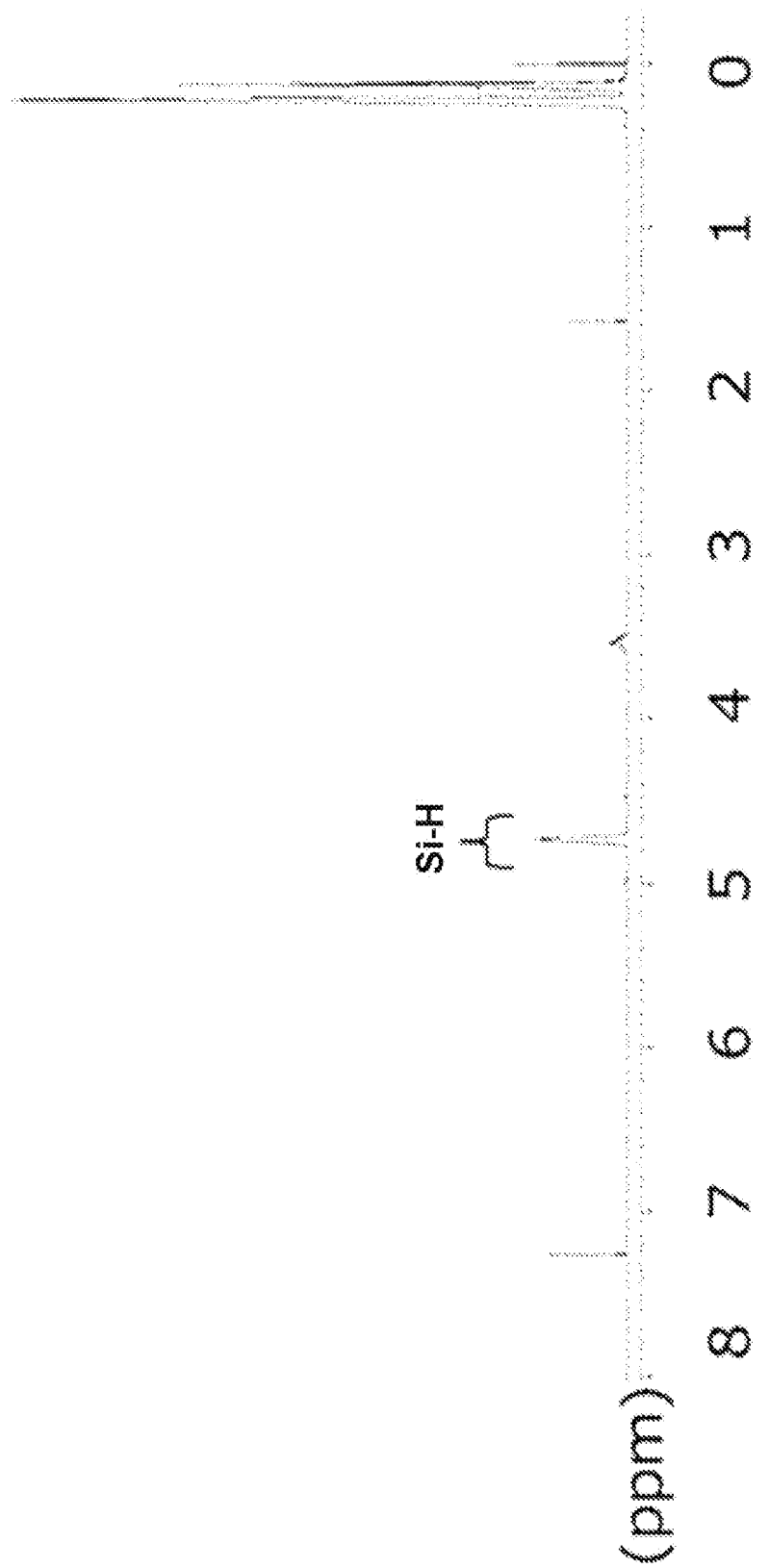
FIG. 6 illustrates the results of $^1$H-NMR measurement of a polyorganosiloxane obtained by Synthesis Example 3-2 of the present invention.

"Polyorganosiloxane 13" obtained was subjected to measurement of $^1$H-NMR in the same manner as in Synthesis Example 3-1, and was confirmed to be a hydrosilyl group-containing polyorganosiloxane. The chart in measurement is illustrated in FIG. 6.

[Synthesis Example 3-3] Polyorganosiloxane 14

A 1-L four-necked flask was charged with 30 parts by mass of polyorganosiloxane 12 synthesized in the above Synthesis Example 3-1, 300 ml of chloroform was added thereto for dissolution, thereafter the content was heated to an internal temperature of about 40° C. in an oil bath, and 56.2 parts by mass in total of metachloroperbenzoic acid was added in five portions with stirring over 9 hours in total. After addition of the fourth portion in the middle, 50 ml of chloroform was added. The change in reaction over time was tracked by $^1$H-NMR, and the rate of conversion was determined by the ratio of the integrated values of proton of a vinyl group at a 5 value of 5.70 to 6.25 and proton of an epoxy group at a 5 value of 2.15 to 3.00 in the $^1$H-NMR analysis conditions. Heating was terminated when the rate of conversion reached 98%. After the internal temperature was dropped to about 10° C. by an ice water bath, the resultant was washed with 100 ml of 5% by mass sodium thiosulfate twice. The resultant was further washed with 100 ml of saturated sodium bicarbonate water twice and 100 ml of water once, no peroxide remaining in both an organic phase and an aqueous phase was confirmed by KI starch paper, and thereafter the solvent was distilled off, thereby providing 31.3 parts by mass of polyorganosiloxane 14. The solubility of polyorganosiloxane 14 in γ-butyrolactone was favorable.

Figure 7:
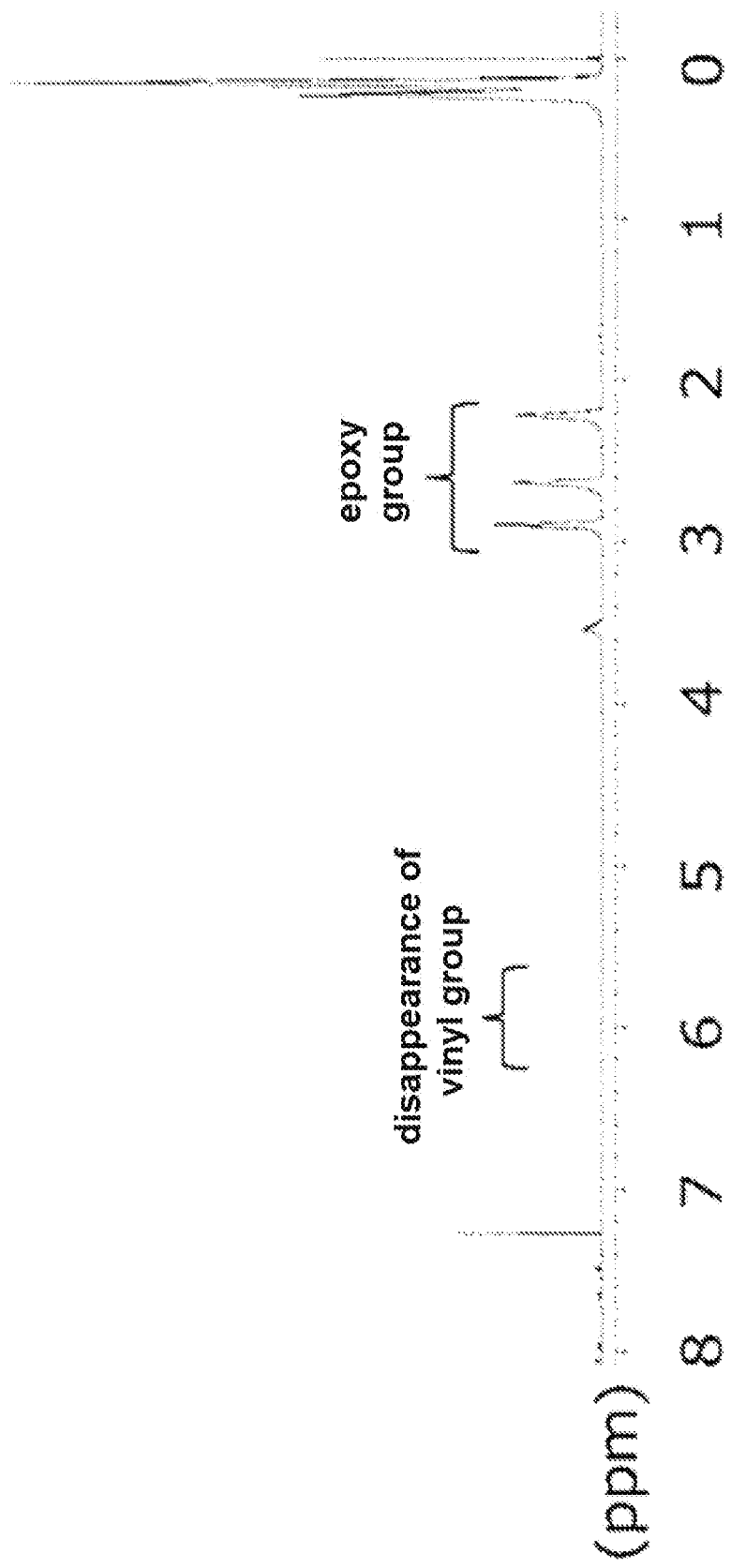
FIG. 7 illustrates the results of $^1$H-NMR measurement of a polyorganosiloxane obtained by Synthesis Example 3-3 of the present invention.

"Polyorganosiloxane 14" obtained was subjected to measurement of $^1$H-NMR in the same manner as in Synthesis Example 3-1, and was confirmed to be an epoxy group-containing polyorganosiloxane. The chart in measurement is illustrated in FIG. 7.

$^{29}$Si-NMR measurement was performed by the above method to determine the proportions of M, D, T, and Q from the results, and it was found that a=0.62, b=0, c=0, and d=0.38 were satisfied and also e+f was 0.09. Separation of e and f in the chart obtained by measurement is often difficult, and thus the total of e and f may be adopted. It was also found that the number average molecular weight was 1000 and the amount of the reactive functional group per a molecular weight of 1000 was 4.9.

[Synthesis Example 3-4] Polyorganosiloxane 15

After 50 parts by mass of polyorganosiloxane 13 obtained in Synthesis Example 3-2 and 48 parts by mass of ethylene glycol monovinyl ether were dissolved in 195 parts by mass of toluene, 0.05 parts by mass of a solution of platinum(0)-1,3-divinyl-1,1,3,3-tetramethyldisiloxane complex in xylene, having a platinum concentration of 2% by weight, was added, and the resultant was stirred at 80° C. for 6 hours. The change in reaction over time was tracked by $^1$H-NMR, and the signal derived from proton directly bound to a silicon atom, at a 5 value of 4.5 to 4.9, completely disappeared, and new signals derived from a 2-(2-hydroxyethoxy) ethyl group bound to a silicon atom, at a 5 value of 2.5 to 4.0 and a 5 value of 0.8 to 1.2, were quantitatively observed in the $^1$H-NMR analysis conditions. After cooling to room temperature, 50 parts by mass of silica gel was added and stirred for 30 minutes, and thereafter the solvent of the filtrate obtained by filtration was distilled off, thereby providing polyorganosiloxane 15. The solubility of polyorganosiloxane 15 in ethylene glycol and γ-butyrolactone was favorable.

Figure 8:
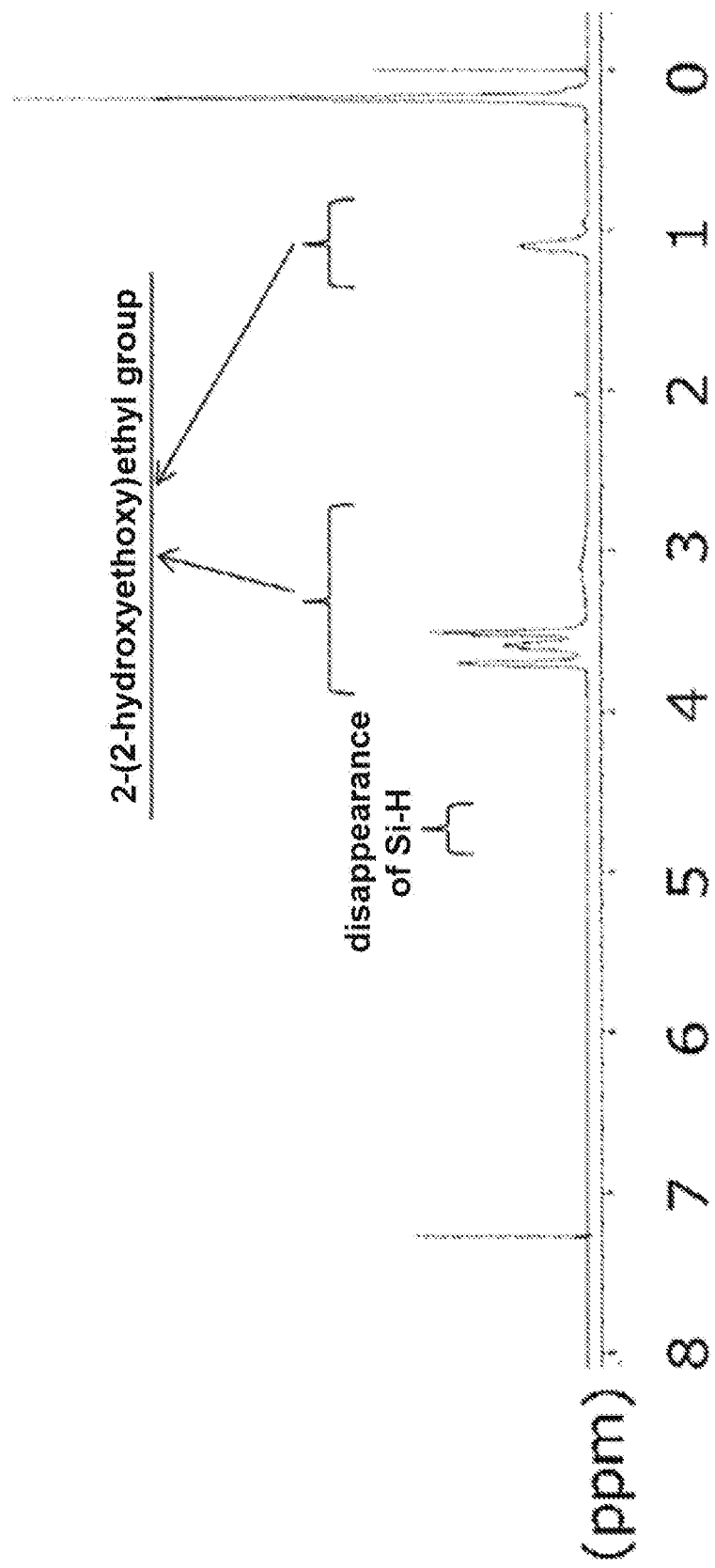
FIG. 8 illustrates the results of $^1$H-NMR measurement of a polyorganosiloxane obtained by Synthesis Example 3-4 of the present invention.

"Polyorganosiloxane 4" obtained was subjected to measurement of $^1$H-NMR in the same manner as in Synthesis Example 3-1, and was confirmed to be an ethylene glycol group-containing polyorganosiloxane. The chart in measurement is illustrated in FIG. 8. $^{29}$Si-NMR measurement was performed by the above method to determine the proportions of M, D, T, and Q from the results, and it was found that a=0.56, b=0, c=0, and d=0.44 were satisfied and also e+f was 0.05. It was also found that the number average molecular weight was 2400 and the amount of the functional group per a molecular weight of 1000 was 4.7.

[Synthesis Example 3-5] Polyorganosiloxane 16

After 50 parts by mass of polyorganosiloxane 13 obtained in Synthesis Example 3-2 and 71 parts by mass of diethylene glycol monovinyl ether were dissolved in 195 parts by mass of toluene, 0.05 parts by mass of a solution of platinum(0)-1,3-divinyl-1,1,3,3-tetramethyldisiloxane complex in xylene, having a platinum concentration of 2% by weight, was added, and the resultant was stirred at 110° C. for 8 hours. The change in reaction over time was tracked by $^1$H-NMR, and the signal derived from proton directly bound to a silicon atom, at a 5 value of 4.5 to 4.9, completely disappeared, and new signals derived from a 2-(2-(2-hydroxyethoxy)ethoxy)ethyl group bound to a silicon atom, at a 5 value of 2.4 to 4.2 and a 5 value of 0.8 to 1.2, were quantitatively observed in the $^1$H-NMR analysis conditions. After cooling to room temperature, 50 parts by mass of silica gel was added and stirred for 30 minutes, and thereafter the resultant was filtered. The solvent of the filtrate obtained by such filtration was distilled off, thereby providing polyorganosiloxane 16. The solubility of polyorganosiloxane 16 in ethylene glycol and γ-butyrolactone was favorable.

Figure 9:
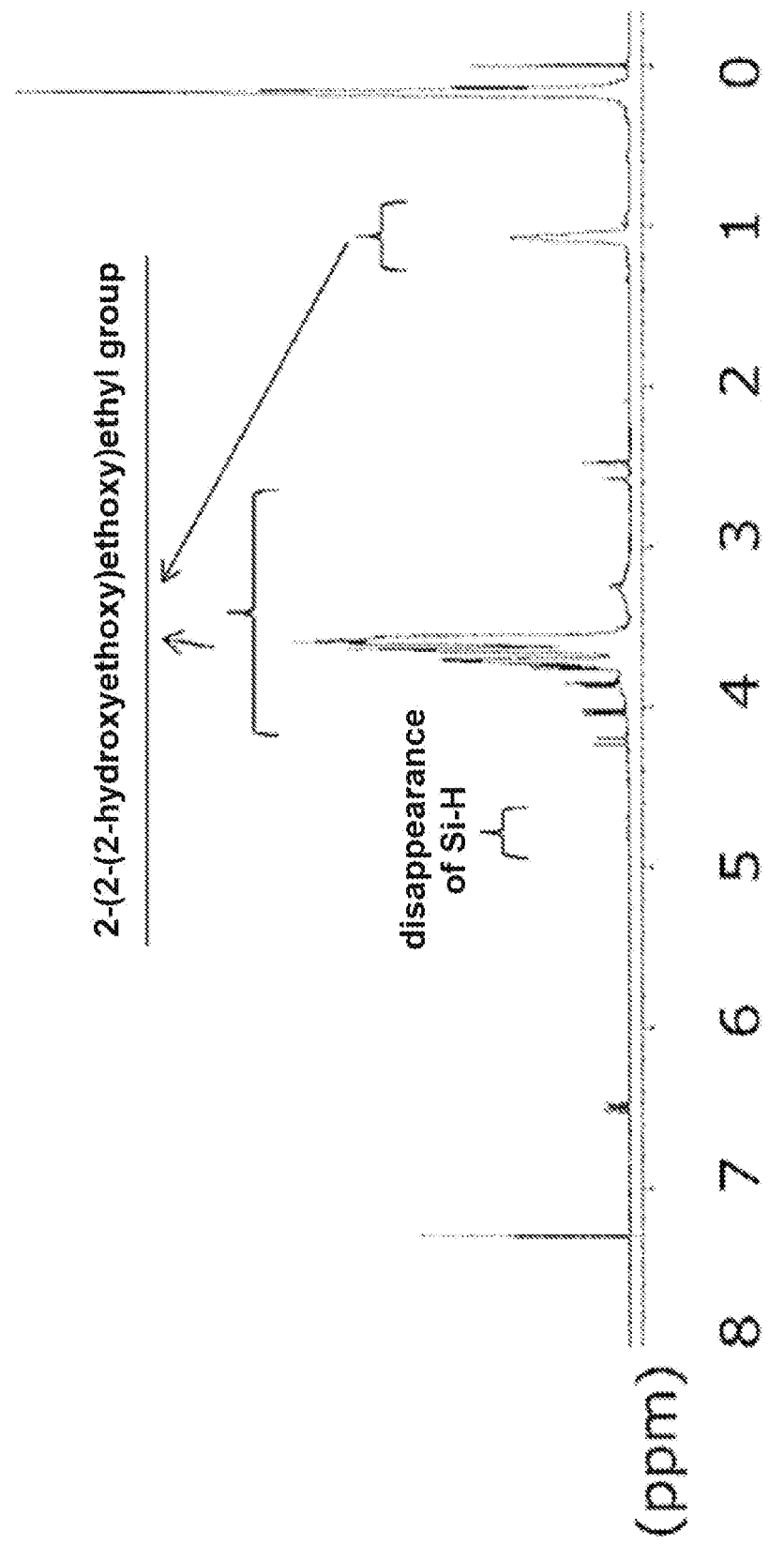
FIG. 9 illustrates the results of $^1$H-NMR measurement of a polyorganosiloxane obtained by Synthesis Example 3-5 of the present invention.

"Polyorganosiloxane 16" obtained was subjected to measurement of $^1$H-NMR in the same manner as in Synthesis Example 3-1, and was confirmed to be a diethylene glycol group-containing polyorganosiloxane. The chart in measurement is illustrated in FIG. 9. $^{29}$Si-NMR measurement was performed by the above method to determine the proportions of M, D, T, and Q from the results, and it was found that a=0.56, b=0, c=0, and d=0.44 were satisfied and also e+f was 0.05. It was also found that the number average molecular weight was 3000 and the amount of the reactive functional group per a molecular weight of 1000 was 3.7.

Example 3-1

(Production of Electrolytic Solution)

γ-Butyrolactone (90 parts by mass) was added to 1-ethyl-2,3-dimethylimidazolium phthalate (10 parts by mass), thereby producing a base electrolytic solution. Polyorganosiloxane 14 (6 parts by mass) was added to the base electrolytic solution, and water was further added thereto to adjust the water content to 1%, thereby producing an electrolytic solution. The electrolytic solution was configured from 1-ethyl-2,3-dimethylimidazolium phthalate (9.4% by mass), γ-butyrolactone (84.1% by mass), polyorganosiloxane (5.6% by mass), and water (1.0% by mass).

(Measurement of Conductivity of Electrolytic Solution and Withstand Voltage of Capacitor)

The conductivity of the electrolytic solution thus adjusted was measured in a constant-temperature bath at 25° C. by use of a multi water quality meter (MM-60R) manufactured by DKK-TOA CORPORATION.

As a result, the conductivity (25° C.) of the electrolytic solution including polyorganosiloxane 14 was 6.3/mS·cm$^{-1}$.

Figure 2:
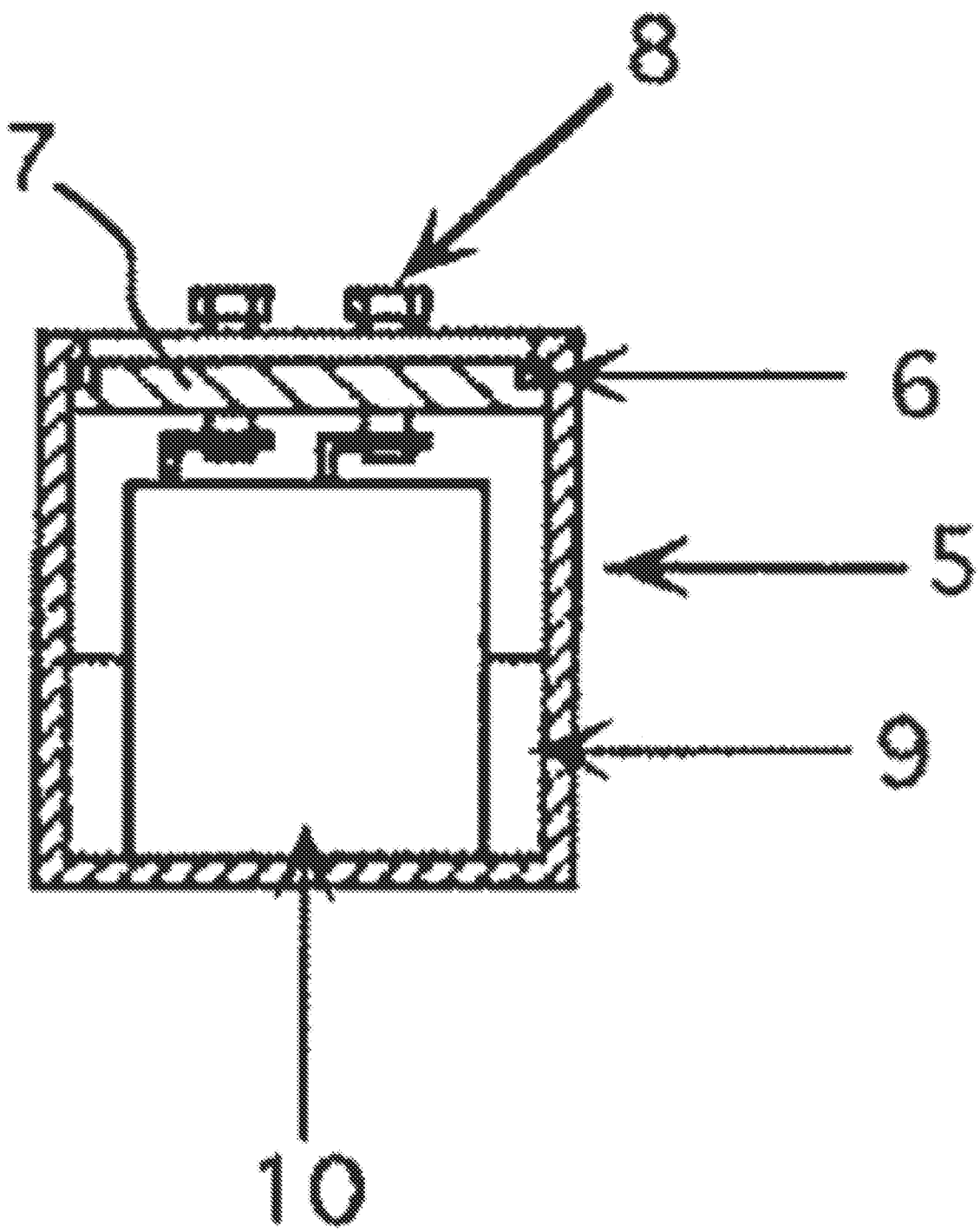
FIG. 2 is an explanation view illustrating one example of the structure of an electrolytic capacitor including a packaging case.
Figure 3:
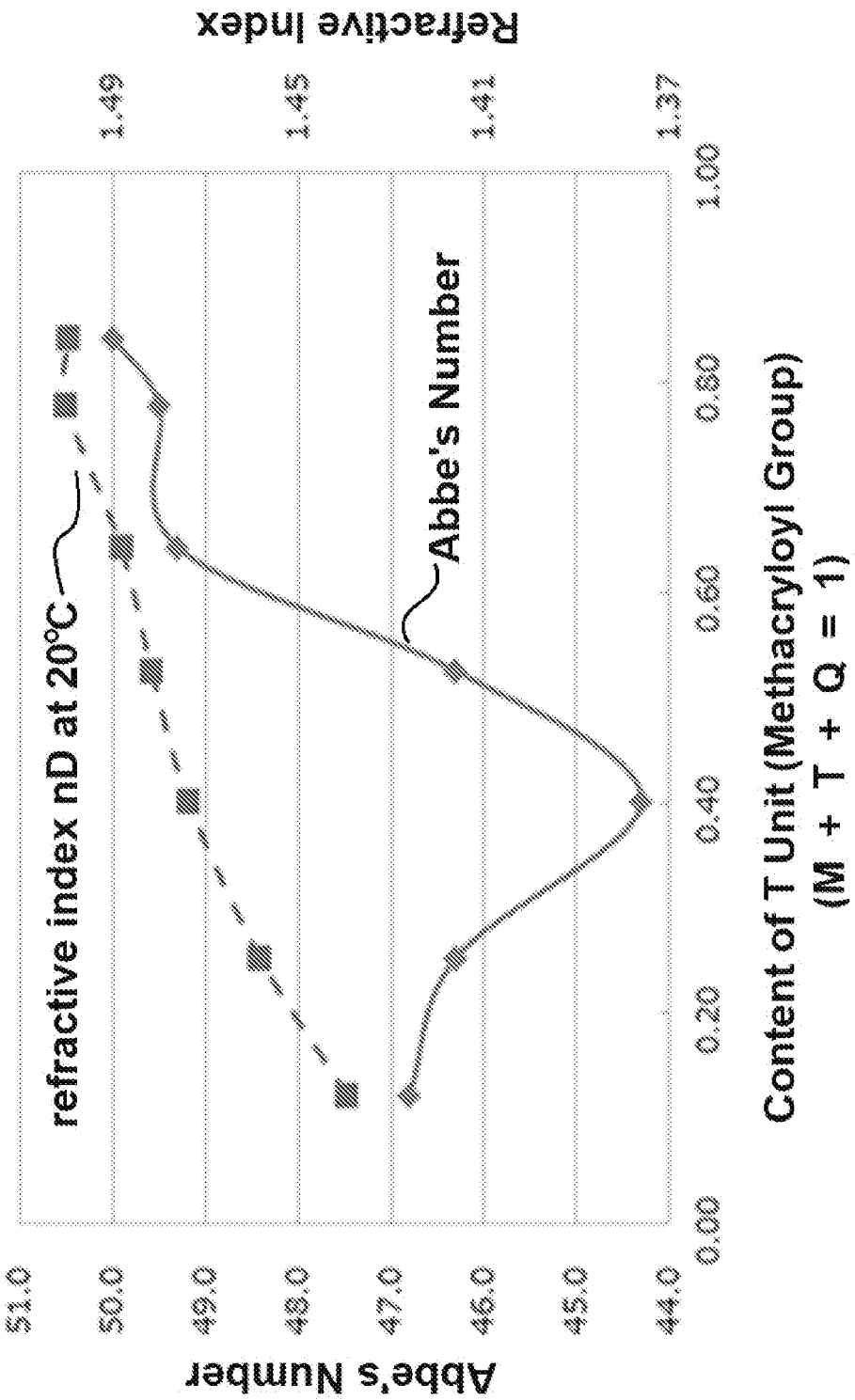
FIG. 3 illustrates a relationship between the content of a (meth)acryloyl group and the Abbe's number or the refractive index.

Next, a winding-type element illustrated in FIG. 1 was impregnated with the electrolytic solution produced, and the winding-type element was received in an aluminum packaging case, thereby producing an aluminum electrolytic capacitor having a structure where sealing was made by butyl rubber vulcanized by peroxide (FIG. 2).

The voltage value where spike or scintillation was first observed in application of a constant current of 10 mA to the aluminum electrolytic capacitor at 125° C. in the ascending curve of voltage-time was measured as the withstand voltage, and was 200 V. The specification of an aluminum electrolytic capacitor element used had a case size of 10φ× 20 L, a rated voltage of 200 V, and an electrostatic capacitance of 20 μF.

Examples 3-2 and 3-3

Respective electrolytic solutions were produced in the same manner as in Example 3-1 except that respective polyorganosiloxanes 15 and 16 obtained in Synthesis Examples 3-4 and 3-5 were used, and were subjected to measurement of conductivity and withstand voltage. The results are shown in Table 10.

Comparative Example 3-1

Measurement was made in the same manner as in Example 3-1 except that no polyorganosiloxane was added. The results are shown in Table 10. The withstand voltage in no addition was found to be 85 V.

Comparative Example 3-2

A commercially available silane coupling agent (having a molecular weight of 236, and including only a T unit) having an epoxy group was added instead of polyorganosiloxane, and measurement was performed in the same manner as in Example 3-1. The withstand voltage was slightly enhanced and was 102 V, but was inferior as compared with those in Examples. The results are shown in Table 10.

Comparative Example 3-3

A commercially available epoxy modified silicone (having a molecular weight of 800, a=0.29, b=0.71, c=d=0, amount of reactive functional group: 2.5) was added instead of polyorganosiloxane, and measurement was performed in the same manner as in Example 3-1. The results are shown in Table 10.

Comparative Example 3-4

Organic silica sol modified by an epoxy group (the structure of a functional group for modification was shown in Table 10) described in JP-A No. H10-241999 was added instead of polyorganosiloxane, and measurement was tried to be performed in the same manner as in Example 3-1, but gelation occurred and no evaluation of a capacitor could be made. Such results are also shown in Table 10.

TABLE 10

| | Polyorganosiloxane | a (Percentage of M unit) | b (Percentage of D unit) | c (Percentage of T unit) | d (Percentage of Q unit) | Molecular weight (Mn) |
|---|---|---|---|---|---|---|
| Example 3-1 | Polyorganosiloxane 14 | 0.62 | 0 | 0 | 0.38 | 1000 |
| Example 3-2 | Polyorganosiloxane 15 | 0.56 | 0 | 0 | 0.44 | 2400 |
| Example 3-3 | Polyorganosiloxane 16 | 0.56 | 0 | 0 | 0.44 | 3000 |
| Comparative Example 3-1 | None | — | — | — | — | — |
| Comparative Example 3-2 | Silane coupling agent 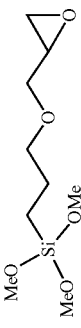 | 0 | 0 | 1 | 0 | 236 |
| Comparative Example 3-3 | Modified silicone 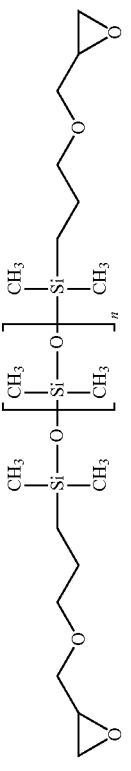 | 0.29 | 0.71 | 0 | 0 | 800 |
| Comparative Example 3-4 | Organic silica sol modified | 0 | 0 | 0.025 | 0.975 | — |

TABLE 10-continued

| | Functional group for modification | | Evaluation of capacitor | | |
|---|---|---|---|---|---|
| | Structure | Amount of functional group *1 | Conductivity (25° C.) mS·cm$^{-1}$ | Withstand voltage (125° C.) V | Note |
| Example 3-1 | 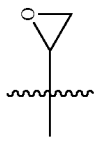 | 4.9 | 6.3 | 200 | |
| Example 3-2 | 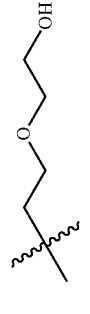 | 4.7 | 6.10 | 125 | |
| Example 3-3 | 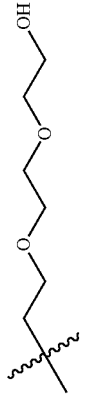 | 3.7 | 6.00 | 120 | |
| Comparative Example 3-1 | — | — | 6.9 | 85 | |
| Comparative Example 3-2 |  | — | 6.7 | 102 | |
| Comparative Example 3-3 | 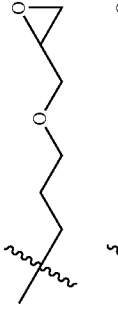 | 2.5 | 7.0 | 90 | |
| Comparative Example 3-4 | 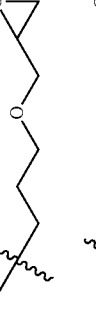 | 0.4 | — | — | Gelation |

*1 Number of functional groups bound to silicon per molecular weight of 1000 of polyorganosiloxane While the electrolytic solution of Comparative Example 3-1, to which no polyorganosiloxane was added, had a low withstand voltage of 85 V, those of Examples 3-1 to 3-3, to which the polyorganosiloxane of the present invention was added, had a comparable conductivity, but had a high withstand voltage of 120 to 200 V.

The electrolytic solution of Comparative Example 3-2, shown as an example to which a conventionally known silane coupling agent was added, was less increased in withstand voltage than that of the present invention. The reason for this is considered because a silane coupling agent is low in molecular weight and hardly forms a sufficiently crosslinked structure, thereby exerting a small effect of protection of the surface of an electrode.

The electrolytic solution of Comparative Example 3-3, to which a conventionally known modified silicone was added, could be modified by the reactive functional group and thus dissolved in γ-butyrolactone, but had a linear silicone structure, namely, a too large percentage b of the D unit, and hardly provided a layer being capable of protecting an electrode and would not be increased in withstand voltage.

The electrolytic solution of Comparative Example 3-4, to which the organic silica sol modified was added, was inferior in stability and was gelated.

[Evaluation IV: Examples 4-1 to 4-5 and Comparative Example 4-1]
[Measurement method]
1. Measurement of Amount of Reactive Functional Group in Polyorganosiloxane The amount of the reactive functional group in each polyorganosiloxane was measured in the same manner as in the above method.

2. Measurement Method of $^{29}$Si-NMR $^{29}$Si-NMR measurement was performed in the same manner as in the above method.

3. Measurement of Proportions of M, D, T, and Q

The proportions could be calculated from the $^{29}$Si-NMR measurement results according to the above method.

4. Measurement of Molecular Weight

The molecular weight was measured in the same manner as in the above method.

5. Measurement of Amount of Weight Loss in Heating Under Reduced Pressure

The amount of weight loss in heating under reduced pressure was measured in the same manner as in the above method.

6. Method of Confirmation of Characteristics at 40° C.

Characteristics at 40° C. were confirmed in the same manner as in the above method.

7. Measurement of Viscosity

The viscosity at 25° C. was measured in the same manner as in the above method.

[Production of Sample]
[Reagents Used]

Reagents, solvents, and the like used in synthesis are as follows.
Hexamethyldisiloxane (manufactured by NuSil Technology LLC, product name: 5-7205)
1,3-Divinyltetramethyldisiloxane (manufactured by NuSil Technology LLC, product name: PLY-70)
1,1,3,3-Tetramethyldisiloxane (manufactured by NuSil Technology LLC)
Phenyltrimethoxysilane (manufactured by Shin-Etsu Chemical Co., Ltd., product name: KMB-103)
Hexyltrimethoxysilane (manufactured by Tokyo Chemical Industry Co., Ltd.) Decyltrimethoxysilane (manufactured by Shin-Etsu Chemical Co., Ltd., product name: KMB-3103)
Methyl silicate MS-51 (manufactured by Mitsubishi Chemical Corporation)
Tetrahydrofuran (manufactured by Kishida Chemical Co., Ltd.)
Toluene (manufactured by Kishida Chemical Co., Ltd.)
Methanol (manufactured by Kishida Chemical Co., Ltd.)
N,N-Dimethylformamide (manufactured by Wako Pure Chemical Industries, Ltd.)
1 N Hydrochloric acid (manufactured by Kishida Chemical Co., Ltd.)
Polyorganosiloxane 18 (OctaPhenyl POSS (MA0840) (trade name) manufactured by Hybrid Plastics Inc. was used as polyorganosiloxane 18 as it was.)
[Synthesis of polyorganosiloxane]

[Synthesis Example 4-1] Polyorganosiloxane 17

Hydrolytic condensation was performed by use of 105 parts by weight of hexamethyldisiloxane, 225 parts by weight of phenyltrimethoxysilane, and 12 parts by weight of methyl silicate MS-51 as raw materials of a polyorganosiloxane, 141 parts by weight of toluene and 141 parts by weight of methanol, as solvents, and a mixture of 75 parts by weight of 1 N hydrochloric acid and 75 parts by weight of methanol as a catalyst and water, with the temperature being kept at 20° C. to 40° C. After hydrochloric acid was removed by washing with demineralized water, the solvent was distilled off at 76° C. under a reduced pressure of 15 Torr by use of a rotary evaporator until distillation of the solvent was not visually observed. Subsequently, the resultant was heated at 110° C. under a reduced pressure of 0.15 torr for 2 hours, thereby providing "polyorganosiloxane 17".

[Synthesis Example 4-2] Polyorganosiloxane 19

Hydrolytic condensation was performed by use of 12 parts by weight of hexamethyldisiloxane, 25 parts by weight of phenyltrimethoxysilane, 33 parts by weight of decyltrimethoxysilane, and 4.1 parts by weight of methyl silicate MS-51 as raw materials of a polyorganosiloxane, 29 parts by weight of tetrahydrofuran as a solvent, and a mixture of 17 parts by weight of 1 N hydrochloric acid and 17 parts by weight of methanol as a catalyst and water, with the temperature being kept at 20° C. to 40° C. After hydrochloric acid was removed by washing with demineralized water, the solvent was distilled off at 76° C. under a reduced pressure of 15 Torr by use of a rotary evaporator until distillation of the solvent was not visually observed. Subsequently, the resultant was heated at 110° C. under a reduced pressure of 0.15 torr for 2 hours, thereby providing "polyorganosiloxane 19".

[Synthesis Example 4-3] Polyorganosiloxane 20

Hydrolytic condensation was performed by use of 47 parts by weight of 1,3-divinyltetramethyldisiloxane, 25 parts by weight of phenyltrimethoxysilane, 150 parts by weight of decyltrimethoxysilane, and 7.3 parts by weight of methyl silicate MS-51 as raw materials of a polyorganosiloxane, 115 parts by weight of toluene and 115 parts by weight of methanol as solvents, and a mixture of 46 parts by weight of 1 N hydrochloric acid and 46 parts by weight of methanol as a catalyst and water, with the temperature being kept at 20° C. to 40° C. After hydrochloric acid was removed by washing with demineralized water, the solvent was distilled off at 76° C. under a reduced pressure of 15 Torr by use of a rotary evaporator until distillation of the solvent was not visually observed rotary evaporator. Subsequently, the resultant was heated at 110° C. under a reduced pressure of 0.15 torr for 2 hours, thereby providing "polyorganosiloxane 20".

[Synthesis Example 4-4] Polyorganosiloxane 21

Hydrolytic condensation was performed by use of 50 parts by weight of 1,3-divinyltetramethyldisiloxane, 119 parts by weight of phenyltrimethoxysilane, 35 parts by weight of decyltrimethoxysilane, and 7.7 parts by weight of methyl silicate MS-51 as raw materials of a polyorganosiloxane, 106 parts by weight of toluene and 106 parts by weight of methanol as solvents, and a mixture of 49 parts by weight of 1 N hydrochloric acid and 49 parts by weight of methanol as a catalyst and water, with the temperature being kept at 20° C. to 40° C. After hydrochloric acid was removed by washing with demineralized water, the solvent was distilled off at 76° C. under a reduced pressure of 15 Torr by use of a rotary evaporator until distillation of the solvent was not visually observed. Subsequently, the resultant was heated at 110° C. under a reduced pressure of 0.15 torr for 2 hours, thereby providing "polyorganosiloxane 21".

[Synthesis Example 4-5] Polyorganosiloxane 22

Hydrolytic condensation was performed by use of 52 parts by weight of 1,3-divinyltetramethyldisiloxane, 28 parts by weight of phenyltrimethoxysilane, 130 parts by weight of hexyltrimethoxysilane, and 8.1 parts by weight of methyl silicate MS-51 as raw materials of a polyorganosiloxane, 109 parts by weight of toluene and 109 parts by weight of methanol as solvents, a mixture of 49 parts by weight of 1 N hydrochloric acid and 49 parts by weight of methanol as a catalyst and water, with the temperature being kept at 20° C. to 40° C. After hydrochloric acid was removed by washing with demineralized water, the solvent was distilled off at 76° C. under a reduced pressure of 15 Torr by use of a rotary evaporator until distillation of the solvent was not visually observed. Subsequently, the resultant was heated at 110° C. under a reduced pressure of 0.15 torr for 2 hours, thereby providing "polyorganosiloxane 22".

Each polyorganosiloxane was prepared by the above method according to Example 4-1 and Comparative Examples 4-1 to 4-5 in Table 11, and subjected to various measurements, and the measurement values were shown in Table 11.

TABLE 11

|  | Example 4-1 | Comparative Example 4-1 | Example 4-2 | Example 4-3 | Example 4-4 | Example 4-5 |
|---|---|---|---|---|---|---|
| Polyorganosiloxane | Polyorganosiloxane 17 | Polyorganosiloxane 18 | Polyorganosiloxane 19 | Polyorganosiloxane 20 | Polyorganosiloxane 21 | Polyorganosiloxane 22 |
| Type of functional group | Phenyl | Phenyl | Phenyl, Decyl | Vinyl, Phenyl, Decyl | Vinyl, Phenyl, Decyl | Vinyl, Phenyl, Hexyl |
| a (Percentage of M unit) | 0.44 | 0 | 0.3 | 0.18 | 0.29 | 0.22 |
| b (Percentage of D unit) | 0 | 0 | 0 | 0 | 0 | 0 |
| c (Percentage of T unit) | 0.52 | 100 | 0.6 | 0.75 | 0.65 | 0.71 |
| d (Percentage of Q unit) | 0 | 0 | 0.1 | 0.7 | 0.07 | 0.07 |
| Amount of functional group mmol/g | 5.1 | 7.7 | 4.8 (Phenyl 2.4, Decyl 2.4) | 8.6 (Phenyl 1.7, Decyl 5.4, Vinyl 1.5) | 8.1 (Phenyl 3.8, Decyl 0.9, Vinyl 3.4) | 9.0 (Phenyl 1.4, Hexyl 5.5, Vinyl 2.1) |
| Trimethylsiloxy group mmol/g | 4.3 | 0 | 0 | 0 | 0 | 0 |
| Alkoxy group, % by weight | 1.8 | 0 | 1.1 | 2.2 | 1.9 | 2.2 |
| Weight loss in treatment at 110° C. and 0.15 Torr | 0.5 or less | — | 0.5 or less | 0.5 or less | 0.5 or less | 0.5 or less |
| Number average molecular weight | 860 | 1033 | 1800 | 3300 | 1300 | 1900 |
| Viscosity | 1500 | Solid | 350 | 830 | 4300 | 650 |

Polyorganosiloxane 18 as a cage-type silsesquioxane having a phenyl group, shown in Comparative Example 4-1 in Table 11, was a solid. Any usual polyorganosiloxane including a large amount of silicon of the T unit, and a large amount of a phenyl group is often a solid. On the other hand, polyorganosiloxane 17 according to the present invention, shown in Example 4-1, is kept in the form of a liquid, although having a large amount of the T unit and a large amount of a phenyl group. It is indicated that the present invention can provide a liquid polyorganosiloxane favorable in handleability. Polyorganosiloxanes 19 to 22 shown in Examples 4-2 to 4-5, respectively, were also kept in the form of a liquid. In consideration that any polyorganosiloxane including a large amount of a phenyl group and a large amount of a long-chain alkyl group is easily in the form of a solid due to interaction of such a phenyl group and crystallization of such a long-chain alkyl group, it is indicated that the present invention can provide a liquid polyorganosiloxane favorable in handleability, including a phenyl group and a long-chain alkyl group. Furthermore, a usual polyorganosiloxane is often separated or clouded in mixing with an organic resin, due to inferior compatibility with such an organic resin. However, polyorganosiloxanes 17 and 19 to 22 shown in Examples 4-1 to 4-5, respectively, could be expected to have favorable compatibility with an organic resin.

INDUSTRIAL APPLICABILITY

An electrolytic solution to which the specific polyorganosiloxane of the present invention can be provided as an electrolytic solution which has excellent properties having high withstand voltage in terms of an electrolytic solution for an electrolytic capacitor, as compared with various known additives.

REFERENCE SIGNS LIST

1: anode electrode foil
2: cathode electrode foil
3: separator
4: lead-out terminal
5: packaging case
6: rubber seal
7: sealing plate
8: external terminal of electrode
9: element fixative
10: capacitor element

What is claimed is:

1. A polyorganosiloxane, having a formula (101):

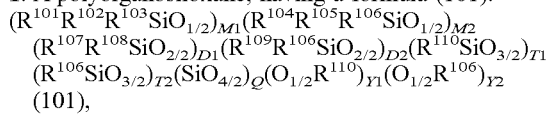
$(R^{107}R^{108}SiO_{2/2})_{D1}(R^{109}R^{106}SiO_{2/2})_{D2}(R^{110}SiO_{3/2})_{T1}$
$(R^{106}SiO_{3/2})_{T2}(SiO_{4/2})_Q(O_{1/2}R^{110})_{Y1}(O_{1/2}R^{106})_{Y2}$
(101), wherein
$R^{101}$ to $R^{105}$ and $R^{107}$ to $R^{110}$ are each independently H, an organic functional group, or a first reactive functional group,
$R^{106}$ is independently an organic group comprising a second reactive functional group, provided that the second reactive functional group differs from the first reactive functional group,
$R^{110}$ is H or an organic group having 1 to 20 carbon atoms not comprising the first or second reactive functional group,
M1, D1, and T1 are each in a range of from 0 to less than 0.6,
Q is in a range of from more than 0 to less than 0.6,
M1+M2>0,
T1+T2+Q>0,
M2+D2+T2>0.25,
M1+M2+D1+D2+T1+T2+Q=1, and
Y1 and Y2 are each 0 or a positive value,
wherein M1, M2, D1, D2, T1, T2, and Q are relative to total silicon atoms,
wherein the first or second a reactive functional group bound to silicon comprises an alkenyl group, a methacryloyl group, an acryloyl group, an acyl group, a cyclic ether group, and/or a hydrogen atom taken together with silicon to form a hydrosilyl group, and is not an alkoxy group,
wherein the organic functional group of $R^{101}$ to $R^{105}$ and $R^{107}$ to $R^{110}$ comprises C and H, and optionally further oxygen, nitrogen, phosphorus, sulfur, and/or halogen, the organic functional group not being reactive in silicone formation and not being the first or second reactive functional group,
wherein the polyorganosiloxane has in a range of from 3 to 12 of the first and second reactive functional groups, bound to silicon, on a number basis per a molecular weight of 1000 of the polyorganosiloxane,
wherein the polyorganosiloxane has a maximum absorption wavenumber of a Si—O stretching vibration is in a wavenumber range of from 1030 to 1060 cm$^{-1}$ in infrared absorption spectrum analysis, and
wherein the polyorganosiloxane has a weight loss of a polyorganosiloxane component in heating at 110° C. under a pressure of 0.15 torr for 2 hours of 5 wt. % or less.

2. The polyorganosiloxane of claim 1, wherein a total of M units, having formulas $R^{101}R^{102}R^{103}SiO_{1/2}$ and $R^{104}R^{105}R^{106}SiO_{1/2}$, is in a range of from 10 to 60 mol. %, relative to total silicon.

3. The polyorganosiloxane of claim 1, wherein the first or second reactive functional group is a vinyl group, and
wherein the polyorganosiloxane has in a range of from 4 to 9 of the first and second reactive functional groups bound to silicon, on a number basis per a molecular weight of 1000 of the polyorganosiloxane.

4. The polyorganosiloxane of claim 1, which is a liquid at 40° C., and
wherein polyorganosiloxane comprises, relative to total silicon, an M unit in 10 mol. % or more and a T unit in 80 mol. % or less,
wherein the polyorganosiloxane has the alkoxy group bound to silicon at a content of 0.07 to 4 wt. %, based on total polyorganosiloxane weight.

5. The polyorganosiloxane of claim 1, having a viscosity at 25° C., in a range of from 5 to 20000 mPa·s.

6. The polyorganosiloxane of claim 1, having a number average molecular weight Mn in a range of from 600 to 5000, as a GPC measurement result in terms of polystyrene.

7. The polyorganosiloxane of claim 1,
wherein $R^{101}$ to $R^{103}$ are each independently H or the organic functional group.

8. The polyorganosiloxane of claim 1, wherein $(R^{101}R^{102}R^{103}SiO_{1/2})_{M1}$ and/or $(R^{104}R^{105}R^{106}SiO_{1/2})_{M2}$, comprises a trimethylsiloxy group.

9. The polyorganosiloxane of claim 1, wherein $(R^{101}R^{102}R^{103}SiO_{1/2})_{M1}$ and/or $(R^{104}R^{105}R^{106}SiO_{1/2})_{M2}$, comprises a dimethylsiloxy group.

10. The polyorganosiloxane of claim 1, wherein the polyorganosiloxane is an MQ resin.

11. The polyorganosiloxane of claim 1, wherein the polyorganosiloxane is an MTQ resin.

12. A composition, comprising:
the polyorganosiloxane of claim 1.

13. The polyorganosiloxane of claim 1, wherein the first or second reactive functional group bound to silicon is an alkenyl group.

14. The polyorganosiloxane of claim 1, wherein the first or second reactive functional group bound to silicon is a methacryloyl group.

15. The polyorganosiloxane of claim 1, wherein the first or second reactive functional group bound to silicon is an acryloyl group.

16. The polyorganosiloxane of claim 1, wherein the first or second reactive functional group bound to silicon is an acyl group.

17. The polyorganosiloxane of claim 1, wherein the first or second reactive functional group bound to silicon is a cyclic ether group.

18. The polyorganosiloxane of claim 1, wherein the first or second reactive functional group bound to silicon is a hydrogen atom taken together with silicon to form a hydrosilyl group.

19. The polyorganosiloxane of claim 1, wherein M2+T2>0.25.

20. The polyorganosiloxane of claim 1, wherein $R^{110}$ is a methyl group.

* * * * *